(12) United States Patent
Yamashita et al.

(10) Patent No.: US 9,139,065 B2
(45) Date of Patent: Sep. 22, 2015

(54) SHOCK ABSORBER

(71) Applicant: HITACHI AUTOMOTOVE SYSTEMS, LTD., Hitachinaka-shi, Ibaraki (JP)

(72) Inventors: Mikio Yamashita, Yokohama (JP); Fumiyuki Yamaoka, Sagamihara (JP); Masaru Kouyama, Ayase (JP); Kunio Takiguchi, Yokohama (JP); Atsufumi Ishimoto, Yokohama (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 14/347,149

(22) PCT Filed: Nov. 28, 2012

(86) PCT No.: PCT/JP2012/080739
§ 371 (c)(1),
(2) Date: Mar. 25, 2014

(87) PCT Pub. No.: WO2013/081004
PCT Pub. Date: Jun. 6, 2013

(65) Prior Publication Data
US 2014/0252735 A1    Sep. 11, 2014

(30) Foreign Application Priority Data
Nov. 30, 2011  (JP) ................. 2011-262009

(51) Int. Cl.
*F16F 9/48* (2006.01)
*F16F 9/49* (2006.01)
(Continued)

(52) U.S. Cl.
CPC ................ *B60G 17/08* (2013.01); *B60G 17/00* (2013.01); *F16F 9/342* (2013.01); *F16F 9/48* (2013.01); *F16F 9/49* (2013.01); *F16F 9/5165* (2013.01)

(58) Field of Classification Search
CPC .............. F16F 9/48; F16F 9/486; F16F 9/49; F16F 9/516; F16F 9/5165; F16F 9/342
USPC ............. 188/281, 282.1, 282.8, 282.9, 282.5, 188/282.6
See application file for complete search history.

(56) References Cited

U.S. PATENT DOCUMENTS 3,365,033 A * 1/1968 Willich ....................... 188/282.5
4,645,044 A * 2/1987 Kato et al. ................. 188/282.1
(Continued)

FOREIGN PATENT DOCUMENTS

GB        2 231 385       11/1990
JP        62-123042       8/1987
(Continued)

OTHER PUBLICATIONS

International Search Report for PCT/JP2012/080739, mailed Jan. 8, 2013.
(Continued)

*Primary Examiner* — Ruth Ilan
(74) *Attorney, Agent, or Firm* — Nixon & Vanderhye P.C.

(57) ABSTRACT

A shock absorber includes a first passage (111) or (112) and a second passage (32), (99) or (235) in communication with each other and configured to allow a working fluid to flow between two chambers (16) and (17) based on movement of a piston (15), and a passage area adjustment mechanism (101) or (236) configured to adjust a passage area of the second passage (99) or (235) depending on a position of a piston rod (18) is installed to have at least one of a maximum length-side property in which an extension-side damping force becomes soft and a compression-side damping force becomes hard in a range in which the piston rod (18) extends to an outside of a cylinder (11) farther than a maximum length-side predetermined position, and a minimum length-side property in which the extension-side damping force becomes hard and the compression-side damping force becomes soft in a range in which the piston rod (18) enters an inside of the cylinder (11) further than a minimum length side predetermined position.

8 Claims, 22 Drawing Sheets

(51) Int. Cl.
  *F16F 9/516* (2006.01)
  *B60G 17/08* (2006.01)
  *F16F 9/342* (2006.01)
  *B60G 17/00* (2006.01)

(56) References Cited

U.S. PATENT DOCUMENTS

| | | | | |
|---|---|---|---|---|
| 5,307,907 | A * | 5/1994 | Nakamura et al. | 188/282.1 |
| 5,316,114 | A * | 5/1994 | Furuya et al. | 188/266.4 |
| 5,368,142 | A * | 11/1994 | Ashiba et al. | 188/282.1 |
| 5,386,892 | A * | 2/1995 | Ashiba | 188/282.8 |
| 5,404,973 | A * | 4/1995 | Katoh et al. | 188/282.1 |
| 5,497,862 | A * | 3/1996 | Hoya | 188/282.5 |
| 8,800,729 | B2 * | 8/2014 | Yabe et al. | 188/266.6 |

FOREIGN PATENT DOCUMENTS

| | | |
|---|---|---|
| JP | 2-283928 | 11/1990 |
| JP | 2-283929 | 11/1990 |
| JP | 3-42319 | 2/1991 |
| JP | 5-238227 | 9/1993 |
| JP | 2009-180355 | 8/2009 |
| JP | 2010-120580 | 6/2010 |

OTHER PUBLICATIONS

Microfilm of the Specification and Drawings Annexed to the Request of JP Utility Model Application No. 11264/1986 (Laid-Open No. 123042/1987), Nissin Electric Co., Ltd., (Aug. 5, 1987), pp. 10-11.

* cited by examiner

SHOCK ABSORBER

TECHNICAL FIELD

The present invention relates to a shock absorber.

This application is the U.S. national phase of International Application No. PCT/JP2012/080739, filed Nov. 28, 2012, which designated the U.S. and claims priority to Japanese Patent Application. No. 2011-262009, filed Nov. 30, 2011, the contents of each of which is incorporated herein by reference.

BACKGROUND ART

In shock absorbers, there is a displacement response type shock absorber, including a bias spring configured to bias a disc valve to generate a damping force, configured to vary a spring force of the bias spring according to a position of a piston with respect to a cylinder and vary the damping force (for example, see Patent Literatures 1 and 2). In such a shock absorber, since a reaction force of the spring may be increased when the spring force of the bias spring is increased to increase the damping force, a degree of freedom in settings such as damping characteristics, a reaction force, or the like, in a design step is low.

CITATION LIST

Patent Literature

[Patent Literature 1] Japan Unexamined Patent Application, First Publication No. H02-283928
[Patent Literature 2] Japan Unexamined Patent Application, First Publication No. H02-283929

SUMMARY OF INVENTION

Problem to be Solved by the Invention

Accordingly, the present invention is directed to provide a shock absorber capable of increasing a degree of freedom in settings such as damping characteristics, a reaction force, or the like.

Means for Solving the Problem

According to a first aspect of the present invention, a shock absorber includes a piston configured to divide an inside of a cylinder into two chambers, a first passage and a second passage configured to cause the two chambers to communicate and configured to allow a working fluid to flow between the two chambers based on movement of the piston, and a damping valve installed at the first passage and configured to suppress a flow of the working fluid generated by movement of the piston and generate a damping force, wherein a passage area adjustment mechanism configured to adjust a passage area of the second passage depending on a position of the piston rod is installed to have at least one of a maximum length-side property in which an extension-side damping force becomes soft and a compression-side damping force becomes hard in a range in which the piston rod extends to the outside of the cylinder farther than a maximum length-side predetermined position, and a minimum length-side property in which the extension-side damping force becomes hard and the compression-side damping force becomes soft in a range in which the piston rod enters the inside of the cylinder further than a minimum length-side predetermined position.

According to a second aspect of the present invention a shock absorber includes a piston configured to divide an inside of a cylinder into two chambers, a first passage and a second passage configured to cause the two chambers to communicate and configured to allow a working fluid to flow between the two chambers based on movement of the piston, and a damping valve installed at the first passage and configured to suppress a flow of the working fluid generated by movement of the piston, and generate a damping force, wherein a passage area adjustment mechanism configured to adjust a passage area of the second passage based on a position of the piston rod is installed such that an extension-side damping force becomes soft and a compression-side damping force becomes hard in a range in which the piston rod extends to the outside of the cylinder farther than a maximum length-side predetermined position, and both of the extension-side damping force and the compression-side damping force become soft in a range in which the piston rod enters the inside of the cylinder further than a minimum length-side predetermined position.

According to a third aspect of the present invention, a shock absorber includes a piston configured to divide an inside of a cylinder into two chambers, a first passage and a second passage configured to cause the two chambers to communicate and configured to allow a working fluid to flow between the two chambers based on movement of the piston, and a damping valve installed at the first passage and configured to suppress a flow of the working fluid generated, by movement of the piston and generate a damping force, wherein a passage area adjustment mechanism configured to adjust a passage area of the second passage based on a position of the piston rod is installed such that both of an extension-side damping force and a compression-side damping force become soft in a range in which the piston rod extends to the outside of the cylinder farther than a maximum length-side predetermined position, and the extension-side damping force becomes hard and the compression-side damping force becomes soft in a range in which the piston rod enters the inside of the cylinder further than a minimum length-side predetermined position.

Effects of the Invention

According to the present invention, a degree of freedom of settings such as damping characteristics, a reaction force, or the like, can be increased.

DESCRIPTION OF EMBODIMENTS

Figure 1:
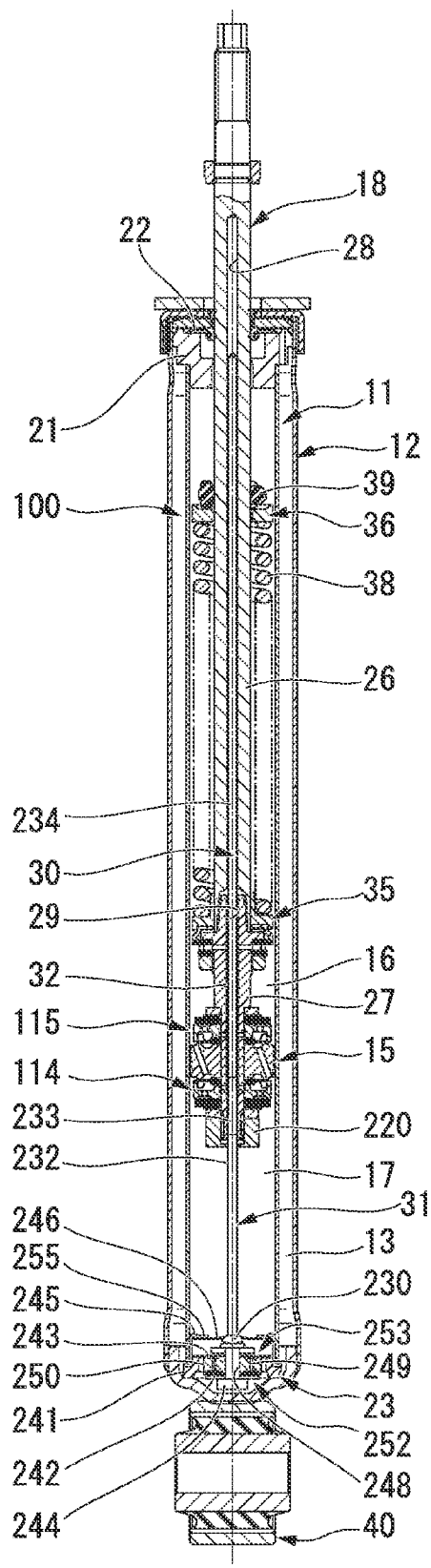
FIG. 1 is a cross-sectional view showing a shock absorber of a first embodiment according to the present invention.

Hereinafter embodiments according to the present invention will be described with reference to the accompanying drawings.

[First Embodiment]

A first embodiment according to the present invention will be described based on FIGS. 1 to 8. In the following description, for the convenience of understanding, a lower side of the drawing is defined as one side and a lower side, and reversely, an upper side of the drawing is defined as the other side and an upper side.

A shock absorber of the first embodiment is a damping force adjustment type. The shock absorber of the first embodiment is, as shown in FIG. 1, a so-called dual pipe type hydraulic pressure shock absorber. The shock absorber according to the embodiment has a cylinder 11 having a cylindrical shape in which liquid oil serving as working fluid is sealed, and an outer casing 12 having a bottomed cylindrical shape and a diameter larger than that of the cylinder 11, and concentrically installed to cover the cylinder 11. A reservoir chamber 13 is formed between the cylinder 11 and the outer casing 12.

A piston 15 is slidably fitted in the cylinder 11. The piston 15 divides the inside of the cylinder 11 into two chambers, i.e., an upper chamber 16 and a lower chamber 17. Liquid oil is sealed in the upper chamber 16 and the lower chamber 17 in the cylinder 11, and the liquid oil and gas are sealed in the reservoir chamber 13 between the cylinder 11 and the outer casing 12.

A piston rod 18 has one end extending to the outside of the cylinder 11 and the other end inserted into the cylinder 11. The piston 15 is connected to the other end section in the cylinder 11 of the piston rod 18. The piston rod 18 is inserted through a rod guide 21 mounted on one end opening sections of the cylinder 11 and the outer casing 12, and an oil seal 22 mounted on one end opening section of the outer casing 12 to extend to the outside of the cylinder 11. The rod guide 21 has an outer circumferential section having a stepped shape and a larger diameter at an upper section than a lower section thereof, and the lower section is fitted into an inner circumferential section of an upper end of the cylinder 11 and the upper section is fitted into an inner circumferential section of an upper section of the outer casing 12. An inner circumferential section of a lower end of the cylinder 11 is fitted onto a base valve 23 installed at a bottom section of the outer casing 12 and configured to divide the cylinder 11 into the lower chamber 17 and the reservoir chamber 13. An upper end section of the outer casing 12 is swaged inside and sandwiches the oil seal 22 and the rod guide 21 with the cylinder 11.

The piston rod 18 is configured of a rod main body 26 inserted through the rod guide 21 and the oil seal 22 to extend to the outside, and a tip end rod 27 threadedly engaged with and integrally connected to an end section of the rod man body 26 in the cylinder 11. An insertion hole 28 is formed in an axial direction at a center in a radial direction of the rod main body 26 from the tip end rod 27 side to an intermediate position in the vicinity of the opposite end section. In addition, a penetration hole 29 is formed in the axial direction at a center in the radial direction of the tip end rod 27. The insertion hole 28 and the penetration hole 29 configure the insertion hole 30 of the piston rod 18. A metering pin 31 supported at the base valve 23 side is inserted into the insertion hole 30. A rod-inside passage (a second passage) 32 through which the liquid oil is flowable in the piston rod 18 is configured between the insertion hole 30 and the metering pin 31.

On the outer circumferential side of the rod main body 26 of the piston rod 18, an annular piston-side spring shoe 35 is installed near the piston 15, and an annular rod guide-side spring shoe 36 is installed at a side of the piston-side spring shoe 35 opposite from the piston 15. The rod main body 26 is inserted into the piston-side spring shoe 35 and the rod guide-side spring shoe 36 to be slidable along the rod main body 26. A rebound spring 38 configured of a coil spring is interposed between the piston-side spring shoe 35 and the rod guide-side spring shoe 36 as the rod main body 26 is inserted therethrough. A shock absorbing body 39 configured of an annular elastic material is installed at a side of the rod guide-side spring shoe 36 opposite to the rebound spring 38. The shock absorbing body 39 is also slidable along the rod main body 26 as the rod main body 26 is inserted therethrough.

For example, one side of shock absorber is supported by a vehicle body, and the other side is fixed to a wheel side. Specifically, the shock absorber is connected to the vehicle body by the piston rod 18, and connected to the wheel side by an attachment eye 40 attached to the outside of the bottom section of the outer casing 12. Further, reversely, the other side of the shock absorber may be supported by the vehicle body, and one side may be fixed to the wheel side.

Figure 2:
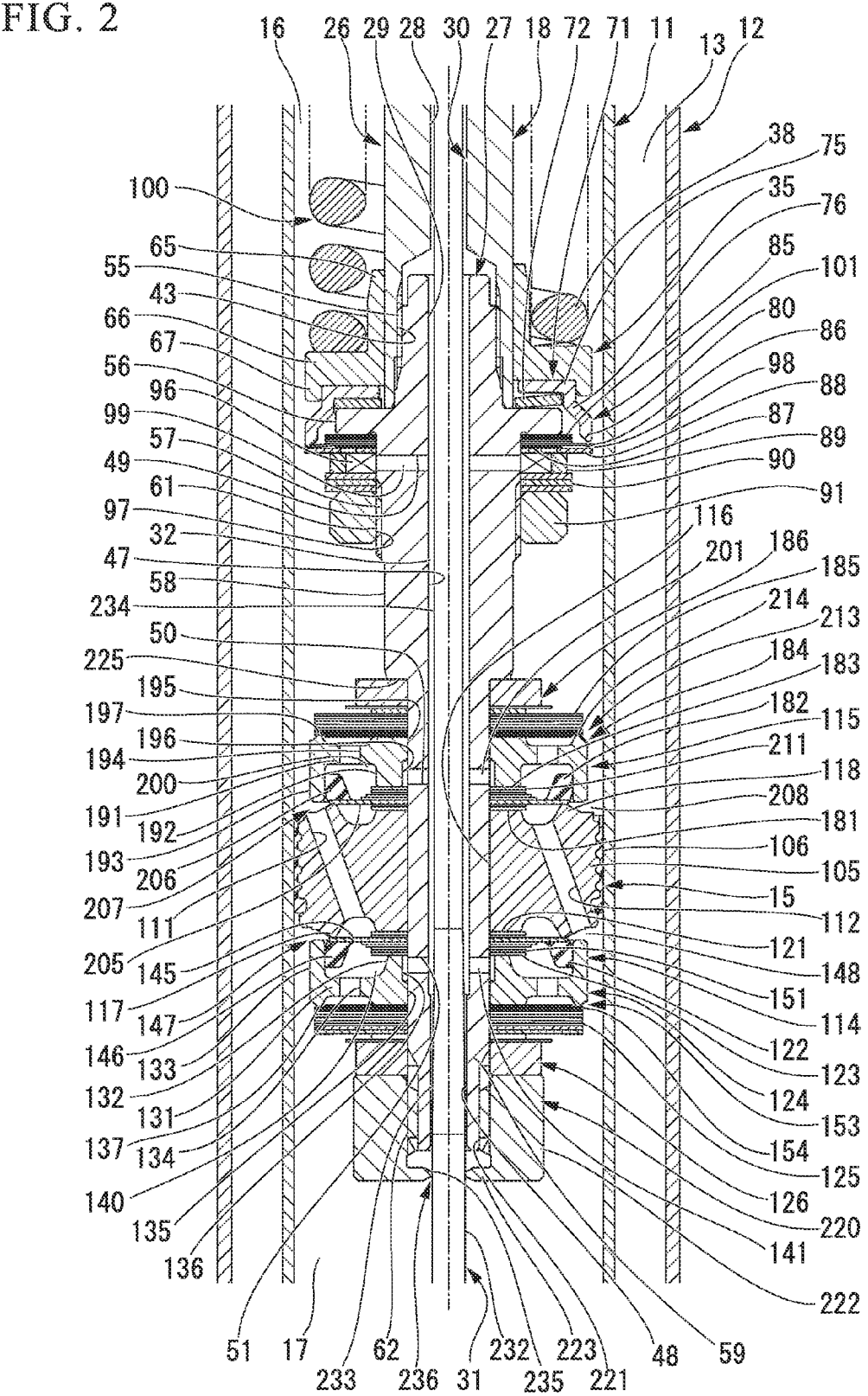
FIG. 2 is a cross-sectional view showing a major part of the shock absorber of the first embodiment according to the present invention.

As shown in FIG. 2, a screw hole 43 having a diameter larger than that of the insertion hole 28 and in communications with the insertion hole 28 is formed in an end section of the rod main body 26 near the tip end rod 27.

The penetration hole 29 that forms the rod-inside passage 32 of the tip end rod 27 is configured of a large diameter hole section 47 near the rod main body 26, and a small diameter hole section 48 disposed at an opposite side of the rod main body 26 and having a diameter smaller than that of the large diameter hole section 47. A passage hole 49, a passage hole 50 and a passage hole 51 are formed in the tip end rod 27 in sequence from the rod main body 26 side to pass therethrough in the radial direction. All of the passage holes 49 to 51 are formed at positions of the large diameter hole section 47 in the axial direction of the tip end rod 27.

The tip end rod 27 has a screw shaft section 55, a flange section 56, a holding shaft section 57, an intermediate shaft section 58 and an attachment shaft section 59 in sequence from the rod main body 26 side in the axial direction. The screw shaft section 55 is threadedly engaged with the screw hole 43 of the rod main body 26. The flange section 56 has an outer diameter larger than that of the screw shaft section 55 and the rod main body 26 so as to cause the flange section 56 to abut the rod main body 26. The holding shaft section 57 has a diameter smaller than that of the flange section 56, and a male screw 61 is formed at a portion opposite to the flange section 56 in the axial direction. The passage hole 49 is formed at a position of the holding shaft section 57 closer to the flange section 56 than the mate screw 61. The intermediate shaft section 58 has an outer diameter slightly smaller than a root diameter of the male screw 61 of the holding shaft section 57. The attachment shaft section 59 has a diameter smaller than that of the intermediate shaft section 58. A male screw 62 is formed at an end section of the attachment that section 59 opposite to the intermediate shaft section 58 in the axial direction. The passage hole 50 disposed near the intermediate shaft section 58 is formed in the attachment shaft section 59 within a range closer to the intermediate shaft section 58 than the male screw 62, and the passage hole 51 is formed therein at a position near the male screw 62.

The piston-side spring shoe 35 has a cylindrical section 65, an abutting flange section 66 extending from one end side in the axial direction of the cylindrical section 65 outward in the radial direction, and a cylindrical projection 67 slightly protruding from an outer circumferential section of the abutting flange section 66 toward an opposite side of the cylindrical section 65 in the axial direction. The piston-side spring shoe 35 abuts the end section in the axial direction of the rebound spring 38 in the abutting flange section 66 in a state in which the cylindrical section 65 is disposed inside the rebound spring 38.

A transmission member 71 and a wave spring 72 are interposed between the piston-side spring shoe 35 and the flange section 56 of the tip end rod 27. The transmission member 71 has an annular shape and is disposed closer to the piston-side spring shoe 35 than the wave spring 72. The transmission member 71 has a base plate section 75 having a holed disk shape, and a tubular section 76 extending from an outer circumferential edge section thereof in the axial direction. The tubular section 76 has a stepped shape having a large diameter at an opposite side of the base plate section 75, an inner circumferential side of the tip end section thereof is chamfered, and thus an abutting section 80 having a smaller thickness in the radial direction than the other portion is formed at a tip end section of the tubular section 76.

The rod main body 26 is inserted through the transmission member 71, and the base plate section 75 is fitted into the projection 67 of the piston-side spring shoe 35 and configured to abut the abutting flange section 66.

The wave spring 72 has an annular shape when seen in a plan view. As shown in a right side of a centerline of FIG. 2, the wave spring 72 has a shape in a natural state such that a position in the axial direction is varied according to a variation in position of at least one position in the radial direction and the circumferential direction. The wave spring 72, through which the rod main body 26 is inserted, is disposed inside the tubular section 76 of the transmission member 71, and is disposed at the base plate section 75 of the transmission member 71 opposite to the piston-side spring shoe 35. The wave spring 72 is elastically deformed to be flattened in the axial direction to generate biasing force. The wave spring 72 separates the flange section 56 and the transmission member 71 of the tip end rod 27, which are both sides in the axial direction, from each other by a predetermined distance In the axial direction.

Here, when the piston rod 18 moves toward an extension-side, at which the piston rod 18 protrudes from the cylinder 11, i.e., an upper side, the wave spring 72, the transmission member 71, the piston-side spring shoe 35, the rebound spring 38, the rod guide-side spring shoe 36 and the shock absorbing body 39 shown, in FIG. 1 are moved toward the rod guide 21 with the flange section 56 of the tip end rod 27 of the piston rod 18, and the shock absorbing body 39 abuts the rod guide 21 at a predetermined position.

When the piston rod 18 further moves in the protruding direction, after the shock absorbing body 39 is collapsed, the shook absorbing body 39 and the rod guide-side spring shoe 36 are stopped with respect to the cylinder 11. As a result, the flange section 56, the wave spring 72, the transmission member 71 and the piston-side spring shoe 35 of the moving tip end rod 27 shown in FIG. 2 shrink the rebound spring 38, and biasing force of the rebound spring 38 becomes resistance against a movement of the piston rod 18. In this way, the rebound spring 38 installed in the cylinder 11 elastically biases the piston rod 18 to suppress an extension limit of the piston rod 18. Further, as the rebound spring 38 becomes resistance to the expansion limit of the piston rod 18 in this way, lifting of the wheel of the inner circumferential side when the shock-absorber-mounted vehicle is turned is suppressed to suppress a roll amount of the vehicle body.

Here, when the piston rod 18 moves in the protruding direction and the shock absorbing body 39 shown in FIG. 1 abuts the rod guide 21, before the piston-side spring shoe 35 shrinks the rebound spring 38 interposed between the piston-side spring shoe 35 and the rod guide-side spring shoe 36 as described above, as shown in a left side of the centerline of FIG. 2, the flange section 56 of the piston rod 18 collapses the wave spring 72 with the transmission member 71 against the biasing force. Accordingly, the transmission member 71 is slightly moved toward the flange section 56 in the axial direction.

Figure 3:
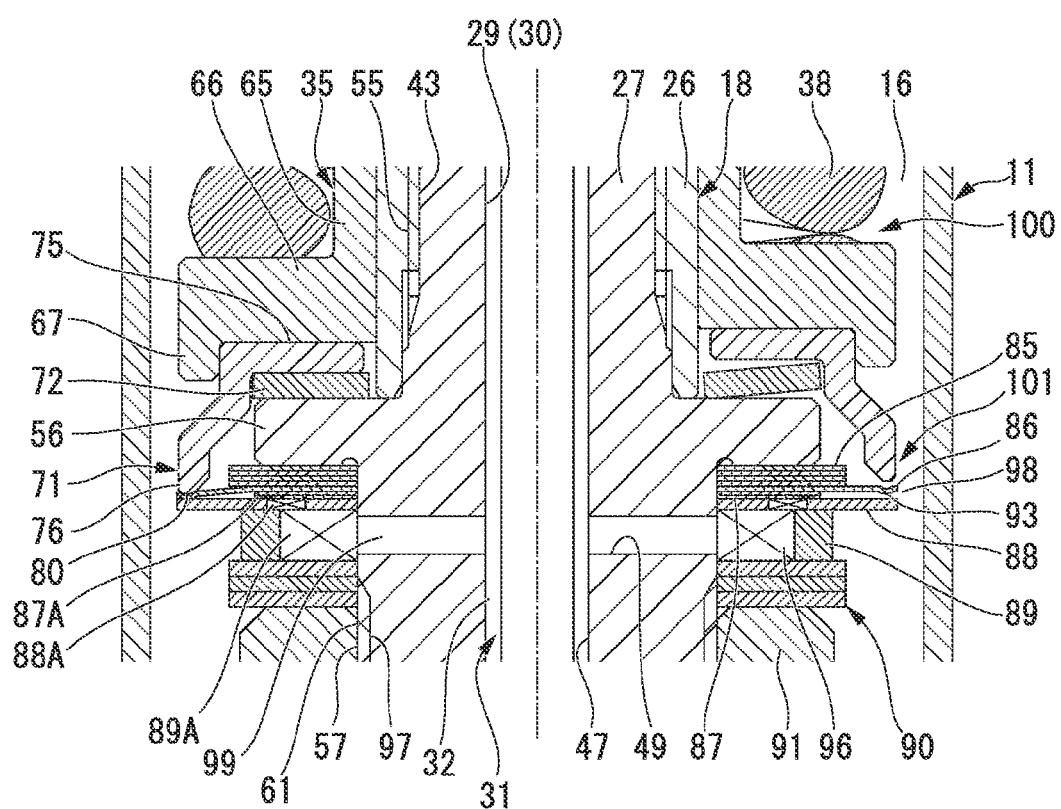
FIG. 3 is a cross-sectional view of a periphery of a passage area adjustment mechanism of one side of the shock absorber of the first embodiment according to the present invention.

As shown in FIG. 3, a plurality of disks 85, an opening/closing disk (a valve section) 86, a plurality of intermediate disks 87, an abutting disk 88, a passage forming member 89, an intervention member 90 and a nut 91 are installed at the flange section 56 of the tip end rod 27 opposite to the piston-side spring shoe 35 in the axial direction in sequence from the flange section 56.

Each of the plurality of disks 85 has a holed disk shape and an outer diameter smaller than an inner diameter of the tubular section 76 of the transmission member 71. The opening/closing disk 86 has a holed disk shape and an outer diameter substantially equal to an outer diameter of the tubular section 76 of the transmission member 71. An annular opening/closing section 93 concaved from one surface in the axial direction toward the other side in the axial direction and protruding from the other surface in the axial direction toward the other side in the axial direction is formed at the outer circumferential side of the opening/closing disk 86. The opening/closing section 93 has the same diameter as the abutting section 80 of the transmission member 71.

Each of the plurality of intermediate disks 87 has a holed disk shape and an outer diameter smaller than that of the opening/closing disk 86. In addition, a plurality of notches 87A are formed at an outer circumferential side of the intermediate disk 87 near the abutting disk 88. The abutting disk 88 has a holed disk shape and has the same outer diameter as the opening/closing disk 86. A C-shaped through-hole 88A is formed in an intermediate section in fire radial direction of the abutting disk 88. The passage forming member 89 has a holed disk shape and an outer diameter smaller than that of the abutting disk 88. A plurality of notches 89A are formed at an inner circumferential side of the passage forming member 89. The intervention member 90 is configured of a plurality of holed disk-shaped members and has an outer diameter larger than that of the passage forming member 89. A passage 96 bringing the outside in the radial direction of the intermediate disk 87, i.e., the upper chamber 16 in communication with the passage hole 49, is formed in the intermediate disk 87, the abutting disk 88 and the passage forming member 89. The passage 96 is configured of the notches 87A formed at the outer circumferential section of the intermediate disk 87, the through-hole 88A formed in the intermediate section in the radial direction of the abutting disk 88, and the notches 89A formed at the inner circumferential section of the passage forming member 89.

The plurality of disks 85, the opening/closing disk 86, the plurality of intermediate disks 87, the abutting disk 88, the passage forming member 89 and the intervention, member 90 are disposed at the tip end rod 27 such that the holding shaft section 57 is inserted therethrough, and in this state, a female screw 97 of the nut 91 is threadedly engaged with the male screw 61. Accordingly, the plurality of disks 85, the opening/closing disk 86, the plurality of intermediate disks 87, the abutting disk 88, the passage forming member 89 and the intervention member 90 are sandwiched between the flange section 56 of the tip end rod 27 and the nut 91 in the axial direction.

As shown at a right side of a centerline of FIG. 3, in a state in which the transmission member 71 is spaced apart from the flange section 56 of the tip end rod 27 in the axial direction by the biasing force of the wave spring 72, the abutting, section 80 is spaced apart from the opening/closing section 93 of the opening/closing disk 86, and thus the opening/closing section 93 is spaced apart from the abutting disk 88. Here, a gap between the opening/closing section 93 of the opening/closing disk 86 and the abutting disk 88, and the passage 96 of the intermediate disk 87, the abutting disk 88 and the passage forming member 89 configure an orifice 98, and the orifice 98 and the passage hole 49 of the tip end rod 27 configure a passage (a second passage) 99 configured to bring the upper chamber 16 in communication with the rod-inside passage 32.

As shown at a left side of the centerline of FIG. 3, when the transmission member 71 moves the base plate section 75 toward the flange section 56 by the biasing force of the rebound spring 38 to collapse the wave spring 72, the abutting section 80 abuts the opening/closing section 93 of the opening/closing dish 86 to bring the opening/closing section 93 in contact with the abutting disk 88. Accordingly, the orifice 98 is closed to block communication between the upper chamber 16 and the rod-inside passage 32 via the passage 99.

The transmission member 71, the piston-side spring shoe 35, the rebound spring 38, the rod guide-side spring shoe 36 and the shock absorbing body 39 shown in FIG. 1 are installed in the cylinder 11 to configure a spring mechanism 100 having one end that is capable of abutting the opening/closing disk 86 shown in FIG. 3 and the other end that is capable of abutting the rod guide 21 shown in FIG. 1 near the end section of the cylinder 11. As shown in FIG. 3, the spring mechanism 100 biases the opening/closing disk 86 in a valve closing direction by the spring force against the biasing force of the wave spring 72. Then, the spring mechanism 100, the opening/closing disk 86 configured to open and dose the orifice 98, and the abutting disk 88 configure the passage area adjustment mechanism 101 configured to adjust a passage area of the orifice 98, i.e., the passage 99 according to the biasing force of the rebound spring 38 varied by a position of the piston rod 18. The orifice 98 is, in other words, a variable orifice having a variable passage area.

Figure 4:
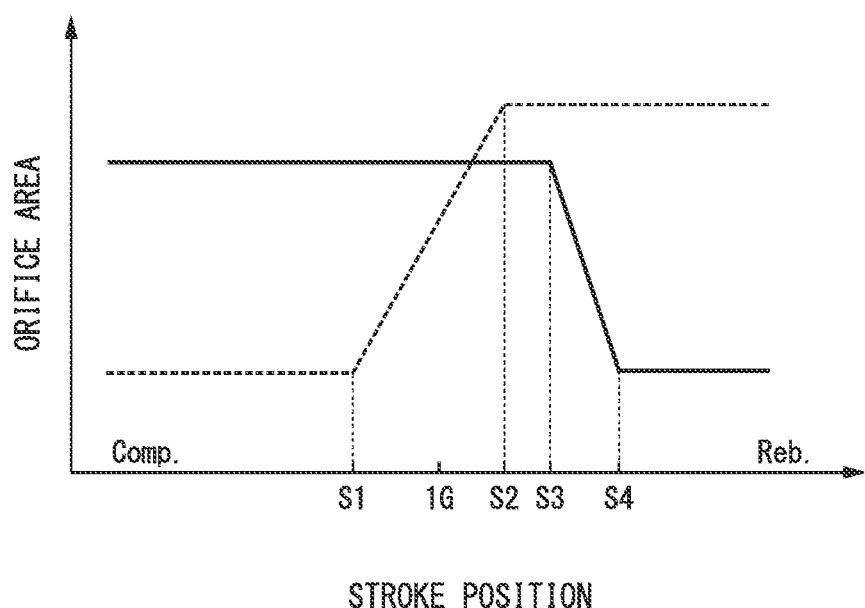
FIG. 4 is a characteristic diagram showing a relation between a stroke position and a passage area of an orifice of the shock absorber of the first embodiment according to the present invention.

The passage area of the orifice 98 with respect to a stroke position of the shock absorber by the passage area adjustment mechanism 101 is shown by a solid fine of FIG. 4. That is, the passage area of the orifice 98 becomes a maximum constant value until a total stroke range of a compression-side and a predetermined position S3 of an extension-side including a neutral position (a position of 1G (a position, at which the vehicle body stopped at a horizontal position is supported), is proportionally decreased toward the extension-side when the spring mechanism 100 starts to close the opening/closing disk 86 against the biasing force of the wave spring 72 at the predetermined position S3 of the extension-side, becomes a minimum value at a predetermined position S4 at which the opening/closing section 93 of the opening/closing disk 86 abuts the abutting disk 88, and becomes a minimum constant value at a position closer to the extension-side than the prescribed position S4.

As shown in FIG. 2, the piston 15 is configured of a piston main body 105 supported by the tip end rod 27, and an annular sliding member 106 mounted on the outer circumferential surface of the piston main body 105 configured to slide in the cylinder 11.

A plurality of passages (first passages) 111 (only one is shown because the passages are shown in a cross-sectional view of FIG. 2) configured to bring the upper chamber 16 in communication with the lower chamber 17 and configured to allow the liquid oil to flow from the upper chamber 16 toward the lower chamber 17 upon movement of the piston 15 toward the upper chamber 16, i.e., an extension stroke, and a plurality of passages (first passages) 112 (only one is shown because the passages am shown in a cross-sectional view of FIG. 2) configured to allow the liquid oil to flow from the lower chamber 17 toward the upper chamber 16 upon movement of the piston 15 toward the lower chamber 17, i.e., a compression stroke, are installed at the piston main body 105. The passages 111 are formed in a circumferential, direction at equal pitches to sandwich the passages 112 therebetween, each sandwiched between the neighboring passages 111, one side (an upper side of FIG. 2) in the axial direction of the piston 15 is opened outward in the radial direction, and the other side (a lower side of FIG. 2) in the axial direction is opened inward in the radial direction.

Then, a damping force generating mechanism 114 configured to generate damping force is installed with respect to half the number of passages 111. The damping force generating mechanism 114 is disposed at the lower chamber 17 side, which is one end side in the axial direction of the piston 15. The passages 111 configure a passage of the extension-side through which the liquid oil passes when the piston 15 moves to the extension-side at which the piston rod 18 expands to the outside of the cylinder 11. The damping force generating mechanism 114 installed with respect to these becomes a damping force generating mechanism of the extension-side configured to restrict a flow of the liquid oil in the passages 111 of the extension-side and generate damping force.

In addition, the passages 112 that configure the remaining half are formed in the circumferential direction at equal pitches to sandwich the passages 111, each sandwiched between the neighboring passages 112. The passage 112 has the other side (the lower side of FIG. 2) in the axial direction of the piston 15 opened outward in the radial direction and one side (the upper side of FIG. 2) in the axial direction opened inward in the radial direction.

Then, a damping force generating mechanism 115 configured to generate damping force is installed at the remaining half of the passages 112. The damping force generating mechanism 115 is disposed at the upper chamber 16 side in the axial direction, which is the other end side in the axial direction of the piston 15. The passages 112 configure a passage of the compression-side through which the liquid oil passes when the piston 15 is moved to the compression-side at which the piston rod 18 enters the cylinder 11. The damping force generating mechanism 115 installed with respect to these becomes a damping force generating mechanism of the compression-side configured to restrict a flow of the liquid oil in the passage 112 of the compression-side and generate a damping force.

The piston main body 105 has a substantially circular plate shape, and an insertion aperture 116 passing in the axial direction and through which the attachment shaft section 59 of the tip end rod 2 is inserted is formed at a center thereof. A seat section 117 drat configures the damping force generating mechanism 114 is annularly formed at the end section of the piston main body 105 near the lower chamber 17 at the outside of one end opening position of the passage 111 of the extension-side. A seat section 118 that configures the damping force generating mechanism 115 is annularly formed at the end section of the piston main body 105 near the upper chamber 16 at the outside of one end opening position of the passage 112 of the compression-side.

In the piston main body 105, a side of the seat section 117 opposite to the insertion aperture 116 has a stepped shape having a height in the axial direction smaller than that of the seat section 117, and the other end of the passage 112 of the compression-side is opened at the portion having the stepped shape. In addition, similarly, in the piston main body 105, a side of the seat section 118 opposite to the insertion aperture 116 has a stepped shape having a height in the axial direction smaller than that of the seat section 118, and the other end of the passage 111 of the extension-side is opened at the portion having the stepped shape.

The damping force generating mechanism 114 of the extension-side is a pressure control type valve mechanism. The damping force generating mechanism 114 has a plurality of disks 121, a damping valve main body 122, a plurality of disks 123, a seat member 124, a plurality of disks 125 and a valve restriction member 126 in sequence from the piston 15 side in the axial direction.

The seat member 124 has a bottom section 131 having a holed disk shape in a direction perpendicular to the axis, an inner cylindrical section 132 having a cylindrical shape and formed, at an inner circumferential side of the bottom section 131 in the axial direction, and an outer cylindrical section 133 having a cylindrical shape and formed at an outer circumferential side of the bottom section 131 in the axial direction. The bottom section 131 is deviated to one side in axial direction with respect to the inner cylindrical section 132 and the outer cylindrical section 133, and a plurality of through-holes 134 passing in the axial direction are formed in the bottom section 131. A small diameter hole section 135 into which the attachment shaft section 59 of the tip end rod 27 is fitted to the bottom section 131 side in the axial direction is formed inside the inner cylindrical section 132, and a large diameter hole section 136 having a diameter larger than that of the small diameter hole section 135 is formed at an opposite side of the bottom section 131 in the axial direction. An annular seat section 137 Is formed at an end section of the outer cylindrical section 133 of the seat member 124 near the bottom section 131 in the axial direction. The plurality of disks 125 sit on a seat section 137.

A space opposite to the bottom section 131 in the axial direction surrounded by the bottom section 131 of the seat member 124, the inner cylindrical section 132 and the outer cylindrical section 133, and a through-hole 134 of the seat member 124 configure a pilot chamber (a second passage) 140 configured to apply pressure to the damping valve main body 122 in the direction of the piston 15. The passage hole 51 of the tip end rod 27, the large diameter hole section 136 of the seat member 124, and an orifice 151 (to be described below) formed at the disk 123 configure a pilot chamber introduction passage (a second passage) 141 connected to the rod-inside passage 32 and the pilot chamber 140 and configured to introduce the liquid oil into the pilot chamber 140 from the upper chamber 16 and the lower chamber 17 via the rod-inside passage 32.

The plurality of disks 121 have a holed disk shape having, an outer diameter smaller than that of the seat section 117 of the piston 15. The damping valve main body 122 is configured of a disk 145 having a holed, disk, shape that is capable of sitting on the seat section 117 of the piston 15, and an annular seal member 146 formed of a rubber material and fixed to an outer circumferential side of the disk 145 opposite to the piston 15. The damping valve main body 122 and the seat section 117 of the piston 15 configure a damping valve 147 of the extension-side installed between the passage 111 installed at the piston 15 and the pilot chamber 140 installed at the seat member 124 and configured to suppress a flow of the liquid oil generated by movement of the piston 15 to the extension-side and generate damping force. Accordingly, the damping valve 147 is a disc valve. Further, the disk 145 has no portion passing in the axial direction except for a central hole passing through the attachment shaft section 59 of the piston rod 18.

A seal member 146 of the damping valve main body 122 comes in contact with the inner circumferential surface of the outer cylindrical section 133 of the seat member 124 to seal a gap between the damping valve main body 122 and the outer cylindrical section 133. Accordingly, the pilot chamber 140 between the damping valve main body 122 and the seat member 124 applies inner pressure to the damping valve main body 122 in the direction of the piston 15, i.e., in a dosing direction of the valve abutting the seat section 117. The damping valve 147 is a pilot type damping valve having the pilot chamber 140, and when the damping valve main body 122 is separated from the seat section 117 of the piston 15 to be opened, allows the liquid oil from the passage 111 to flow to the lower chamber 17 via a passage 148 in the radial direction between the piston 15 and the seal member 124.

The plurality of disks 123 have a holed disk shape having a diameter smaller than that of the disk 145, and the orifice 151 configured of an opening section is formed at one of the disks 123 near the seat member 124. As described above, the pilot chamber 140 comes in communication with the inside of the large diameter hole section 136 of the seat member 124 by the orifice 151.

The plurality of disks 125 have a holed disk shape that is capable of sitting on the seat section 137 of the seat member 124. The plurality of disks 125 and the seat section 137 configure a disc valve 153 configured to suppress allow of the liquid oil between the pilot chamber 140 and the lower chamber 17 installed at me seat member 124. An orifice 154 configured of an opening section configured to bring the pilot chamber 140 in communication with the lower chamber 17 even in a state of abutting to the seat section 137 is formed at one of the plurality of disks 125 near the seat section 137. The disc valve 153 brings the pilot chamber 140 in communication with the lower chamber 17 at a passage area larger than that of the orifice 154 as the plurality of disks 125 are separated from the seat section 137. The valve restriction member 126 is configured of a plurality of annular members, and abuts the plurality of disks 125 to restrict deformation in the opening direction to a defined level or more.

The damping force generating mechanism 115 of the compression-side is also a pressure control type valve mechanism, similar to the extension-side. The damping force generating mechanism 115 has a plurality of disks 181, a damping valve main body 182, a plurality of disks 183, a seat member 184, a plurality of disks 185 and a valve restriction member 186 in sequence from the piston 15 side in the axial direction.

The seat member 184 has a bottom section 191 having a holed disk shape in the direction perpendicular to the axis, an inner cylindrical section 192 formed at an inner circumferential side of the bottom section 191 and having a cylindrical shape in the axial direction, and an outer cylindrical section 193 formed at an outer circumferential side of the bottom section 191 and having a cylindrical shape in the axial direction. The bottom section 191 is deviated to one side in the axial direction with respect to the inner cylindrical section 192 and the outer cylindrical section, and a plurality of through-holes 194 passing in the axial direction are formed, in the bottom section 191. A small diameter hole section 195 configured to fit the attachment shall section 59 of the tip end rod 27 to the bottom section 191 in the axial direction is formed inside the inner cylindrical section 192, and a large diameter hole section 196 having a diameter larger than that of the small diameter hole section 195 is formed at an opposite side of the bottom section 191 in the axial direction. An annular seat section 197 is formed at an end section of the outer cylindrical section 193 near the bottom section 191 in the axial direction, and the plurality of disks 185 sit on a seat section 197.

A space opposite to the bottom section 191 surrounded by the bottom section 191 of the seat member 184, the inner cylindrical section 192 and the outer cylindrical section 193, and the through-hole 194 configure a pilot chamber (a second passage) 200 configured to apply pressure to the damping valve main body 182 in the direction of the piston 15. The passage hole 50 of the tip end rod 27, the large diameter hole section 196 of the seat member 184, and an orifice 211 (to be described below) formed in the disk 183 configure a pilot chamber introduction passage (a second passage) 201 connected to the rod-inside passage 32 and the pilot chamber 200, and configured to introduce the liquid oil into the pilot chamber 200 from the upper chamber 16 and the lower chamber 17 via the rod-inside passage 32.

The plurality of disks 181 have a holed disk shape having an outer diameter smaller than that of the seat section 118 of the piston 15. The damping valve main body 182 is configured of a dish 205 having a holed disk shape that is capable of sitting on the seat section 118 of the piston 15, and an annular seal member 206 formed of a rubber material and fixed to the outer circumferential side of the disk 205 opposite to the piston 15. The damping valve main body 182 and the sent section 118 of the piston 15 configure a damping valve 207 of the compression-side installed between the passage 112 installed at the piston 15 and the pilot chamber 200 installed at the seat member 184 configured to suppress a flow of fire liquid oh generated by movement of the piston 15 toward the compression-side and generate damping force. Accordingly, the damping valve 207 is a disc valve. Further, a portion passing in the axial direction is not formed in the disk 205 other than the central hole through which the attachment shaft section 50 of the piston rod 18 is inserted.

The seal member 206 comes in contact with the inner circumferential surface of the outer cylindrical section 193 of the seat member 184 and seals a gap between the damping valve main body 182 and the enter cylindrical section 193 of the seat member 184. Accordingly, the pilot chamber 200 between the damping valve main body 182 and the seat member 184 applies inner pressure to the damping valve main body 182 of the damping valve 207 in a direction of the piston 15, i.e., a closing direction of the valve abutting the seat section 118. The damping valve 207 is a pilot type damping valve having the pilot chamber 200. When the damping valve main body 182 is separated from the seat section 118 of the piston 15 to be opened, the liquid oil from the passage 112 flows toward the upper chamber 16 via a passage 208 in the radial direction between the piston 15 and the seat member 184.

The plurality of disks 183 have a holed disk shape having a diameter smaller than that of the disk 205, and the orifice 211 configured of an opening section is formed at the one of the disk 205 of the seat member 184. As described above, the inside of the large diameter hole section 196 of the seat member 184 comes in communication with the pilot chamber 200 via the orifice 211.

The plurality of disks 185 have a holed disk shape that is capable of sitting on the seat section 197 of the seat member 184. The plurality of disks 185 and the seat section 107 configure a disc valve 213 configured to suppress a flow of the liquid oil between the pilot chamber 200 installed at the seat member 184 and the upper chamber 16. An orifice 214 configured of an opening section configured to bring the pilot chamber 200 in communication with the upper chamber 16 is formed at the one of due plurality of disks 185 near the seat section 197 even in a state of abutting to the seat section 197. The disc valve 213 brings the pilot chamber 200 in communication with the upper chamber 16 at a passage area larger than that of the orifice 214 as the plurality of disks 185 are separated from the seat section 197. The valve restriction member 186 is configured of a plurality of annular members, and abuts the plurality of disks 185 to restrict deformation in the opening direction to an extent of regulation or more.

A nut 220 is threadedly engaged with the male screw 62 of the tip end of the tip end rod 27. The nut 220 has a main body section 222 having an outer circumferential section on which a fastening tool such as a wrench is mounted as a female screw 221 threadedly engaged with the male screw 62 is formed at the inner circumferential section, and an inner flange section 223 extending from one end in the axial direction of the main body section 222 inward in the radial direction.

The nut 220 is threadedly engaged with the tip end rod 27 while a side of the main body section 222 opposite to the inner flange section 223 is disposed near the valve restriction member 126. Upon fastening, the nut 220 sandwiches inner circumferential sides of the valve restriction member 126, the plurality of disks 125, the seat member 124, the plurality of disks 123, the damping valve main body 122, the plurality of disks 121, the piston 15, the plurality of disks 181, the damping valve main body 182, the plurality of disks 183, the seat member 184, the plurality of disks 185 and the valve restriction member 180 between the nut 220 and a stepped surface 225 of the intermediate shaft section 58 of the tip end rod 27 near the attachment shaft section 59.

As shown in FIG. 1, the metering pin 31 has a support flange section 230 supported by the base valve 23, a large diameter shaft section 232 having a diameter smaller than that of the support flange section 230 and extending from the support flange section 230 in the axial direction, a tapered shaft section 233 extending from a side of the large diameter shaft section 232 opposite to the support flange section 230 in the axial direction, and a small diameter shaft section 234 extending from a side of the tapered shaft section 233 opposite to the large diameter shaft section 232 in the axial direction. The large diameter shaft section 232 has a constant diameter, and as shown in FIG. 2, the small diameter shaft section 234 has a constant diameter smaller than the diameter of the large diameter shaft section 232. The tapered shaft section 233 continues to an end section of the large diameter shaft section 232 near the small diameter shaft section 234 and to an end section of the small diameter shaft section 234 near the large diameter shaft section 232, and has a tapered shape having a diameter gradually decreased toward the small diameter shaft section 234 to connect these.

The metering pin 31 is inserted info the insertion hole 30 configured of the inside of the inner flange section 223 of the nut 220, the penetration hole 29 of the piston rod 18 and the insertion hole 28. The metering pin 31 forms the rod-inside passage 32 between the metering pin 31 and the piston rod 18. A gap between the inner flange section 223 of the nut 220 and the metering pin 31 becomes an orifice (a second passage) 235 configured to bring the rod-inside passage 32 in communication with the lower chamber 17. The passage area of the orifice 235 becomes maximally decreased to substantially restrict circulation of the liquid oil when the large diameter shaft section 232 matches a position in the axial direction, with the inner flange section 223. In addition, the passage area of the orifice 235 becomes maximally increased to allow the circulation of the liquid oil when the small diameter shaft section 234 matches a position in the axial direction with the inner flange section 223. Further, the orifice 235 is configured such that the passage area is gradually increased toward the small diameter shaft section 234 of the tapered shaft section 233 when the tapered shaft section 233 matches a position in the axial direction with the inner flange section 223. Since the nut 220 is integrally moved with the piston rod 18, the inner flange section 223 of the nut 220 and the metering pin 31 configure a passage area adjustment mechanism 236 configured to adjust a passage area of the orifice 235 depending on a position of the piston rod 18, and the orifice 235 becomes a variable orifice having a passage area varied based on the position of the piston rod 18. In other words, the passage area adjustment mechanism 236 adjusts the passage area of the orifice 235 by the metering pin 31.

The passage area of the orifice 235 with respect to a stroke position of the shock absorber by the passage area adjustment mechanism 236 is represented as a broken line shown in FIG. 4. That is, the passage area of the orifice 235 becomes a minimum constant value as the inner flange section 223 and the large diameter shaft section 232 match the position in the axial direction at a position closer to the compression-side than a predetermined position S1 of the compression-side, is proportionally increased toward, the extension-side as the inner flange section 223 and the tapered shaft section 233 match a position in the axial direction from the prescribed position S1 to a predetermined position S2 of the extension-side with a neutral position interposed therebetween, and becomes a maximum constant value as the inner flange section 223 and the small diameter shaft section 234 match a position in the axial direction at a position closer to the extension-side than the prescribed position S2.

As shown in FIG. 1, the above-mentioned base valve 23 is installed between the bottom section of the outer casing 12 and the cylinder 11. The base valve 23 has a base valve member 241 having substantially a disk shape and configured to partition the lower chamber 17 and the reservoir chamber 13, a disk 242 installed at a lower side of the base valve member 241, i.e., installed near the reservoir chamber 13, a disk 243 installed on the base valve member 241, i.e., installed near the lower chamber 17, an attachment pin 244 configured to attach the disk 242 and the disk 243 to the base valve member 241, a locking member 245 mounted on an outer circumferential side of the base valve member 241, and a support plate 246 configured to support the support flange section 230 of the metering pin 31. The attachment pin 244 sandwiches central sides in the radial direction of the disk 242 and the disk 243 between the attachment pin 244 and the base valve member 241.

The base valve member 241 has a pin insertion hole 248 formed at a center in the radial direction and through which the attachment pin 244 is inserted, a plurality of passage holes 249 formed outside the pin insertion hole 248 and configured to allow the liquid oil to flow between the lower chamber 17 and the reservoir chamber 13, and a plurality of passage holes 250 formed outside the passage holes 249 and configured to allow the liquid oil to flow between the lower chamber 17 and the reservoir chamber 13. The disk 242 near the reservoir chamber 13 restricts a flow of the liquid oil from the reservoir chamber 13 into the lower chamber 17 via the passage hole 249 of an inner side while allowing a flow of the liquid oil from the lower chamber 17 into the reservoir chamber 13 via the passage hole 249 of the inner side. The disk 243 restricts a flow of the liquid oil from the Lower chamber 17 into the reservoir chamber 13 via the passage hole 250 of the outer side while allowing a flow of the liquid oil from the reservoir chamber 13 into the lower chamber 17 via the passage hole 250 of the outer side.

The disk 242 configure a damping valve 252 of the compression-side with the base valve member 241 configured to open the valve at the shrinkage stroke to allow the liquid oil to flow from the lower chamber 17 into the reservoir chamber 13 and generate damping force. The disk 243 configures a suction valve 253 with the base valve member 241 configured to open the valve at tire extension stroke and allow the liquid oil to flow from the reservoir chamber 13 into the lower chamber 17. Further, the suction valve 253 functions to allow a flow of the liquid without substantially generating the damping force from the lower chamber 17 to the reservoir chamber 13 such that extra liquid generated by mainly advancement of the piston rod 18 into the cylinder 11 is discharged, from a relation with the damping force generating mechanism 115 of the compression-side installed at the piston 15.

The locking member 245 has a tubular shape, and the base valve member 241 is fitted into the inside thereof. The base valve member 241 is fitted into the inner circumferential section of the lower end of the cylinder 11 via the locking member 245. A locking flange section 255 extending inward in the radial direction is formed at the end section of the locking member 245 near the piston 15. The support plate 246 has an outer circumferential section locked to the locking flange section 255 at a side opposite to the piston 15 and an inner circumferential section locked to the support flange section 230 of the metering pin 31 at a side near the piston 15. Accordingly, the locking member 245 and the support plate 246 hold the support flange section 230 of the metering pin 31 in a state of abutting on the attachment pin 244.

Figure 5:
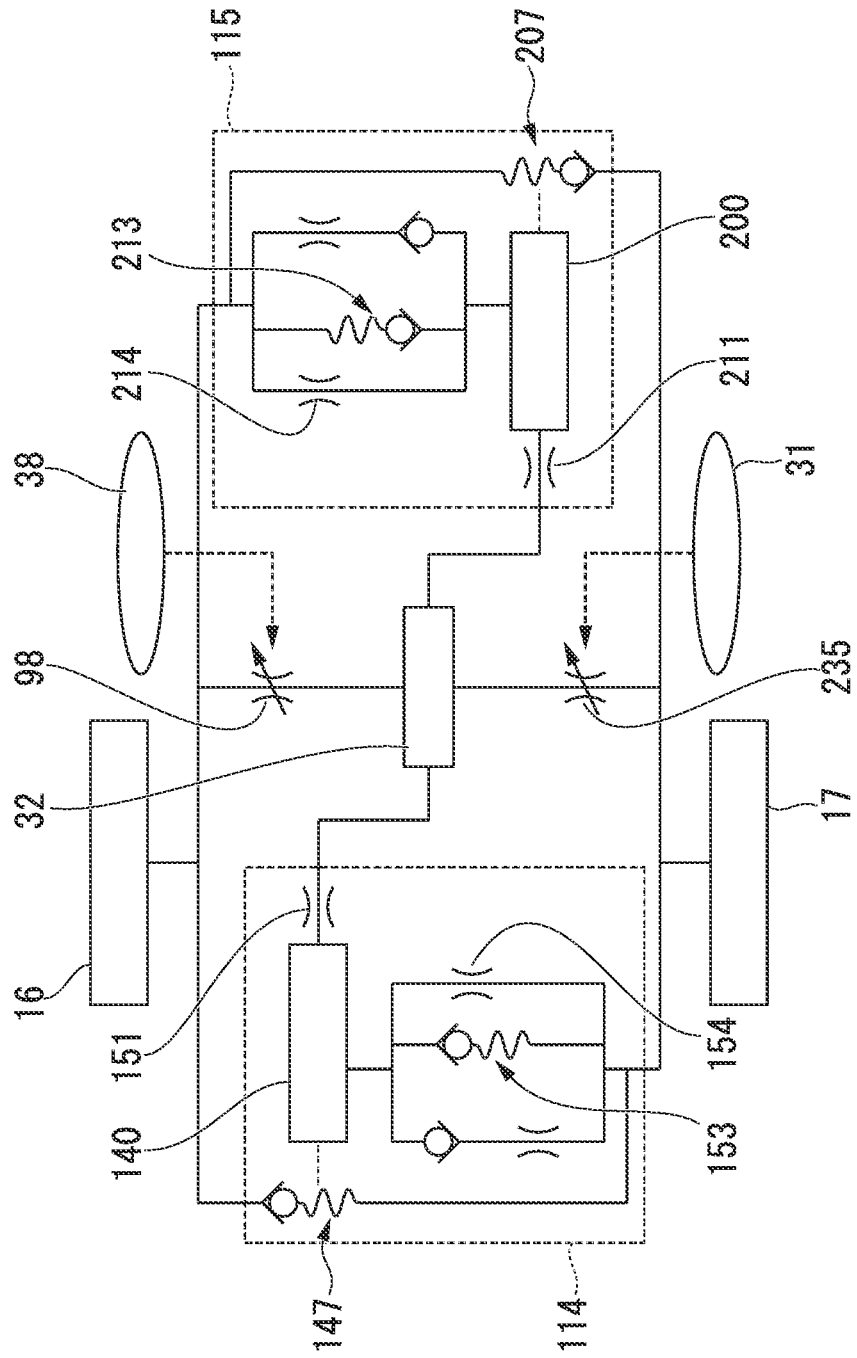
FIG. 5 is a hydraulic circuit diagram of the shock absorber of the first embodiment according to the present invention.

A hydraulic circuit diagram of the first embodiment having the above-mentioned configuration is shown in FIG. 5. That is, the damping force generating mechanism 114 of the extension-side and the damping force generating mechanism 115 of the compression-side are installed in parallel between the upper chamber 16 and the lower chamber 17, and the rod-inside passage 32 comes in communication with the upper chamber 16 via the orifice 98 controlled by the rebound spring 38 and comes in communication with the lower chamber 17 via the orifice 235 controlled by the metering pin 31. Then, the pilot chamber 140 of the damping force generating mechanism 114 of the extension-side comes in communication with the rod-inside passage 32 via the orifice 151, and the pilot chamber 200 of the damping force generating mechanism 115 of the compression-side comes in communication with the rod-inside passage 32 via the orifice 211.

In the shock absorber of the first embodiment, in a maximum length-side prescribed range in which the piston rod 18 extends to the outside of the cylinder 11 farther than the maximum length-side predetermined position, the shock absorbing body 39 abuts the rod guide 21, and the spring mechanism 100 including the rebound spring 38 is decreased in length. Accordingly, as shown at a left side of the centerline of either of FIGS. 2 and 3, the passage area adjustment mechanism 101 collapses the wave spring 72 by the transmission member 71 of the spring mechanism 100 to bring the opening/closing disk 86 in contact with the abutting disk 88 to close the passage 99. In addition, in the maximum length-side predetermined range, the passage area adjustment mechanism 236 matches the inner flange section 223 at a position in the axial direction of the small diameter shaft section 234 of the metering pin 31 to maximize the passage area of the orifice 235. In the maximum length-side predetermined range, the rod-inside passage 32 comes in communication with the lower chamber 17 via the orifice 235, and the pilot chamber 140 of the damping force generating mechanism 114 of the extension-side and the pilot chamber 200 of the damping force generating mechanism 115 of the compression-side come in communication with the lower chamber 17 via the orifice 235, the rod-inside passage 32 and the pilot chamber introduction passages 141 and 201.

In the maximum length-side predetermined range, in the extension stroke in which the piston rod 18 extends toward the outside of the cylinder 11, the piston 15 moves toward the upper chamber 16, the pressure of the upper chamber 16 is increased, and the pressure of the lower chamber 17 is decreased. Then, the pressure of the upper chamber 16 is applied to the damping valve main body 122 of the damping valve 147 of the damping force generating mechanism 114 of the extension-side via the passage 111 of the extension-side formed in the piston 15. Here, since the pilot chamber 140 configured to apply pilot pressure to the damping valve main body 122 in a direction of the seat section 117 comes in communication with the lower chamber 17 via the orifice 235, the rod-inside passage 32 and the pilot chamber introduction passage 141, the pilot pressure becomes similar to a pressure -of the lower chamber 17 and the pilot pressure is decreased. Accordingly, the damping valve main body 122 to increase received pressure difference and is opened to be easily separated from the seat section 117, and allows the liquid oil to flow toward the lower chamber 17 via the passage 148 in the radial direction between piston 15 and the seat member 124. Accordingly, the damping force is decreased. That is, the extension-side damping force becomes soft.

In addition, in the maximum length-side predetermined range, in the compression stroke in which the piston rod 18 enters the cylinder 11, the piston 15 moves toward the lower chamber 17, the pressure of the lower chamber 17 is increased, and the pressure of the upper chamber 16 is decreased. There the hydraulic pressure of the lower chamber 17 is applied to the damping valve main body 182 of the damping valve 207 of the damping force generating mechanism 115 of the compression-side via the passage 112 of the compression-side formed at the piston 15. Here, since the pilot chamber 200 configured to apply a pilot pressure to the damping valve main body 182 in a direction of the seat section 118 comes in communication: with the lower chamber 17 via the orifice 235, the rod-inside passage 32 and the pilot chamber introduction passage 201, the pilot pressure becomes similar to a pressure of the lower chamber 17, and the pilot pressure is also increased with an increase in pressure of the lower chamber 17.

In this state, when the piston, speed is low, since the increase in pressure of the pilot chamber 200 can follow the increase in pressure of the lower chamber 17, the damping valve main body 182 is reduced in the received pressure difference and cannot be easily separated from the seat section 118. Accordingly, the liquid oil from the lower chamber 17 flows to the upper chamber 16 from the orifice 235, the rod-inside passage 32 and the pilot chamber introduction passage 201 through the pilot chamber 200 via the orifice 214 of the plurality of disks 185 of the disc valve 213, and a damping force of orifice properties (the damping force is in proportion to a square of the piston speed) is generated. For this reason, in properties of the damping force with respect to the piston speed, an increase ratio of the damping force is relatively increased with respect to an increase in piston speed.

In addition, even when the piston speed is increased more than the above, the damping valve main body 182 cannot be easily separated from the seat section 118, the liquid oil from the lower chamber 17 flows to the upper chamber 16 from the orifice 235, the rod-inside passage 32 and the pilot chamber introduction passage 201 through the pilot chamber 200 and flows through a space between the seat section 197 and the plurality of disks 185 while opening the plurality of disks 185 of the disc valve 213, and a damping force of valve characteristics (the damping force is substantially proportional to the piston speed) is generated. For this reason, in the properties of the damping force with respect to the piston speed, an increase ratio of the damping force is slightly decreased with respect to the increase in piston speed. As described above, the damping force of the compression stroke is increased in comparison with the damping force of the extension stroke, and the compression-side damping force becomes hard.

Further, even in the compression stroke of the maximum length-side predetermined range, upon generation of an impact shock generated due to a step difference of the road surface, when the piston speed is in a higher speed region, the increase in pressure of the pilot chamber 200 cannot follow the increase in pressure of the lower chamber 17, and a force due to the pressure difference applied to the damping valve main body 182 of the damping valve 207 of the damping force generating mechanism 115 of the compression-side has a relation in which a force in the opening direction applied from the passage 112 formed in the piston 15 is larger than a force in the closing direction applied from the pilot chamber 200. Accordingly, in this region, since the damping valve 207 is opened depending on the increase in piston speed and the damping valve main body 182 is separated from the seat section 118, and the liquid oil flows into the upper chamber 16 via the passage 208 in the radial direction between the piston 15 and the seat member 184 in addition to the flow into the upper chamber 16 passing between the seat section 197 of the disc valve 213 and the plurality of disks 185, an increase in damping force can be suppressed. In the properties of the damping force with respect to the piston speed at this time, an increase ratio of the damping force with respect to the increase in piston speed is little. Accordingly, upon generation of the impact shock generated due to the step difference of the road surface or the like at which the piston speed is high and the frequency is relatively high, as the increase in damping force with respect to the increase in piston speed is suppressed as described above, the shock can be sufficiently absorbed.

Figure 6:
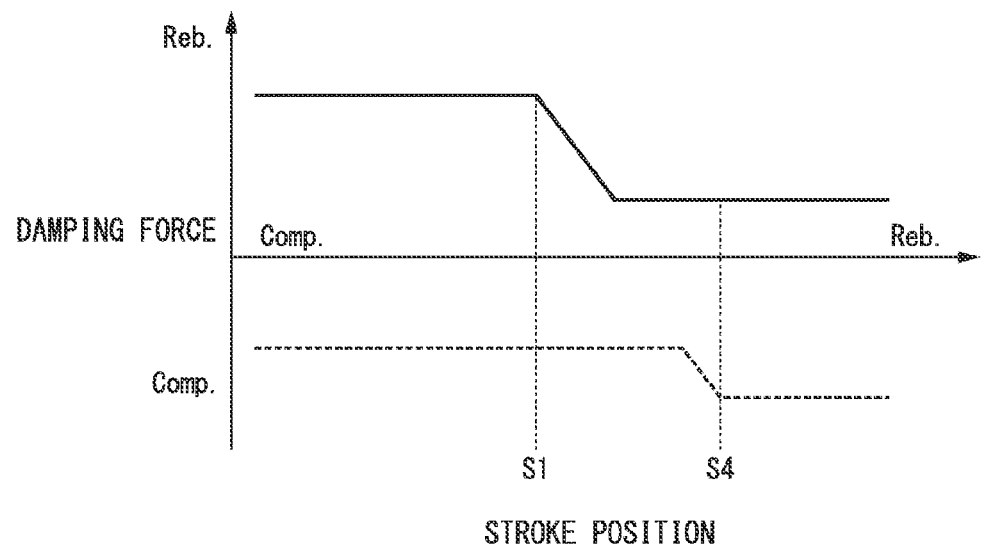
FIG. 6 is a characteristic diagram showing a relation between a stroke position and damping force of the shock absorber of the first embodiment according to the present invention.
Figure 7:
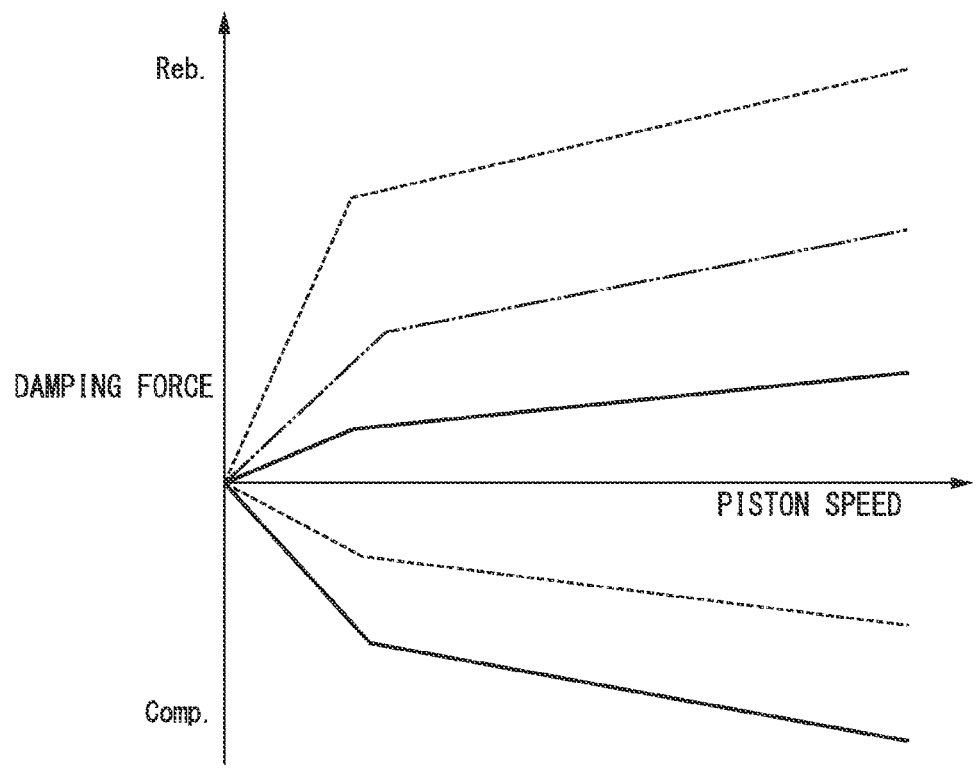
FIG. 7 is a characteristic diagram showing a relation between a piston speed and damping force of the shock absorber of the first embodiment according to the present invention.

The aforementioned maximum length-side predetermined range in which the piston rod 18 extends to the outside of the cylinder 11 farther than the maximum length-side predetermined position is a range closer to the extension-side (a right side of FIG. 6) than a position S4 shown in FIG. 6, and has maximum length-side properties in which an extension-side damping force becomes soft as shown by a solid fine of FIG. 6 and a compression-side damping force becomes hard as shown by a broken line of FIG. 6. As shown by a solid line of FIG. 7, whether the piston speed is low or high, the range has the maximum length-side properties in which the extension-side damping force becomes soft and the compression-side damping force becomes hard.

On the other hand, in the minimum length-side predetermined range in which the piston rod 18 enters the inside of the cylinder 11 further than the minimum length-side predetermined position, the rebound spring 38 does not shrink, and as shown at a right side of the centerline of FIGS. 2 and 3, the passage area adjustment mechanism 101 separates the opening/closing disk 86 from the abutting disk 88 to maximize the passage area of the orifice 98 of the passage 99 without being pressed by the spring mechanism 100 including the rebound spring 38. In addition, in the minimum length-side predetermined range, the passage area adjustment mechanism 236 matches the inner flange section 223 at a position in the axial direction of the large diameter shaft section 232 of the metering pin 31 to close the orifice 235. In the minimum length-side predetermined range, the rod-inside passage 32 comes in communication with the upper chamber 16 via the passage 99, and the pilot chamber 140 of the damping force generating mechanism 114 of the extension-side and the pilot chamber 200 of the damping force generating mechanism 115 of the compression-side come in common communication with the upper chamber 16 via the rod-inside passage 32.

In the minimum length-side predetermined range, at the extension stroke in which the piston rod 18 extends to the outside of the cylinder 11, the piston 15 moves toward the upper chamber 16, the pressure of the upper chamber 16 is increased and the pressure of the lower chamber 17 is decreased. Then, the pressure of the upper chamber 16 is applied to the damping valve main body 122 of the damping valve 147 of the damping force generating mechanism 114 of the extension-side via the passage 111 of the extension-side formed at the piston 15. Here, since the pilot chamber 140 configured to apply the pilot pressure in the direction of the seat section 117 to the damping valve main body 122 comes in communication with the upper chamber 16 via the passage 99, the rod-inside passage 32 and the pilot chamber introduction, passage 141, the pressure state of the pilot chamber 140 becomes similar to that of the upper chamber 16, and the pilot pressure is also increased with the increase in pressure of the upper chamber 16.

In this state, when the piston speed is low, since the increase in pressure of the pilot chamber 140 can follow the increase in pressure of the upper chamber 16, the damping valve main, body 122 has a received pressure difference, which is decreased, and cannot be easily separated from the seat section 117. Accordingly, the liquid oil from the upper chamber 16 passes from the passage 99, the rod-inside passage 32 and the pilot chamber introduction passage 141 through the pilot chamber 140 and flows into the lower chamber 17 via the orifice 154 of the plurality of disks 125 of the disc valve 153, and a damping force of orifice properties (the damping force is substantially proportional to a square of the piston speed). For this reason, in the properties of the damping force with respect to the piston speed, an increase ratio of the damping force is relatively increased with respect to the increase in piston speed.

In addition, even when the piston speed is higher than that described above, the damping valve main body 122 is not separated from the seat section 117, the liquid oil from the upper chamber 16 passes through the pilot chamber 140 from the passage 99, the rod-inside passage 32 and the pilot chamber introduction passage 141, passes between the seat section 137 and the plurality of disks 125 while opening the plurality of disks 125 of the disc valve 153, and flows into the lower chamber 17, and a damping force of valve characteristics (the damping force is substantially proportional to the piston speed) is generated. For this reason, in the properties of the damping force with respect to the piston speed, an increase ratio of the damping force with respect to the increase in piston speed is slightly decreased. As described above, the damping force of the extension stroke is increased, and the extension-side damping force becomes hard.

In addition, in the minimum length-side predetermined range, at the compression stroke in which the piston rod 18 enters the inside of the cylinder 11, the piston 15 moves toward the lower chamber 17, the pressure of the lower chamber 17 is increased and the pressure of the upper chamber 16 is decreased. Then, the hydraulic pressure of the lower chamber 17 is applied to the damping valve main body 182 of the damping valve 207 of the damping force generating mechanism 115 of the compression-side via the passage 112 of the compression-side formed in the piston 15. Here, since the pilot chamber 200 configured to apply the pilot pressure in the direction of the seat section 118 to the damping valve main body 182 comes in communication with the upper chamber 16 via the passage 99, the rod-inside passage 32 and the pilot chamber introduction passage 201, the pressure state of the pilot chamber 200 becomes similar to that of the upper chamber 16, and the pilot pressure is decreased. Accordingly, the damping valve main body 182 has a received pressure difference, which is increased, is opened to be relatively easily separated from the seat section 118, and allows the liquid oil to flow toward the upper chamber 16 side via the passage 208 in the radial direction between the piston 15 and the seat member 184. As described above, the damping force of the compression stroke is decreased in comparison with the damping force of the extension stroke, and the compression-side damping force becomes soft.

The aforementioned minimum length-side predetermined range in which the piston rod 18 enters the inside of the cylinder 11 further than the minimum length-side predetermined position is a range closer to the compression-side (a left side of FIG. 6) than the position S1 of FIG. 6, and has minimum length-side properties in which the extension-side damping force becomes hard as shown by a solid line of FIG. 6 and the compression-side damping force becomes soft as shown by a broken line of FIG. 6. As shown by a broken line of FIG. 7, whether the piston speed is low or high, the range has the minimum length-side properties in which the extension-side damping force becomes hard and the compression-side damping force becomes soft. In addition, for example, when the piston speed is in a neutral position, as the extension-side is shown by a two-dot chain line and the compression-side is shown by a broken line in FIG. 7, whether the piston speed is low or high, the extension-side damping force becomes medium and the compression-side damping force becomes soft.

The shock absorber of the first embodiment can obtain the above-mentioned position-sensitive damping force variation properties.

While the shock absorber disclosed in the above-mentioned Patent Literatures 1 and 2 is a position-sensitive shock absorber, a spring load of the spring is directly applied to the disc valve configured to open/close the passage formed in the piston to increase a valve opening pressure, and in order to adjust the damping force at the position of the extension-side and the position of the compression-side, two springs are needed at the extension-side and the compression-side. In addition, in order to increase a damping force variable width, while a spring rate should be increased, when the spring rate is increased, application of a spring reaction force is also increased, the stroke of the piston rod 18 is reduced while the damping force is abruptly varied, and ride comfort of the shock-absorber-mounted vehicle is degraded. In addition, setting of increasing the damping force variable width and reducing the reaction force cannot be performed, and properties of the shock absorber cannot be freely designed.

On the other hand, according to the above-mentioned first embodiment, in the maximum length-side predetermined range in which the piston rod 18 extends to the outside of the cylinder 11 farther than the maximum length-side predetermined position, the maximum length-side properties in which the extension-side damping force becomes soft and the compression-side damping force becomes hard, and in the minimum length-side prescribed range in which the piston rod 18 enters the inside of the cylinder 11 further than the minimum length-side predetermined position, the minimum length-side properties in which the extension-side damping force becomes hard and the compression-side damping force becomes soft can be obtained by the passage area adjustment mechanism 101 configured to adjust the passage area of the orifice 98 based on the position of the piston rod 18 and the passage area adjustment mechanism 236 configured to adjust the passage area of the orifice 235 based on the position of the piston rod 18. In this way, since the passage areas of the orifices 98 and 235 through which the liquid oil flows are adjusted, the damping force can be smoothly varied, and the ride comfort of the shock-absorber-mounted vehicle becomes better. In addition, even in a design step, in the passage area adjustment mechanism 101, the damping force properties can be adjusted by varying only the properties of the opening/closing disk 86 or an area of the notch 87A of the intermediate disk 87 without varying the spring rate of the rebound spring 38 while the reaction force properties are hardly varied, and in addition, in the passage area adjustment mechanism 236, as a profile of the metering pin 31 is varied, the damping force properties can be varied without varying the reaction force properties. Accordingly, a degree of design freedom is increased, and tuning of the damping characteristics can also be easily performed. Aspects of the following embodiments also have the same effects.

Figure 8:
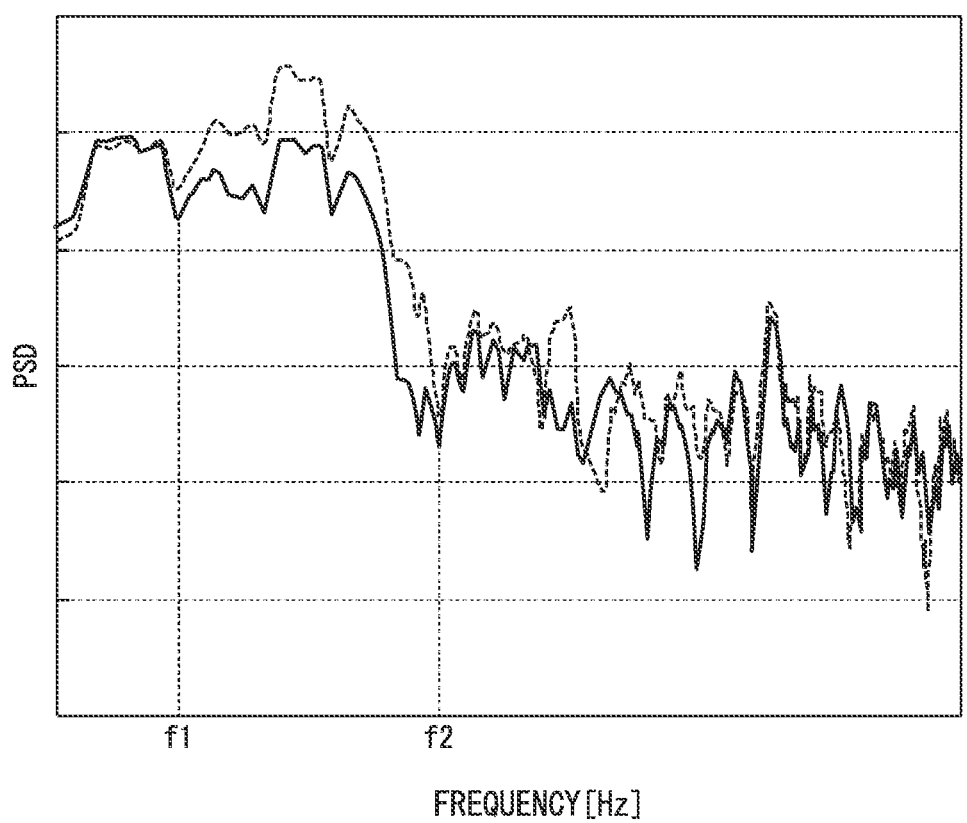
FIG. 8 is a characteristic diagram showing a relation between frequency and acceleration on a spring when a vehicle on which the shock absorber of the first embodiment according to the present invention is mounted runs on a rough road.

In addition, as the maximum length-side properties and the minimum length-side properties are obtained, a force of exciting the sprung can be reduced (i.e., soft), a force of damping the sprung is increased (i.e., hard), and high quality ride comfort such as skyhook control can be obtained without using electronic control. FIG. 8 shows a sprung acceleration for describing an effect of ride comfort when a shock-absorber-mounted vehicle runs on a rough road. In comparison with the case in which a position-sensitive function shown by a broken line of FIG. 8 is not provided, according to the first embodiment having a position-sensitive shown by a solid line of FIG. 8, in particular, it will be appreciated that the sprung acceleration is decreased in a range in which a frequency is f1 to f2. This means that movement of sprung is reduced and the ride comfort is improved.

In addition, since the passage 99, the rod-inside passage 32, the pilot chamber introduction passage 141, the pilot chamber introduction passage 201 and the orifice 235 are connected to the pilot chamber 140 of the damping valve 147 installed at the passage 111 of the extension-side and the pilot chamber 200 of the damping valve 207 installed at the passage 112 of the compression-side, pilot pressures of the pilot chambers 140 and 200 of the damping valves 147 and 207 are regulated by the passage area adjustment mechanisms 101 and 236 to regulate valve opening pressures of the damping valves 147 and 207. That is, the passage area adjustment mechanisms 101 and 236 regulate the valve opening pressures of the damping valves 147 and 207 in response to the position of the piston rod 18. Accordingly, the damping force can be more smoothly varied.

In addition, since the passage area adjustment mechanism 236 adjusts the orifice 235 using the metering pin 31, the passage area can be stably adjusted in response to the position of the piston rod 18. Accordingly, stable damping force properties can be obtained.

In addition, since the passage area adjustment mechanism 101 has one end installed in the cylinder 11 that is capable of abutting the opening/closing disk 86 configured to open/close the passage 99 and the other end configured to bias the opening/closing disk 86 in the valve closing direction with a spring force of the spring mechanism 100 that is capable of abutting the rod guide 21 near the end section of the cylinder 11, the spring mechanism 100 configured to bias the opening/closing disk 86 in the valve closing direction may function as a mechanism configured to extend the piston rod 18.

Further, the diameter of the metering pin 31 is not limited to the two steps of the large diameter shaft section 232 and the small diameter shaft section 234 as described above but may be three steps or more. For example, in the case in which a middle diameter shaft section having a constant diameter smaller than that of the large diameter shaft section 232 and larger than that of the small diameter shaft section 234 is formed between the large diameter shaft section 232 and the small diameter shaft section 234, when the piston rod 18 is disposed in an intermediate predetermined range between the maximum length-side predetermined position and the minimum length-side predetermined position, the following properties can be obtained.

When the piston rod 18 is disposed in the intermediate predetermined range, similar to the minimum length-side predetermined range, the passage area adjustment mechanism 101 separates the opening/closing disk 86 from the abutting disk 88 to maximize the passage area of the passage 99 without being pressed by the spring mechanism 100, and the passage area adjustment mechanism 236 matches the inner flange section 223 at a position in the axial direction of the middle diameter shaft section of the metering pin 31 to increase the passage area of the orifice 235 to be larger than the minimum length-side prescribed range. In the intermediate predetermined range, pressures of the pilot chamber 140 and the pilot chamber 200 becomes closer to the pressure of the lower chamber 17 than that when the piston rod 18 is in the minimum length-side predetermined range.

Accordingly, in the extension stroke, since the pressure, of the pilot chamber 140 is lower than the minimum length-side predetermined range, a pressure difference received by the damping valve main body 122 of the damping valve 147 of the damping force generating mechanism 114 of the extension-side is larger than the minimum length-side predetermined range, and the damping force is in a medium state in which the damping force is lower than the hard slate when the damping force is in the minimum length-side predetermined range but higher than the soft state when the damping force is in the maximum length-side predetermined range. On the other hand, in the compression stroke, since the passage area adjustment mechanism 101 maximizes the passage area of the passage 99, similar to the minimum length-side predetermined range, the damping force is lowered and the damping force becomes soft.

[Second Embodiment]

Next, a second embodiment will be described with reference to FIGS. 9 and 10 focusing on differences from the first embodiment. Further, the same elements as the first embodiment will be referred to by the same names and will be designated by the same reference numerals.

In the second embodiment, the piston rod 18 is partially different. The piston rod 18 of second embodiment is not divided like the rod main body 26 and the tip end rod 27 of the first embodiment. In addition, the flange section 56 of the first embodiment is not formed at the outer circumferential side, but instead, a separate flange member 270 is attached thereto through swaging. Further, an insertion hole 271 configured to form the rod-inside passage 32 with the metering pin 31 has a constant diameter, and the passage holes 49 and 51 come in communication with the insertion hole 271. Further, the passage hole 50 of the first embodiment is not formed.

In addition, the tubular section 76 of the transmission member 71 is short in the axial direction, and the abutting section 80 of the first embodiment is not formed. In addition, the wave spring 72 is interposed between the base plate section 75 and the flange member 270. Further, the cylindrical projection 67 of the piston-side spring shoe 35 extends toward the piston 15 beyond the transmission member 71, and a plurality of passage holes 272 passing in the radial direction are formed in the projection 67.

In addition, the plurality of disks 85, the opening/closing disk 86, the plurality of intermediate disks 87, the abutting disk 88, the passage forming member 89, the intervention member 90 and the nut 91 of the first embodiment are not installed. Accordingly, the male screw 61 threadedly engaged with the nut 91 is not formed at the piston rod 18, and a distance between the passage hole 49 and the stepped surface 225 is reduced.

In addition, the damping valve main body 182, the plurality of disks 183, the seat member 184 and the valve restriction member 186 of the compression-side of the first embodiment are not installed, and the disk 185 of the compression-side directly abuts the seat section 118 of the piston 15 to open/close the passage 112. That is, the disk 185 of the compression-side and the seat section 118 of the piston 15 constitute the disc valve 213.

Then, a pressing mechanism 274 is interposed between the stepped surface 225 of the piston rod 18 and a side of the disk 185 opposite to the piston 15. The pressing mechanism 274 is constituted by a spring shoe 275, a spring shoe 276, and a pressing spring 277 formed of a coil spring.

The spring shoe 275 has a cylindrical section 280 and a flange section 281 extending from one end in the axial direction of the cylindrical section 280 outward in the radial direction. The spring shoe 275 abuts the stepped surface 225 at the end section near the flange section 281 in a state in which the attachment shaft section 59 of the piston rod 18 is inserted into the cylindrical section 280. The outer circumferential section of the cylindrical section 280 is configured of a large diameter section 282 near the flange section 281 and a small diameter section 283 opposite to the flange section 281, and the small diameter section 283 has a diameter smaller than that of the large diameter section 282.

The spring shoe 276 has a cylindrical section 286 and a flange section 287 extending from one end in the axial direction of the cylindrical section 286 outward in the radial direction, and a convex section 288 forming an annular shape at an intermediate position in the radial direction and protruding toward an opposite side of the cylindrical section 286 in the axial direction is formed at the flange section 287. The spring shoe 276 is fitted into the small diameter section 283 of the spring shoe 275 in the cylindrical section 286 and movable in the axial direction in a range of the small diameter section 283 in a state in which the flange section 287 is directed toward the piston 15.

The pressing spring 277 is interposed between the flange section 281 of the spring shoe 275 and the flange section 287 of the spring shoe 276, and brings the spring shoe 276 in contact with the disk 185 of the disc valve 213 at the convex section 288 from an opposite side of the piston 15. in addition, when a force from the disk 185 in a direction opposite to the piston 15 is received, the spring shoe 276 slides the small diameter section 283 of the spring shoe 275 against the biasing force of the pressing spring 277 and allows deformation in a direction away from the seat section 118 of the disk 185.

Figure 9:
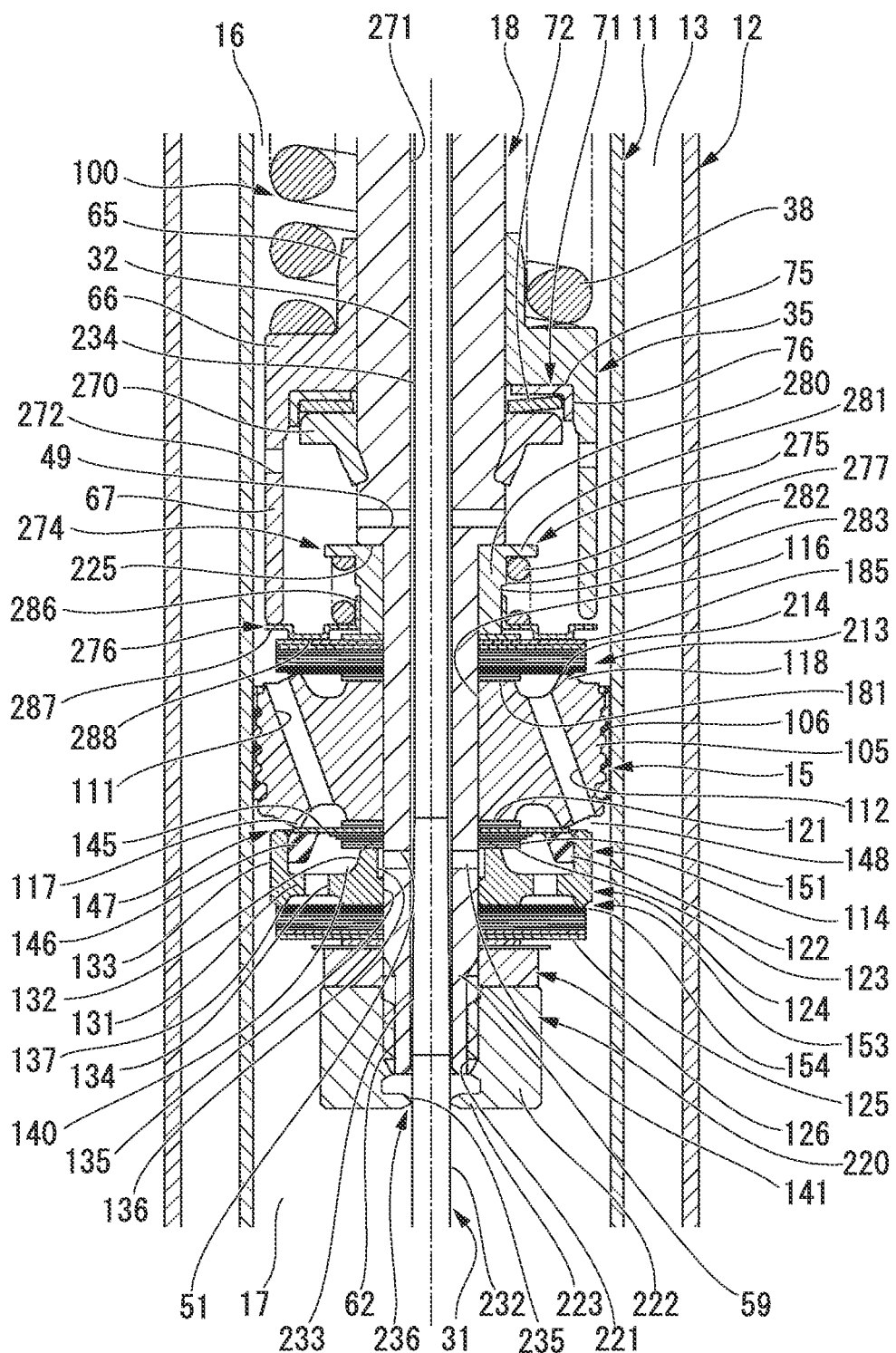
FIG. 9 is a cross-sectional view showing a major part of a shock absorber of a second embodiment according to the present invention.

When the piston rod 18 is moved in the protruding direction to a predetermined value or more, similar to the first embodiment, while the piston-side spring shoe 35 is moved in the direction of the piston 15 and the spring mechanism 100 shrinks the rebound spring 38, before that, as shown at a left side of a centerline of FIG. 9, the flange member 270 fixed to the piston rod 18 collapses the wave spring 72 with the transmission member 71 against the biasing force, and thus the transmission member 71 and the piston-side spring shoe 35 are slightly moved toward the flange member 270 in the axial direction. Accordingly, the cylindrical projection 67 of the piston-side spring shoe 35 abuts the flange section 287 of the spring shoe 276. Accordingly, the biasing force of the rebound spring 38 of the spring mechanism 100 is directly applied to the disk 185 of the disc valve 213 in the valve closing direction. In addition, when the biasing force of the spring mechanism 100 is released, as shown at a right side of the centerline of FIG. 9, the transmission member 71 and the piston-side spring shoe 35 are slightly moved toward an opposite side of the flange member 270 in the axial direction by the biasing force of the wave spring 72. Accordingly, the biasing force of the rebound spring 38 of the spring mechanism 100 is not applied to the disk 185 of the disc valve 213.

Figure 10:
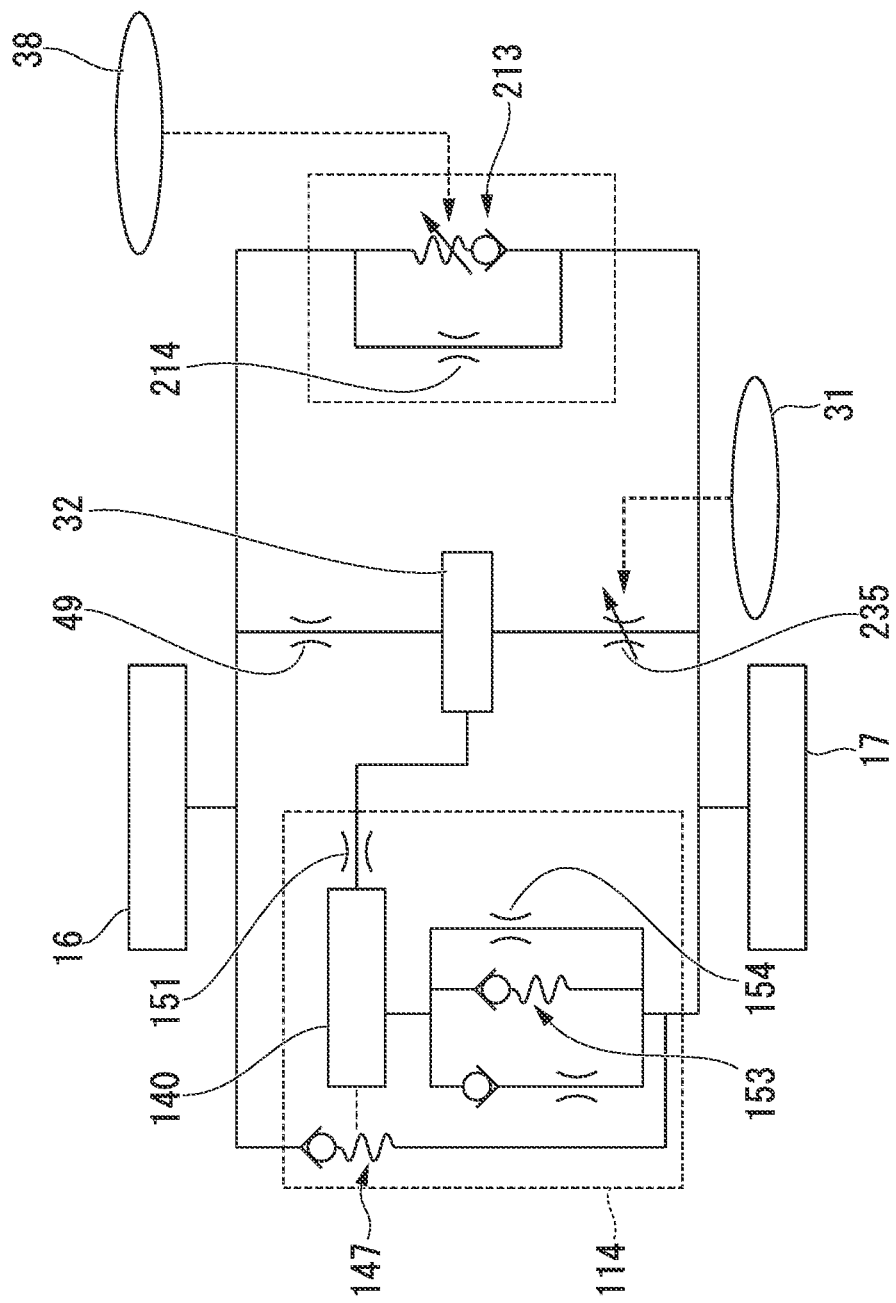
FIG. 10 is a hydraulic circuit diagram of the shock absorber of the second embodiment according to the present invention.

A hydraulic circuit diagram of the second embodiment having the above-mentioned configuration is shown in FIG. 10. That is, the damping force generating mechanism 114 of the extension-side and the disc valve 213 of the compression-side similar to the first embodiment are installed in parallel between the upper chamber 16 and the lower chamber 17. Then, while the pilot chamber 140 of the damping force generating mechanism 114 of the extension-side comes in communication with the rod-inside passage 32 via the orifice 151 similar to the first embodiment, the biasing force of the rebound spring 38 is applied to the disc valve 213 of the compression-side.

In the shock absorber of the second embodiment in the maximum length-side prescribed range in which the piston rod 18 extends to the outside of the cylinder 11 farther than the maximum length-side predetermined position, the spring mechanism 100 including the rebound spring 38 is shrunk. Accordingly, the piston-side spring shoe 35 of the spring mechanism 100 collapses the wave spring 72 between the spring shoe 35 and the spring shoe 276 via the transmission member 71, and biases the disk 185 of the disc valve 213 in the valve closing direction. In addition, the passage area adjustment mechanism 236 matches the inner flange section 223 at the position in the axial direction of the small diameter shaft section 234 of the metering pin 31, and the passage area of the orifice 235 is maximized. In the maximum length-side predetermined range, the rod-inside passage 32 comes in communication with the lower chamber 17 via the orifice 235, and on the other hand, comes in communication with the upper chamber 16 via the passage hole 49 of the piston rod 18 serving as the orifice.

In the maximum length-side predetermined range, at the extension stroke in which the piston rod 18 extends to the outside of the cylinder 11, the piston 15 moves toward the upper chamber 16, the pressure of the upper chamber 16 is increased and the pressure of the lower chamber 17 is decreased. Then, the pressure of the upper chamber 16 is applied to the damping valve main body 122 of the damping valve 147 of the damping force generating mechanism 114 of the extension-side via the passage 111 of the extension-side formed at the piston 15. Here, since the pilot chamber 140 configured to apply the pilot pressure to the damping valve main body 122 in the direction of the seat section 117 comes in communication with the lower chamber 17 via the orifice 235, the rod-inside passage 32 and the pilot chamber introduction passage 141 and comes in communication with the upper chamber 16 via the rod-inside passage 32, the passage hole 49 of the piston rod 18 and the passage hole 272 of the piston-side spring shoe 35, the pressure state of the pilot chamber 140 becomes the intermediate pressure state, and the pilot pressure is decreased. Accordingly, the damping valve main body 122 has an increased received pressure difference, is opened to be relatively easily separated from the seat section 117, and allows the liquid oil to flow toward the lower chamber 17 via the passage 148 in the radial direction between the piston 15 and the seat member 124. Accordingly, the damping force is decreased. That is, the extension-side damping force becomes soft.

In addition, in the maximum length-side predetermined range, at the compression stroke in which the piston rod 18 enters the inside of the cylinder 11, the piston 15 moves toward the lower chamber 17, the pressure of the lower chamber 17 is increased and the pressure of the upper chamber 16 is decreased. Then, the hydraulic pressure of the lower chamber 17 is applied to the disk 185 of the disc valve 213 of the compression-side via the passage 112 of the compression-side formed at the piston 15. Here, since the spring mechanism 100 applies the biasing force to the disk 185 via the spring shoe 276 in the direction of the seat section 118, the disc valve 213 cannot be easily opened, and becomes hard with the compression-side damping force being larger than the extension-side damping force of the extension stroke.

On the other hand, in the minimum length-side predetermined range in which the piston rod 18 enters the inside of the cylinder 11 further than the minimum length-side predetermined position, the rebound spring 38 does not shrink, and the disk 185 of the disc valve 213 is not pressed by the spring mechanism 100 including the rebound spring 38. In addition, the passage area adjustment mechanism 236 matches the inner flange section 223 at the position in the axial direction of the large diameter shaft section 232 of the metering pin 31 to close the orifice 235. In the minimum length-side predetermined range, as the rod-inside passage 32 comes in communication with the upper chamber 16 via the passage hole 49 of the piston rod 18, the pilot chamber 140 of the damping force generating mechanism 114 of the extension-side comes in communication with the upper chamber 16 only via the rod-inside passage 32.

In the minimum length-side predetermined range, at the extension stroke in which the piston rod 18 extends to the outside of the cylinder 11, the piston 15 moves toward the upper chamber 16 side, the pressure of the upper chamber 16 is increased and the pressure of the lower chamber 17 is decreased. Then, the pressure of the upper chamber 16 is applied to the damping valve main body 122 of the damping valve 147 of the damping force generating mechanism 114 of the extension-side via the passage 111 of the extension-side formed at the piston 15. Here, since the pilot chamber 140 configured to apply the pilot pressure in the direction of the seat section 117 to the damping valve main body 122 comes in communication with the upper chamber 16 via the passage hole 49 of the piston rod 18, the rod-inside passage 32 and the pilot chamber introduction passage 141, the pressure state of the pilot chamber 140 becomes similar to that of the upper chamber 16, and the pilot pressure is also increased with the increase in pressure of the upper chamber 16.

In this state, similar to the first embodiment, the damping valve main body 122 has a reduced received pressure difference, and is not easily separated from the seat section 117. Accordingly, the damping force of the extension stroke is increased, and the extension-side damping force becomes hard.

In addition, in the minimum length-side predetermined range, at the compression stroke in which the piston rod 18 enters the inside of the cylinder 11, the piston 15 moves toward the lower chamber 17, the pressure of the lower chamber 17 is increased and the pressure of the upper chamber 16 is decreased. Then, the hydraulic pressure of the lower chamber 17 is applied to the disk 185 of the disc valve 213 of the compression-side via the passage 112 of the compression-side formed at the piston 15. Here, since the disk 185 is not pressed by the spring mechanism 100 including the rebound spring 38, the disk 189 is easily separated from the seat section 118, and the liquid oil of the passage 112 of the compression-side opens the disk 185 while moving the spring shoe 276 of the pressing mechanism 274 against the biasing force of the pressing spring 277 and flows toward the upper chamber 16 via a gap between the piston 15 and the disk 185. Accordingly, the damping force of the compression stroke is decreased to be smaller than the damping force of the extension stroke, and the compression-side damping force becomes soft.

According to the shock absorber of the above-mentioned second embodiment, the damping force properties of the compression-side, which is position sensitive, can be obtained at a low cost.

[Third Embodiment]

Figure 11:
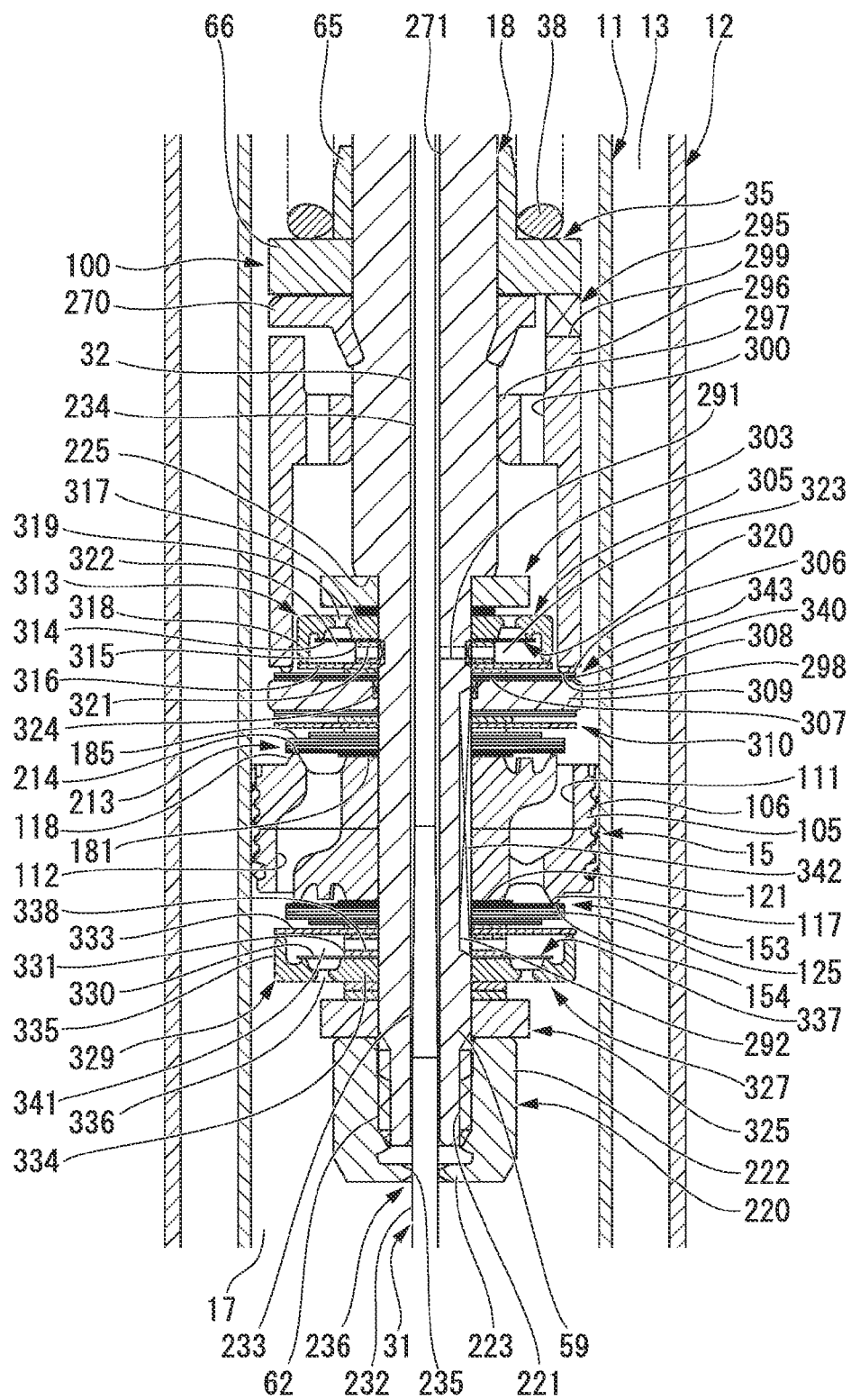
FIG. 11 is a cross-sectional view showing a major part of a shock absorber of a third embodiment according to the present invention.

Next, a third embodiment will be described with reference to mainly FIGS. 11 and 12 focusing on differences from the second embodiment. Further, the same elements as the second embodiment will be referred to by the same names and will be designated by the same reference numerals.

In the third embodiment, the piston rod 18 is partially different. In the piston rod 18 of the third embodiment the passage holes 49 and 51 of the second embodiment are not formed. Instead, a passage hole 291 serving as an orifice opened in the insertion hole 271 is formed in the attachment shaft section 59 in the radial direction. In addition, a passage groove 292 extending in the axial direction is formed in the piston rod 18 of the third embodiment at the outer circumferential section between the passage hole 291 and the male screw 62.

In addition, in the third embodiment, the transmission member 71 and the wave spring 72 of the second embodiment are not installed, and the projection 67 of the second embodiment is not formed at the piston-side spring shoe 35. Further, the pressing mechanism 274 of the second embodiment is not installed either. In addition, the damping valve main body 122, the plurality of disks 123, the seat member 124 and the valve restriction member 126 of the extension-side are not installed, and the plurality of disks 125 of the extension-side directly abut the seat section 117 of the piston 15 to open/close the passage 111. That is, the disk 125 of the extension-side and the seat section 117 of the piston 15 configure the disc valve 153.

In addition, in the third embodiment, a transmission member 295 is installed at the piston-side spring shoe 35 near the piston 15. The transmission member 295 has a cylindrical section 296 and an annular inner flange section 297 protruding from the intermediate section in the axial direction inward in the radial direction, and the piston rod 18 is fitted into the inner circumferential section of the inner flange section 297. Accordingly, the transmission member 295 slides along the outer circumferential surface of the piston rod 18. A plurality of protrusions 298 protruding toward the piston 15 are formed at the end section of the cylindrical section 296 near the piston 15. A passage groove 299 passing in the radial direction is formed at the end section in the axial direction of the cylindrical section 296 opposite to the protrusion 298. In addition, a plurality of passage holes 300 passing in the axial direction are formed in the inner flange section 297. The transmission member 295 abuts the abutting flange section 66 of the piston-side spring shoe 35 at the end section in the axial direction of the cylindrical section 296 opposite to the protrusion 298.

In addition, in the third embodiment, a valve restriction member 310 configured of an intervention member 303 configured of a plurality of annular members abutting the stepped surface 225, a check valve mechanism 305, an opening/closing disk (a valve section) 306 having a holed disk shape, an intermediate disk 307 having a holed disk shape, an abutting disk 308 having a holed disk shape, a base member 309 having a holed disk shape, and a plurality of annular members, in sequence from the stepped surface 225, is installed between the stepped surface 225 of the piston rod 18 near the attachment shaft section 59 and the disk 185.

The check valve mechanism 305 is disposed inside the cylindrical section 296 of the transmission member 295 and has a seat member 313, a valve disk 314, a passage forming member 315 and a lid section 316 in sequence in the axial direction. The seat member 313 is configured of a base plate section 317 having a holed disk shape and a cylindrical section 318 protruding from the outer circumferential section of the base plate section 317 toward one side in the axial direction, and a plurality of passage holes 319 passing in the axial direction are formed in the base plate section 317. The valve disk 314 abuts and is separated from the base plate section 317 to close and open the passage hole 319, and the valve disk 314 and the base plate section 317 configure a check valve 320. The check valve 320 is disposed such that the passage hole 319 is opened in the upper chamber 16, and allows a flow of the liquid oil from the upper chamber 16 side only. That is, the check valve 320 becomes a check valve of the extension-side, and thus the check valve mechanism 305 also becomes a check valve mechanism of the extension-side. A plurality of passage holes 321 passing in the radial direction are formed in the passage forming member 315, and the passage holes 321 come in communication with the passage hole 291 of the piston rod 18. The lid section 316 is configured of a plurality of holed disk-shaped members, abuts the cylindrical section 318 of the seat member 313 opposite to the base plate section 317, and divides an internal passage 322 in the seat member 313.

The internal passage 322 of the check valve mechanism 305, the passage hole 321 of the passage forming member 315, the passage hole 291 of the piston rod 18, the rod-inside passage 32 and the orifice 235 configure a passage (a second passage) 323 configured to bring the upper chamber 16 in communication with the lower chamber 17. Accordingly, as the metering pin 31 opens/closes the orifice 235, the passage 323 configured to bring the upper chamber 16 in communication with the lower chamber 17 is opened/closed.

The opening/closing disk 306 has an outer diameter that is capable of abutting the protrusion 298 of the transmission member 295. The intermediate disk 307 has an outer diameter smaller than that of the opening/closing disk 306. The abutting disk 308 has the same outer diameter as the opening/closing disk 306. The base member 309 has an outer diameter slightly larger than that of the abutting disk 308. A passage 324 configured to bring the outside in the radial direction of the intermediate disk 307 in communication with the passage groove 292 of the piston rod 18 is formed at the intermediate disk 307, the abutting disk 308 and the base member 309. The passage 324 is configured of a notch section formed at the outer circumferential section of the intermediate disk 307, a notch section formed at the inner circumferential section of the abutting disk 308, and a groove section formed at the inner circumferential section of the base member 309 near the abutting disk 308. The valve restriction member 310 abuts the plurality of disks 185 of the compression-side to restrict deformation in the opening direction to a regulation level or more.

In addition, in the third embodiment, an intervention member 325 configured of a plurality of annular members and a check valve mechanism 327 are installed between the disk 125 of the attachment shaft section 59 of the piston rod 18 and the nut 220 in sequence born the nut 220.

The check valve mechanism 327 has a seal member 329, a valve disk 330, a passage forming member 331 and a lid section 333 in sequence in the axial direction. The seat member 329 is configured of a base plate section 334 having a holed disk shape and a cylindrical section 335 protruding from the outer circumferential section of the base plate section 334 to the one side in the axial direction, and a plurality of passage holes 336 passing in the axial direction are formed in the base plate section 334. The valve disk 330 abuts and is separated from the base plate section 334 to close and open the passage hole 336, and the valve disk 330 and the base plate section 334 configure a check valve 337. The check valve 337 is disposed such that the passage hole 336 is opened in the lower chamber 17, and allows only allow of the liquid oil from the lower chamber 17 side. That is, the check valve 337 becomes a check valve of the compression-side, and thus tire check valve mechanism 327 also becomes a check valve mechanism of the compression-side. A plurality of passage holes 338 passing in the radial direction are formed in the passage forming member 331, and the passage holes 338 come in communication with the passage groove 292 of the piston rod 18. The lid section 333 is configured of a plurality of holed desk-shaped members, abuts the cylindrical section 335 of the seat member 329 opposite to the base plate section 334, and divides an internal passage 341 in the seat member 329.

The above-mentioned opening/closing disk 306 separates the piston-side spring shoe 35 from the flange member 270 in the axial direction via the transmission member 295 while being separated from the abutting disk 308. A gap between the opening/closing disk 306 and the abutting disk 308 configures an orifice 340. The orifice 340, the intermediate disk 307, the passage 324 of the abutting disk 308 and the base member 309, the passage groove 292 of the piston rod 18, the passage hole 338 of the passage forming member 331 and the internal passage 341 of the check valve mechanism 327 configure a passage (a second, passage) 342 configured to bring the upper chamber 16 in communication with the lower chamber 17.

When the piston-side spring shoe 35 is moved to abut the flange member 270 by the biasing force of the spring mechanism 100 including the rebound spring 38, the transmission member 295 abutting the piston-side spring shoe 35 brings the opening/closing disk 306 in contact with the abutting disk 40 to close the orifice 340, and blocks communication between the upper chamber 16 and the lower chamber 17 via a passage 342 including the orifice 340.

The transmission member 295, the piston-side spring shoe 35, the rebound spring 38, and the rod guide-side spring shoe 36 and the shock absorbing body 39 shown in FIG. 1 configure the spring mechanism 100 installed in the cylinder 11 having one end configured to abut the opening/closing disk 306 and the other end configured to abut the rod guide 21 near the end section of the cylinder 11. As shown in FIG. 11, the spring mechanism 100 biases the opening/closing disk 306 in the valve closing direction by the spring force. Then, the spring mechanism 100, the opening/closing disk 306 configured to open/close the orifice 340, and the abutting disk 308 configure the passage area adjustment mechanism 343 configured to adjust the orifice 340, i.e., the passage area of the passage 342, in response to the biasing force of the rebound spring 38 varied depending on the position of the piston rod 18. In other words, the orifice 340 is a variable orifice having a variable passage area.

Figure 12:
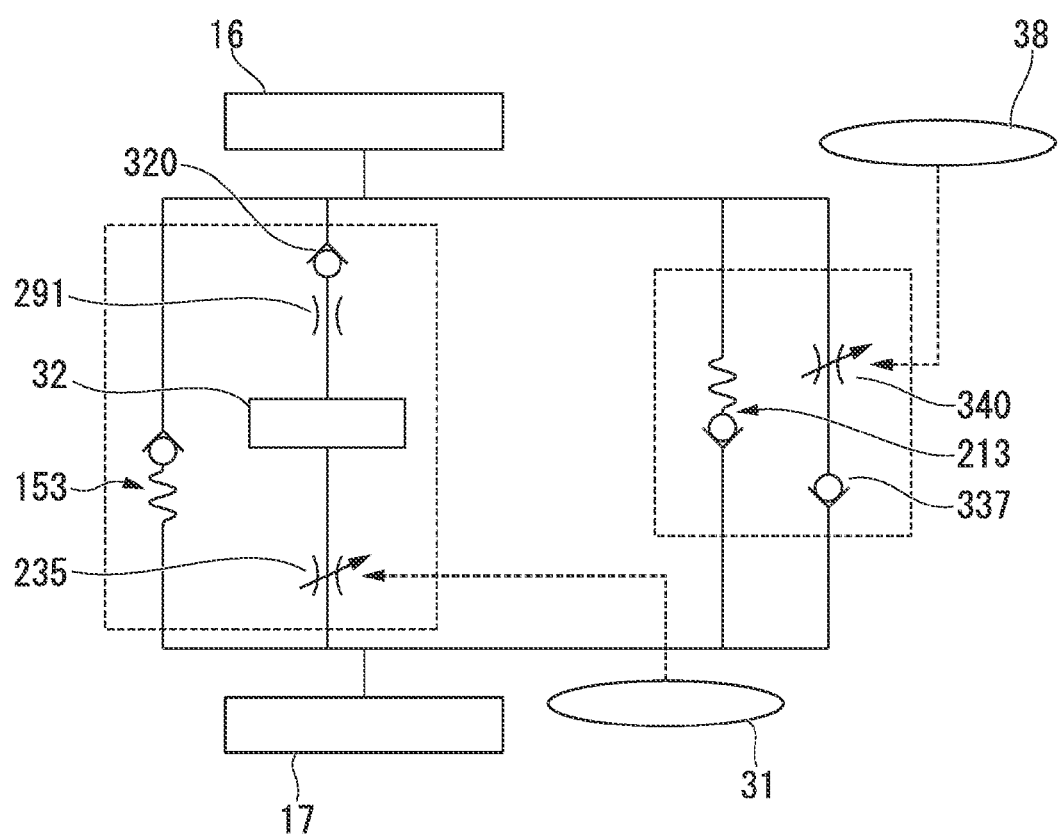
FIG. 12 is a hydraulic circuit diagram of the shock absorber of the third embodiment according to the present invention.

A hydraulic circuit diagram of the third embodiment having the above-mentioned configuration is represented as shown in FIG. 12. That is, the disc valve 153 of the extension-side and the disc valve 213 of the compression-side are installed in parallel between the upper chamber 16 and the lower chamber 17, and the rod-inside passage 32 comes in communication with the lower chamber 17 via the orifice 235 controlled by the metering pin 31, and comes in communication with the upper chamber 16 via the passage hole 291 serving as an orifice and the check valve 320. In addition, the check valve 337 is installed at the lower chamber 17 side of the orifice 340 controlled by the rebound spring 38.

In the shock absorber of the third embodiment in the maximum length-side predetermined range in which the piston rod 18 extends to the outside of the cylinder 11 farther than the maximum length-side predetermined position, the spring mechanism 100 including the rebound spring 38 is shrunk. Accordingly, the passage area adjustment mechanism 343 brings the opening/closing disk 306 in contact with the abutting disk 308 to close the orifice 340 by the transmission member 295 of the spring mechanism 100. In addition, in the maximum length-side predetermined range, the passage area adjustment mechanism 236 matches the inner flange section 223 at the position in the axial direction of the small diameter shaft section 234 of the metering pin 31 to maximize the passage area of the orifice 235, and brings the rod-inside passage 32 in communication with the lower chamber 17.

In the maximum length-side predetermined range, at the extension stroke in which the piston rod 18 extends to the outside of the cylinder 11, the piston 15 moves toward the upper chamber 16, the pressure of the upper chamber 16 is increased and the pressure of the lower chamber 17 is decreased. Then, the pressure of the upper chamber 16 side is applied from the passage hole 319 of the check valve mechanism 305 of the extension-side to one side of the valve disk 314 via the passage groove 299 and the passage hole 300 of the transmission member 295, the pressure similar to the lower chamber 17 is applied from the lower chamber 17 to the other side of the valve disk 314 via the orifice 235, the rod-inside passage 32, the passage hole 291 and the passage hole 321, and thus a pressure difference of the valve disk 314 is increased. Accordingly, the valve disk 314 is relatively easily separated from the base plate section 317 to open the check valve 320, and allows the liquid oil to flow toward the lower chamber 17 via the passage hole 321, the passage hole 291, the rod-inside passage 32 and the orifice 235. Accordingly, the damping force is decreased. That is, the extension-side damping force becomes soft.

In addition, in the maximum length-side predetermined range, at the compression stroke in which the piston rod 18 enters the inside of the cylinder 11, the piston 15 moves toward the lower chamber 17, the pressure of the lower chamber 17 is increased and the pressure of the upper chamber 16 is decreased. Then, the hydraulic pressure of the lower chamber 17 is applied to the disk 185 of the disc valve 213 of the compression-side via the passage 112 of the compression-side formed at the piston 15. On the other hand, while the pressure of the upper chamber 16 side is applied to the disk 185, since the disk 185 has stiffness higher than that of the valve disk 314 of the check valve 320, the disk 185 cannot be easily separated from the seat section 118 of the piston 15, and the damping force is increased to be larger than that of the above-mentioned extension stroke. That is, the damping force of the compression stroke is increased to be larger than the damping force of extension stroke, and the compression-side damping force becomes hard.

On the other hand, in the minimum length-side predetermined range in which the piston rod 18 enters the inside of the cylinder 11 further than the minimum length-side predetermined position, the rebound spring 38 does not shrink, a passage area adjustment mechanism 343 separates the opening/closing disk 306 from the abutting disk 308 to maximize the passage area of the orifice 340, and the passage area adjustment mechanism 236 matches the inner flange section 223 at the position in the axial direction of the large diameter shaft section 232 of the metering pin 31 to close the orifice 235. In the minimum length-side predetermined range, the orifice 235 comes in communication with the internal passage 341 of the check valve mechanism 327 of the compression-side via the orifice 340, the passage 324, the passage groove 292 and the passage hole 338.

In the minimum length-side predetermined range, at the extension stroke in which the piston rod 18 extends to the outside of the cylinder 11, the piston 15 moves toward the upper chamber 16, the pressure of the upper chamber 16 is increased and the pressure of the lower chamber 17 is decreased. Then, the pressure of the upper chamber 16 is applied to the disk 125 of the disc valve 153 of the extension-side via the passage 111 of the extension-side formed at the piston 15. On the other hand, while the pressure of the lower chamber 17 side is applied to the disk 125, since stiffness of the disk 125 is high, the disk 125 cannot be easily separated from the seat section 117 of the piston 15, and the damping force is increased. That is, the extension-side damping force becomes hard.

In addition, in the minimum length-side predetermined range, at the compression stroke in which the piston rod 18 enters the inside of the cylinder 11, the piston 15 moves toward the lower chamber 17, the pressure of the lower chamber 17 is increased and the pressure of the upper chamber 16 is decreased. Then, the pressure of the lower chamber 17 side is applied to one side of the valve disk 330 from the passage hole 336 of the check valve mechanism 327 of the compression-side, and the pressure of the upper chamber 16 side is applied to the other side via the orifice 340, the passage 323, the passage groove 292, and the passage hole 338. Since the valve disk 330 of the check valve 337 has stiffness smaller than that of the disk 125 of the disc valve 153, the valve disk 330 is easily separated from the base plate section 334, the liquid oil flows from the passage hole 336 into the upper chamber 16 via the internal passage 341, the passage hole 338, the passage groove 292, the passage 323 and the orifice 340, i.e., the passage 342, and the damping force is decreased to be lower than that of the above-mentioned extension stroke. That is, the damping force of the compression stroke is decreased to be smaller than the damping force of the extension stroke, and the compression-side damping force becomes soft.

According to the shock absorber of the above-mentioned third embodiment, since the passage 323 configured to bring the upper chamber 16 in communication with the lower chamber 17 has the internal passage 322 of the extension-side in which the check valve 320 is installed and the passage 342 configured to bring the upper chamber 16 in communication with the lower chamber 17 has the internal passage 341 of the compression-side in which the check valve 337 is installed, the extension-side damping force and the compression-side damping force can easily become soft using the check valves 320 and 337.

Further, in the third embodiment, the check valve mechanism 327 and the passage area adjustment mechanism 343 of the compression-side may not be provided. According to the above-mentioned configuration, the following properties are obtained as follows: in the maximum length-side predetermined range, both of the extension-side damping force and the compression-side damping force become soft, and in the minimum length-side predetermined range, the extension-side damping force becomes hard and the compression-side damping force becomes soft.

[Fourth Embodiment]

Figure 13:
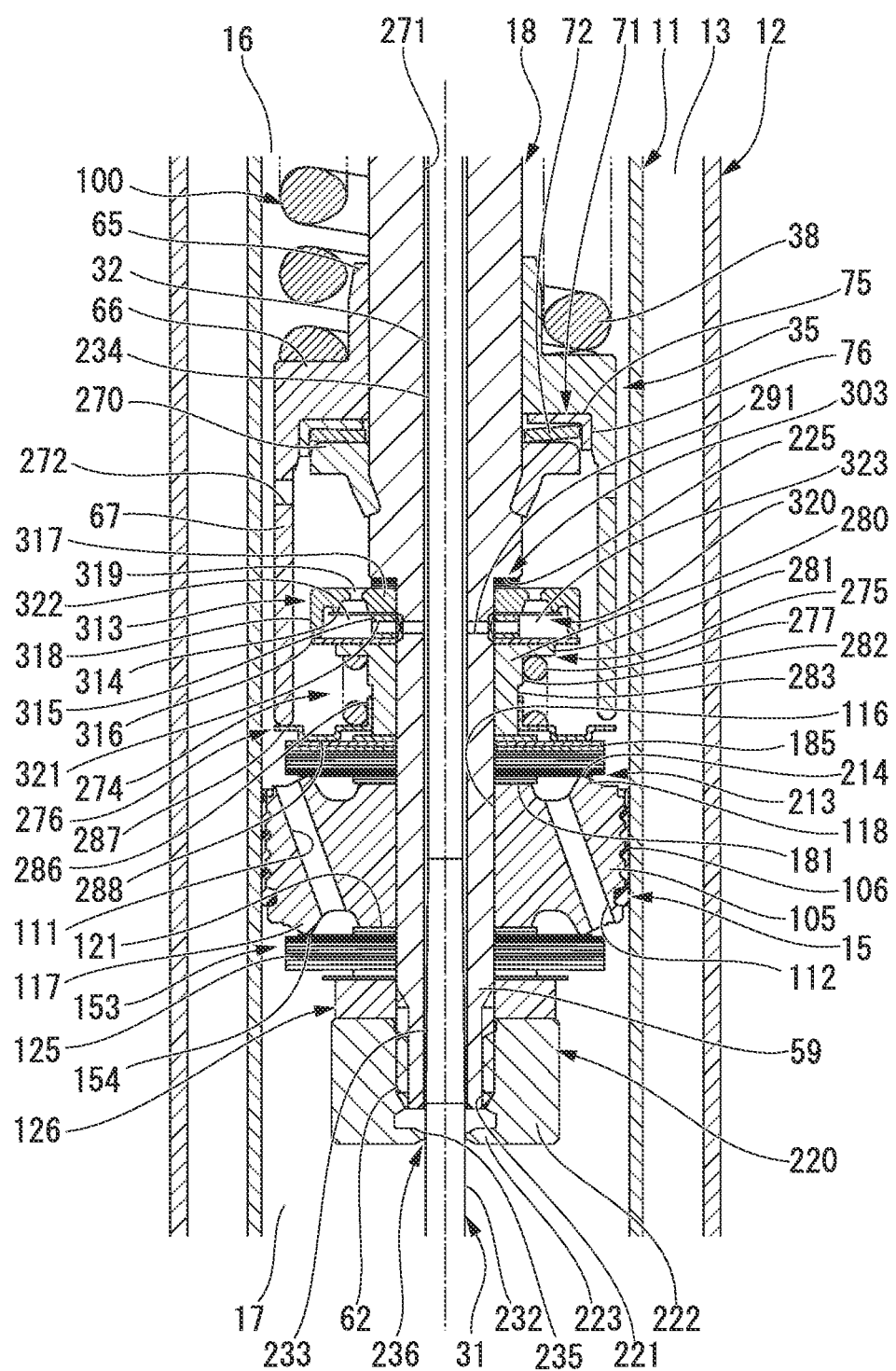
FIG. 13 is a cross-sectional view showing a major part of a shock absorber of a fourth embodiment according to the present invention.

Next, a fourth embodiment will be described mainly with reference to FIGS. 13 and 14 focusing on differences from the second and third embodiments. Further, the same elements as the second and third embodiments will be referred to by the same names and will be designated by the same reference numerals.

In the piston rod 18 of the fourth embodiment, the passage groove 292 of the third embodiment is not formed. In addition, the spring mechanism 100, the wave spring 72 and the pressing mechanism 274 of the second embodiment are used, and the check valve mechanism 305 of the extension-side of the third embodiment is installed between the pressing mechanism 274 and the stepped surface 225 of the piston rod 18. In addition, similar to the third embodiment, the disk 125 comes in direct contact with the seat section 117 of the piston 15 to configure the disc valve 153 of the extension-side. Further, the check valve mechanism 327 of the compression-side of the third embodiment is not installed.

Figure 14:
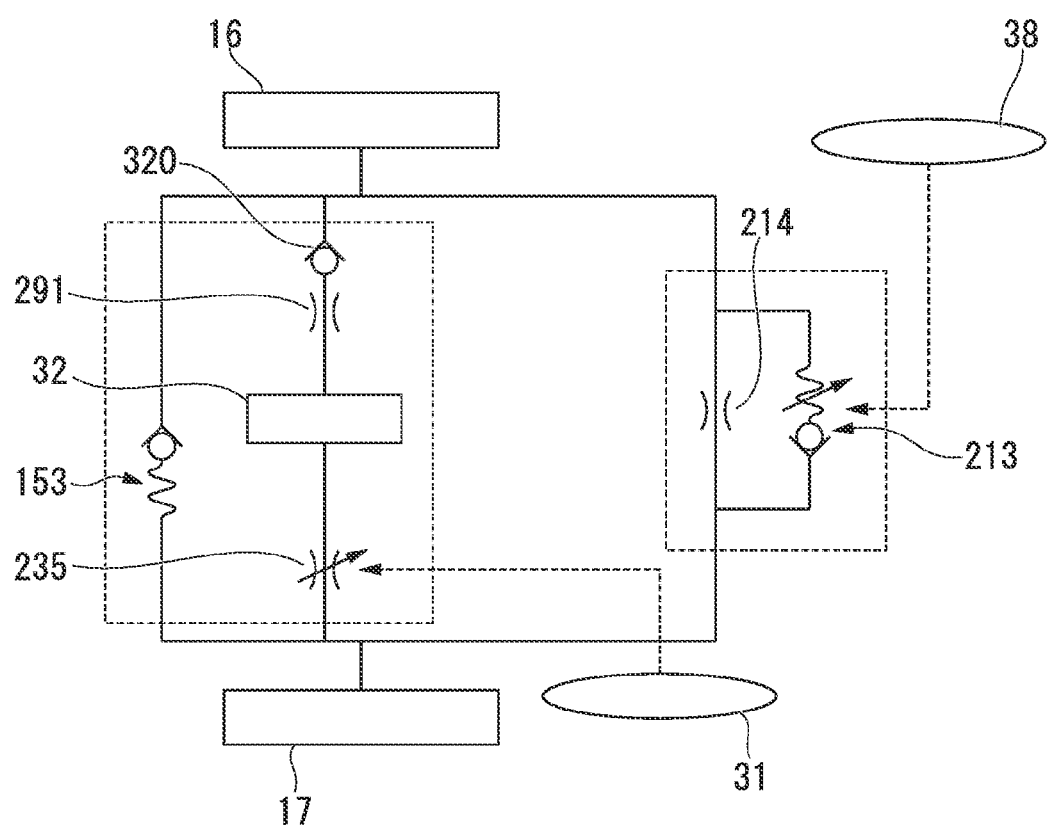
FIG. 14 is a hydraulic circuit diagram of the shock absorber of the fourth embodiment according to the present invention.

A hydraulic circuit diagram of the fourth embodiment having the above-mentioned configuration is represented as shown in FIG. 14. That is, the disc valve 153 of the extension-side and the disc valve 213 of the compression-side are installed in parallel between the upper chamber 16 and the lower chamber 17, and the rod-inside passage 32 comes in communication with the lower chamber 17 via the orifice 235 controlled by the metering pin 31 and comes in communication with the upper chamber 16 via the passage hole 291 serving as an orifice and the check valve 320. In addition, similar to the second embodiment, the biasing force of the rebound spring 38 is applied to the disc valve 213 of the compression-side.

In the shock absorber of the fourth embodiment, in the maximum, length-side predetermined range in which the piston rod 18 extends toward the outside of the cylinder 11 farther than the maximum length-side predetermined position, the spring mechanism 100 including the rebound spring 38 shrinks. Accordingly, the spring mechanism 100 collapses the wave spring 72 with the flange member 270 via the transmission member 71 by the piston-side spring shoe 35, brings the projection 67 in contact with the spring shoe 276, and biases the disk 185 of the disc valve 213 in the valve closing direction. In addition, the passage area adjustment mechanism 236 matches the inner flange section 223 at the position in the axial direction of the small diameter shaft section 234 of the metering pin 31 to maximize the passage area of the orifice 235.

In the maximum length-side predetermined range, at the extension stroke in which the piston rod 18 extends to the outside of the cylinder 11, the piston 15 moves toward the upper chamber 16, the pressure of the upper chamber 16 is increased and the pressure of the lower chamber 17 is decreased. Then, the pressure of the upper chamber 16 side is applied from the passage hole 319 of the check valve mechanism 305 of the extension-side to one side of the valve disk 314 via the passage hole 272 of the piston-side spring shoe 35, the pressure similar to the lower chamber 17 is applied from the lower chamber 17 to the other side of the valve disk 314 via the orifice 235, the rod-inside passage 32, the passage hole 291 and the passage hole 321, and a pressure difference of the valve disk 314 is increased. Accordingly, the valve disk 314 is relatively easily separated from the base plate section 317 to open the check valve 320, and the liquid oil flows toward the lower chamber 17 via the passage hole 321, the passage hole 291, the rod-inside passage 32 and the orifice 235. Accordingly, the damping force is decreased. That is, the extension-side damping force becomes soft.

In addition, in the maximum, length-side predetermined range, at the compression stroke in which the piston rod 18 enters the inside of the cylinder 11, the piston 15 moves toward the lower chamber 17, the pressure of the lower chamber 17 is increased and the pressure of the upper chamber 16 is decreased. Then, the hydraulic pressure of the lower chamber 17 is applied to the disk 185 of the disc valve 213 of the compression-side via the passage 112 of the compression-side formed at the piston 15. Here, since the spring mechanism 100 applies the biasing force in the direction of the seat section 118 to the disk 185 via the piston-side spring shoe 35, the disc valve 213 cannot be easily opened, and the compression-side damping force is increased to be larger than the extension-side damping force of the extension stroke to become hard.

On the other hand, in the minimum length-side predetermined range in which the piston rod 18 enters the inside of the cylinder 11 further than the minimum length-side predetermined position, the rebound spring 38 does not shrink, and the disk 185 of the disc valve 213 is not pressed by the spring mechanism 100 including the rebound spring 38. In addition, the passage area adjustment mechanism 236 matches the inner flange section 223 at the position in the axial direction of the large diameter shaft section 232 of the metering pin 31 to close the orifice 235.

When the piston 15 is in the minimum length-side predetermined range, in the extension stroke, the pressure of the upper chamber 16 is applied to the disk 125 of the disc valve 153 of the extension-side, to which the pressure of the lower chamber 17 is applied from one side, via the passage 111 of the extension-side formed at the piston 15, from the other side, to increase a pressure difference of the disk 125, in the compression stroke, the pressure of the lower chamber 17 is applied to the disk 185 of the disc valve 213 of the compression-side, to which the pressure of the upper chamber 16 is applied from one side, via the passage 112 of the extension-side formed at the piston 15, from the other side, to increase the pressure difference of the disk 185, and both of the damping forces are decreased. That is, both of the extension-side damping force and the compression-side damping force become soft.

According to the fourth embodiment, properties in which, in the maximum length-side predetermined range in which the piston rod 18 extends to the outside of the cylinder 11 farther than the maximum length-side predetermined position, the extension-side damping force becomes soft and the compression-side damping force becomes hard, and in the minimum length-side predetermined range in which the piston rod 18 enters the inside of the cylinder 11 further than the minimum length-side predetermined position, both of the extension-side damping force and the compression-side damping force become soft, can be obtained by the passage area adjustment mechanism 236 configured to adjust the passage area of the orifice 235 depending on the position of the piston rod 18. In this way, in order to adjust the passage area of the orifice 235 through which the liquid oil flows, the damping force can be smoothly varied, and ride comfort of the shock-absorber-mounted vehicle becomes better.

[Fifth Embodiment]

Next, a fifth embodiment will be described mainly with reference to FIGS. 15 and 16 focusing on differences from the first embodiment. Further, the same elements as the first embodiment will be referred to by the same names and will be designated by the same reference numerals.

In the fifth embodiment, the metering pin 31 of the first embodiment is not installed, and the piston rod 18 is partially different. The piston rod 18 of the fifth embodiment is not divided like the rod main body 26 and the tip end rod 27 of the first embodiment. In addition, the flange section 56 of the first embodiment is not formed at the outer circumferential side, and instead, similar to the second embodiment, the separate flange member 270 is attached thereto through swaging. Further, the insertion hole 30 and the passage boles 49 to 51 of the first embodiment are not formed in the piston rod 18, and a plurality of passage grooves 501 that configure a rod-inside passage (a second passage) 500 are formed at the outer circumferential section of the attachment shaft section 59 in the axial direction at intervals in the circumferential direction. The orifices 151 and 211 of the damping force generating mechanisms 114 and 115 are opened to the passage groove 501.

Figure 15:
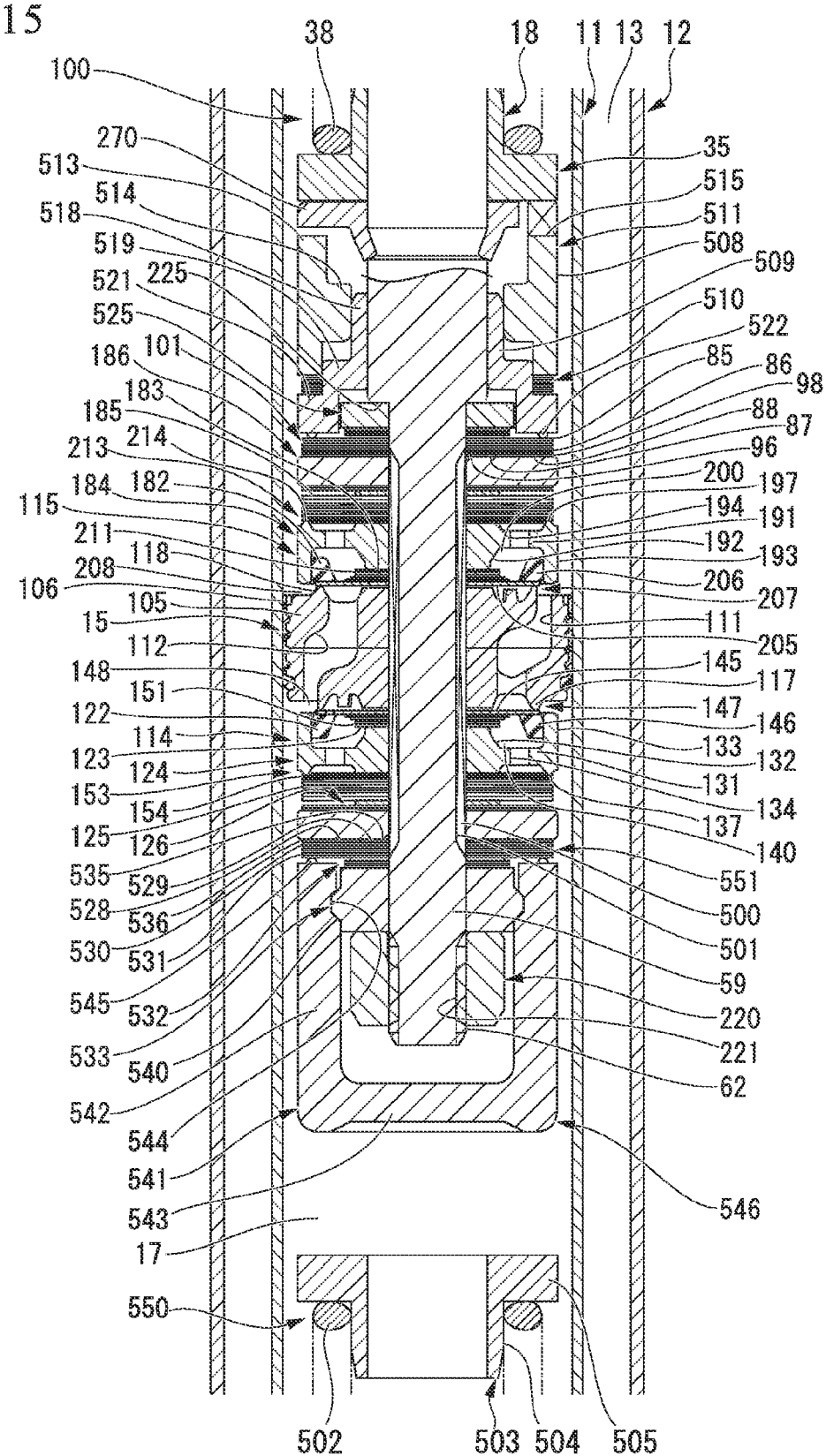
FIG. 15 is a cross-sectional view showing a major past of a shock absorber of a fifth embodiment according to the present invention.

In addition, a compression-side spring 502 configured of a coil spring extends from the base valve 23 (not shown in FIG. 15, see FIG. 1). In addition, a spring shoe 503 is fitted into the end section of the compression-side spring 502 near the piston 15. The spring shoe 503 has a cylindrical section 504 fitted into the compression-side spring 502 and an abutting flange section 505 configured to abut the end section of the compression-side spring 502.

In addition, the projection 67 and the cylindrical section 65 of the first embodiment are not formed at the piston-side spring shoe 35 and the piston-side spring shoe 25 has a holed disk shape. A transmission member 511 formed by integrating a first transmission body 508, a second transmission body 509 and an intervention member 510 with one another is formed at the piston-side spring shoe 35 near the piston 15. The transmission member 511 configures the spring mechanism 100.

The first transmission body 508 has a cylindrical section 513 and an annular inner flange section 514 protruding from an intermediate section in the axial direction inward in the radial direction, and a passage groove 515 passing in the radial direction is formed at an end section in the axial direction of the cylindrical section 513 opposite to the inner flange section 514.

The second transmission body 509 has a cylindrical section 518, an annular stepped section 519 protruding from the end section in the axial direction of the cylindrical section 518 outward in the radial direction, and an annular outer flange section 521 protruding from a side in the axial direction of the stepped section 519 opposite to the cylindrical section 518 outward in the radial direction. The second transmission body 509 fits the piston rod 18 into the inner circumferential section of the cylindrical section 518, and fits the outer circumferential section of the cylindrical section 518 into the inner circumferential section of the inner flange section 514 of the first transmission body 508. The second transmission body 509 slides along the outer circumferential surface of the piston rod 18. A plurality of protrusions 522 protruding toward the piston 15 are formed at an end surface in the axial direction of the outer flange section 521 opposite to the cylindrical section 518.

The intervention member 510 is configured of a plurality of holed disk-shaped members, and interposed between the cylindrical section 513 of the first transmission body 508 and the outer flange section 521 of the second transmission body 509. The first transmission body 508 is configured to abut the piston-side spring shoe 35 at the end section in the axial direction of the cylindrical section 513 near the passage groove 515.

In addition, in the fifth embodiment, an intervention member 525 configured of a plurality of annular members abutting the stepped surface 225, the plurality of disks 85, the opening/closing disk 86, the intermediate disk 87 and the abutting disk 88, similar to the first embodiment, are installed between the stepped surface 225 of the piston rod 18 near the attachment shaft section 59 and the valve restriction member 186 in sequence from the stepped surface 225 side. In the fifth embodiment, the opening/closing section 93 of the first embodiment protruding in the axial direction is not formed at the opening/closing disk 86, and the plurality of disks 85 have the same diameter as the opening/closing disk 86. In addition, the passage 96 configuring the orifice 98 is formed in the intermediate disk 87 and the abutting disk 88, and the passage 96 comes in communication with the rod-inside, passage 500 of the piston rod 18. Then, the protrusion 522 of the transmission member 511 abuts the plurality of disks 85 opposite to the abutting disk 88. Further, neither of the disks 121 and 181 of the first embodiment of the sides of the piston 15 is installed, and a gap in the axial direction is formed between the piston 15 and the damping valve main bodies 122 and 182. Accordingly, the transmission member 511 is movable with respect to the piston rod 18 in the axial direction, and the opening/closing disk 86 is able to abut the abutting disk 88.

Further, in the fifth embodiment, an abutting disk 528 similar to the abutting disk 88, an intermediate disk 529 similar to the plurality of intermediate disks 87, an opening/closing disk (a valve section) 530 similar to the opening/closing disk 86, a plurality of disks 531 similar to the plurality of disks 85, an intervention member 532 configured of a plurality of annular members, an annular base member 533 and the nut 220 are installed at the attachment shaft section 59 of the piston rod 18 in sequence from a side of the valve restriction member 126 opposite to the piston 15. A gap between the opening/closing disk 530 and the abutting disk 528 and a passage 535 similar to the passage 96 formed at the intermediate disk 529 and the abutting disk 528 configure an orifice (a second passage) 536 similar to the orifice 98, and the passage 535 is opened to the rod-inside passage 500 of the piston rod 18. The orifice 536 brings the rod-inside passage 500 in communication with the lower chamber 17.

A fitting protrusion 540 is formed at an outer circumferential section of the base member 533. Then, a transmission body 541 is attached to cover the nut 220 and to be fitted to the fitting protrusion 540. The transmission body 541 has a cylindrical section 542 and a lid section 543 configured to close one end of the cylindrical section 542, and as the fitting protrusion 540 of the above-mentioned base member 533 is fitted into a fitting concave section 544 formed at the inner circumferential section in the axial direction of the cylindrical section 542 opposite to the lid section 543, the fitting protrusion 540 is integrated with the base member 533 to become a transmission member 546. A plurality of protrusions 545 protruding toward the piston 15 are formed at an end surface in the axial direction of the cylindrical section 542 opposite to the lid section 543. Then, the protrusion 545 abuts a side of the plurality of disks 531 opposite to the abutting disk 528. Further, the transmission member 546 is movable with respect to the piston rod 18 in the axial direction by a gap in the axial direction between the piston 15 and the damping valve main bodies 122 and 182, and the opening/closing disk 530 is configured to abut the abutting disk 528.

The compression-side spring 502, the spring shoe 503 and the transmission member 546 configure a spring mechanism 550. Then, the spring mechanism 550, me opening/closing disk 530 configured to open/close the orifice 536, and the abutting disk 528 configure a passage area adjustment mechanism 551 configured to adjust the passage area of the orifice 536 according to the biasing force of the compression-side spring 502 varied based on the position of the piston rod 18. Further, the inner flange section 223 of the first embodiment is not formed at the nut 220.

Figure 16:
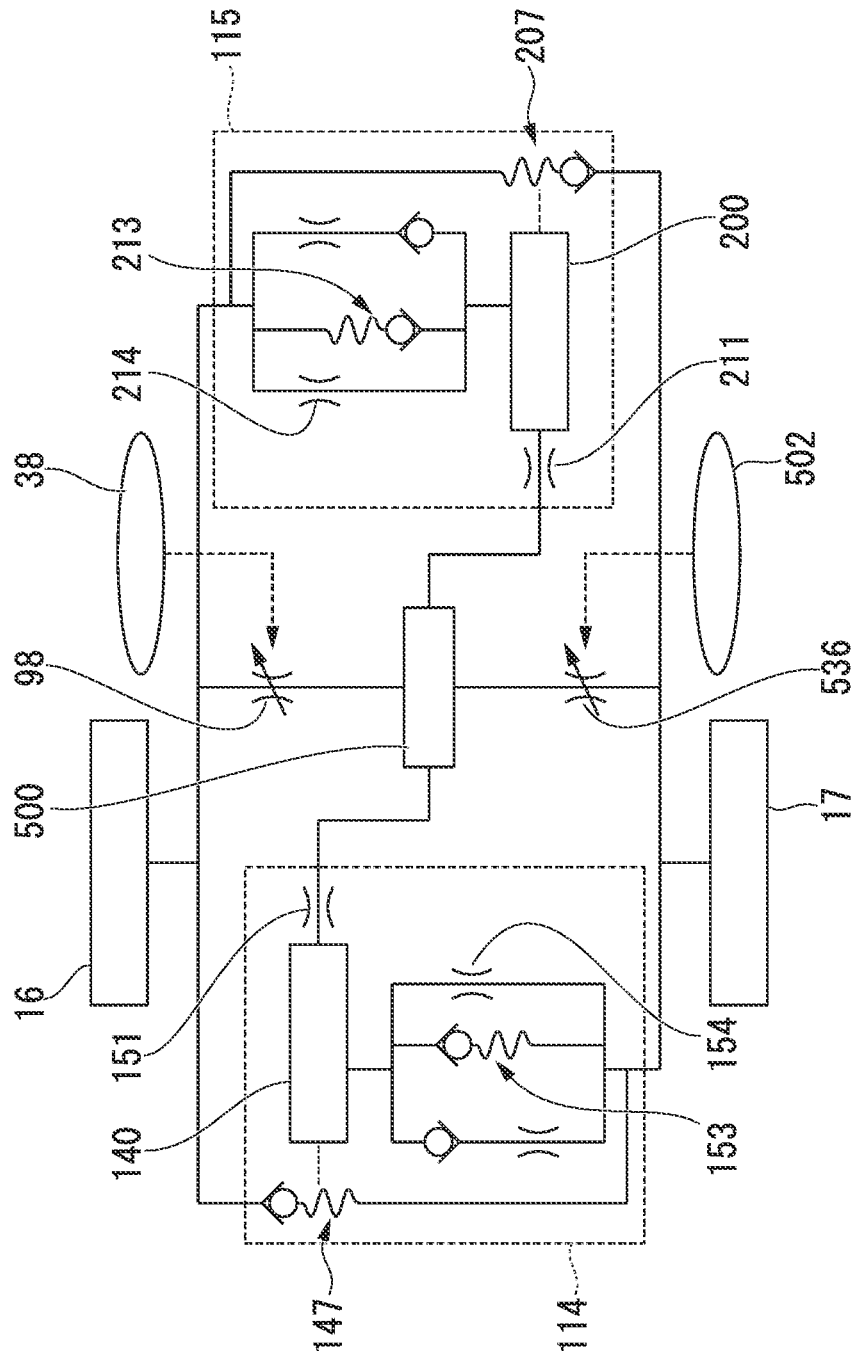
FIG. 16 is a hydraulic circuit diagram of the shock absorber of the fifth embodiment, according to the present invention.

A hydraulic circuit diagram of the fifth embodiment having the above-mentioned configuration is represented as shown in FIG. 16. That is, the damping force generating mechanism 114 of the extension-side and the damping force generating mechanism 115 of the compression-side similar to the first embodiment are installed in parallel between the upper chamber 16 and the lower chamber 17. Then, the pilot chambers 140 and 200 of the damping force generating mechanisms 114 and 115 similar to the first embodiment come in communication with the rod-inside passage 500 via the orifices 151 and 211. Further, the biasing force of the rebound spring 38 is applied to the orifice 98 between the upper chamber 16 and the rod-inside passage 500, and the biasing force of the compression-side spring 502 is applied to the orifice 536 between the lower chamber 17 and the rod-inside passage 500.

In the shock absorber of the fifth embodiment, in the maximum length-side predetermined range in which the piston rod 18 extends to the outside of the cylinder 11 farther than the maximum length-side predetermined position, the spring mechanism 100 including the rebound spring 38 shrinks. Accordingly, the passage area adjustment mechanism 101 presses the opening/closing disk 86 via the plurality of disks 85 using the protrusion 522 of the transmission member 511 of the spring mechanism 100 to close the orifice 98. In the maximum length-side predetermined range, the rod-inside passage 500 conies in communication with the lower chamber 17 only via the orifice 536, and the pilot chambers 140 and 200 of the damping force generating mechanisms 114 and 115 come in communication with the lower chamber 17 only via the orifice 536, the rod-inside passage 500 and the orifices 151 and 211.

In the maximum length-side predetermined range, at the extension stroke in which the piston rod 18 extends to the outside of the cylinder 11, the piston 15 moves toward the upper chamber 16, the pressure of the upper chamber 16 is increased and the pressure of the lower chamber 17 is decreased. Then, the pressure of the upper chamber 16 is applied to the damping valve main body 122 of the damping valve 147 of the damping force generating mechanism 114 of the extension-side via the passage 111 of the extension-side formed at the piston 15. Here, since the pilot chamber 140 configured to apply the pilot pressure in the direction of the seat section 117 to the damping valve main body 122 comes in communication with the lower chamber 17 via the orifice 151, the rod-inside passage 500 and the orifice 536, the pressure state of the pilot chamber 140 becomes similar to that of the lower chamber 17, and the pilot pressure is decreased. Accordingly, the damping valve main body 122 has an increased received pressure difference, is opened to be relatively easily separated from the seat section 117, and allows the liquid oil to flow toward the lower chamber 17 via the passage 148 in the radial direction between the piston 15 and the seat member 124. Accordingly, the damping force is decreased. That is, the extension-side damping force becomes soft.

In addition, in the maximum length-side predetermined range, at the compression stroke in which the piston rod 18 enters the inside of the cylinder 11, the piston 15 moves toward the lower chamber 17, the pressure of the lower chamber 17 is increased and the pressure of the upper chamber 16 is decreased. Then, the hydraulic pressure of the lower chamber 17 is applied to the damping valve main body 182 of the damping valve 207 of the damping force generating mechanism 115 of the compression-side via the passage 112 of the compression-side formed at the piston 15. Here, since the pilot chamber 200 configured to apply the pilot pressure in the direction, of the seat section 118 to the damping valve main body 182 comes in communication with the lower chamber 17 via the orifice 211, the rod-inside passage 500 and the orifice 536, the pressure state of the pilot chamber 200 becomes similar to that of the lower chamber 17, and the pilot pressure is increased. Accordingly, the damping valve main body 182 has a decreased received pressure difference, cannot be easily separated from the seat section 118, and cannot easily open the valve. Accordingly, the compression-side damping force is increased to be larger than the extension-side damping three of the extension stroke to become hard.

On the other hand, in the minimum length-side predetermined range in which the piston rod 18 enters the inside of the cylinder 11 bather than the minimum length-side predetermined position, the spring shoe 503 abuts the transmission member 546, and the spring mechanism 550 including the compression-side spring 502 shrinks. Accordingly, the passage area adjustment mechanism 551 presses the opening/closing disk 530 via the plurality of disks 531 using the protrusion 545 of the transmission member 546 to close the orifice 536. In the minimum length-side predetermined range, the rod-inside passage 500 comes in communication with the upper chamber 16 only via the orifice 98, and the pilot chambers 140 and 200 of the damping force generating mechanisms 114 and 115 come in communication with the upper chamber 16 only via the orifice 98, the rod-inside passage 500 and the orifices 151 and 211.

In the minimum length-side predetermined range, at the extension stroke in which the piston rod 18 extends to the outside of the cylinder 11, the piston 15 moves toward the upper chamber 16, the pressure of the upper chamber 16 is increased and the pressure of the lower chamber 17 is decreased. Then the pressure of the upper chamber 16 is applied to the damping valve main body 122 of the damping valve 147 of the damping force generating mechanism 114 of the extension-side via the passage 111 of the extension-side formed at the piston 15. Here, since the pilot chamber 140 configured to apply the pilot pressure in the direction of the seat section 117 to the damping valve main body 122 comes in communication with the upper chamber 16 via the orifice 151, the rod-inside passage 500 and the orifice 98, the pressure state of the pilot chamber 140 becomes similar to that of the upper chamber 16, and the pilot pressure is also increased with the increase in pressure of the upper chamber 16. In this state, the damping valve main body 122 has a received pressure difference, which is decreased, and cannot be easily separated from the seat section 117. Accordingly, the damping force of the extension stroke is increased, and the extension-side damping force becomes hard.

In addition, in the minimum length-side predetermined range, at the compression stroke in which the piston rod 18 enters the inside of the cylinder 11, the piston 15 moves toward the lower chamber 17, the pressure of the lower chamber 17 is increased and the pressure of the upper chamber 16 is decreased. Then, the hydraulic pressure of the lower chamber 17 is applied to the damping valve main body 182 of the damping valve 207 of the damping force generating mechanism 115 of the compression-side via the passage 112 of the compression-side formed at the piston 15. Here, since the pilot chamber 200 configured to apply the pilot pressure in the direction of the seat section 118 to the damping valve main body 182 comes in communication with the upper chamber 16 via the orifice 211, the rod-inside passage 500 and the orifice 98, the pressure state of the pilot chamber 200 becomes similar to that of the upper chamber 16, and the pilot pressure is decreased. Accordingly, the damping valve main body 182 has an increased received pressure difference, is opened to be relatively easily separated from the seat section 118, and allows the liquid oil to flow toward the upper chamber 16 via the passage 208 in the radial direction between the piston 15 and the seat member 184. Accordingly, the damping force of the compression stroke is decreased to be smaller than the damping force of the extension stroke, and the compression-side damping force becomes soft.

[Sixth Embodiment]

Figure 17:
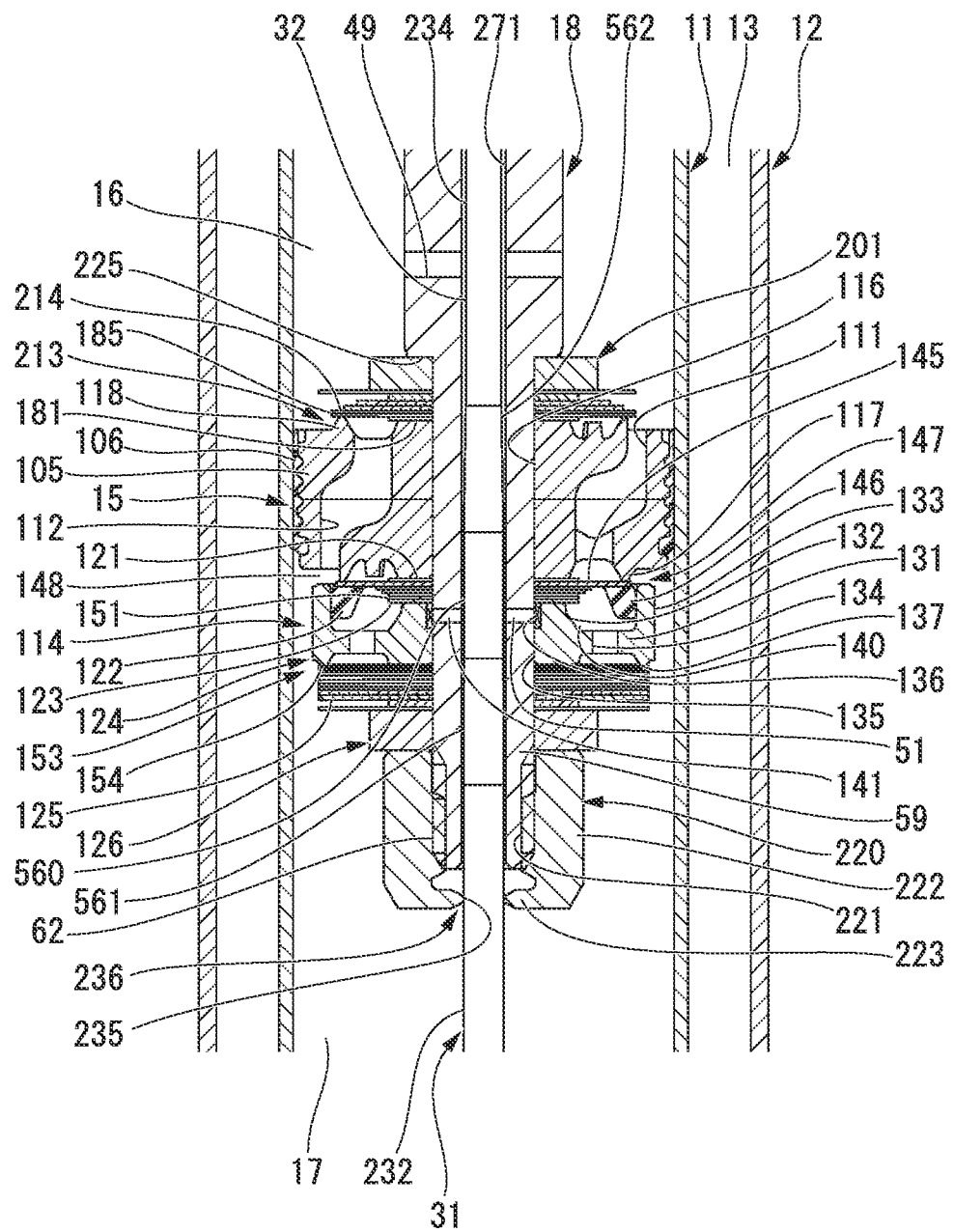
FIG. 17 is a cross-sectional view showing a major part of a shock absorber of a sixth embodiment according to the present invention.

Next, a sixth embodiment will be described mainly with reference to FIGS. 17 and 18 focusing on differences from the second embodiment. Further, the same elements as the second embodiment will be referred to by the same names and will be designated by the same reference numerals.

In the sixth embodiment, the transmission member 71, foe wave spring 72 and the pressing mechanism 274 of the second embodiment are not installed. Further, the flange member 270 and the piston-side spring shoe 35 are installed at positions away from the disk 185, which are not shown in FIG. 17.

Then, a middle diameter shaft section 560 having a constant diameter smaller than that of the large diameter shaft section 232 and larger than that of the small diameter shaft section 234 is formed between the large diameter shaft section 232 and the small diameter shaft section 234 of the metering pin 31, a tapered shaft section 561 is formed between the large diameter shaft section 232 and the middle diameter shaft section 560, and a tapered shaft section 562 is formed between the middle diameter shall section 560 and the small diameter shaft section 234. The tapered shaft section 561 continues to the end section of the large diameter shall section 232 near the middle diameter shaft section 560 and to the end section of the middle diameter shaft section 560 near the large diameter shaft section 232, and has a tapered shape having a diameter reduced toward the middle diameter shaft section 560 to connect these. The tapered shaft section 562 continues to the end section of the middle diameter shaft section 560 near the small diameter shaft section 234 and to the end section of the small diameter shaft section 234 near the middle diameter shaft section 560, and has a tapered shape having a diameter reduced toward the small diameter shall section 234 to connect these.

Figure 18:
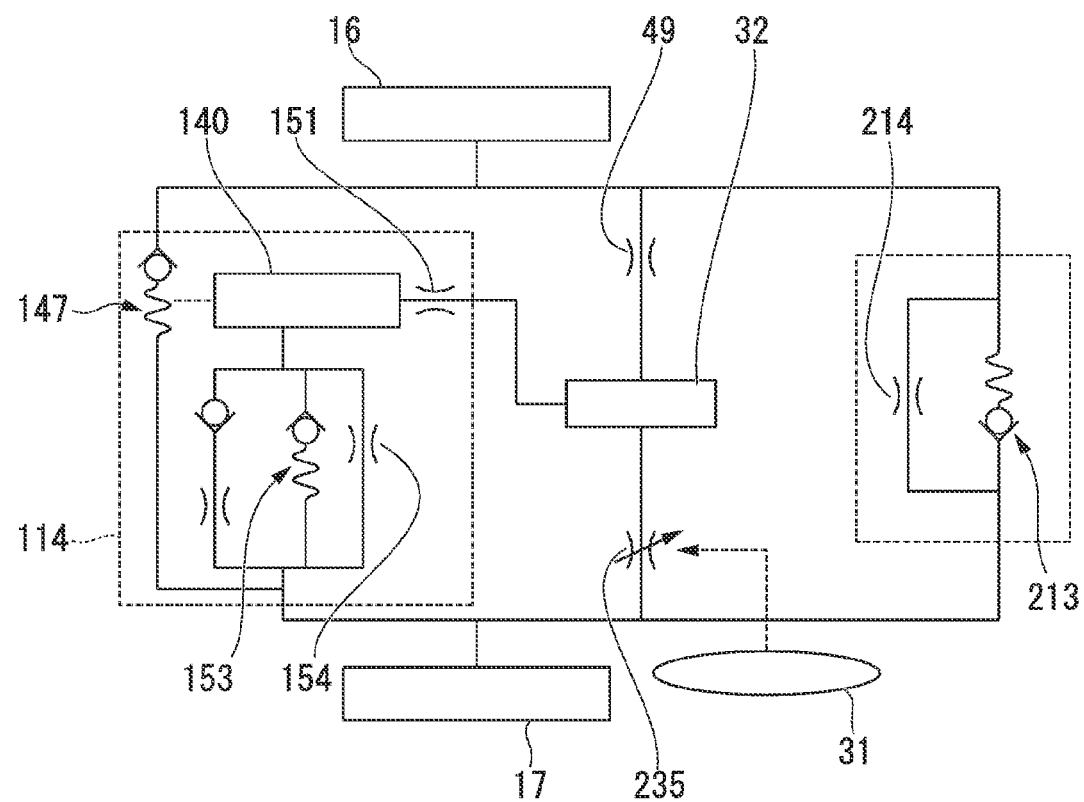
FIG. 18 is a hydraulic circuit diagram of the shock absorber of the sixth embodiment according to the present invention.

A hydraulic circuit diagram of the sixth embodiment having the above-mentioned configuration is represented as shown in FIG. 18. That is, in contrast to the second embodiment, the biasing force of the rebound spring 38 is not applied to the disc valve 213 of the compression-side.

In the shock absorber of the sixth embodiment even in the maximum length-side predetermined range in which the piston rod 18 extends to the outside of the cylinder 11 farther than the maximum length-side predetermined position, the rebound spring (not shown) does not bias the disk 185 of the disc valve 213 in the valve closing direction. On the other hand, the passage area adjustment mechanism 236 matches the inner flange section 223 at the position in the axial direction of the small diameter shaft section 234 of the metering pin 31 to maximize the passage area of the orifice 235. In the maximum length-side predetermined range, the rod-inside passage 32 comes in communication with the lower chamber 17 via the orifice 235, and comes in communication with the upper chamber 16 via the passage hole 49 serving as an orifice of the piston rod 18.

In the maximum length-side predetermined range, at the extension stroke in which the piston rod 18 extends to the outside of the cylinder 11, the pressure of the pilot chamber 140 is intermediate between the upper chamber 16 and the tower chamber 17, and similar to the second embodiment, the damping force is decreased. That is, the extension-side damping force becomes soft.

In addition, in the maximum length-side, predetermined range, at the compression stroke in which the piston rod 18 enters the inside of the cylinder 11, the piston 15 moves toward the lower chamber 17, the pressure of the lower chamber 17 is increased and the pressure of the upper chamber 16 is decreased. Then, the hydraulic pressure of the lower chamber 17 is applied to the disk 185 of the disc valve 213 of the compression-side, to which the pressure of the upper chamber 16 is received from one side, via the passage 112 of the compression-side formed at the piston 15, from the other side. As a result, the pressure difference of the disk 185 is increased, the disc valve 213 is easily opened, and the compression-side damping force also becomes soft.

Meanwhile, in the minimum, length-side predetermined range in which the piston rod 18 enters the inside of the cylinder 11 further than the minimum length-side predetermined position, the passage area adjustment mechanism 236 matches the inner flange section 223 at the position an foe axial direction of the large diameter shaft section 232 of the metering pin 31 to close the orifice 235. In the minimum length-side predetermined range, the rod-inside passage 32 comes in communication with the upper chamber 16 via the passage hole 49 of the piston rod 18, and the pilot chamber 140 of the damping force generating mechanism 114 of the extension-side comes in communication with the upper chamber 16 only via the rod-inside passage 32.

In the minimum length-side predetermined range, at the extension stroke in which the piston rod 18 extends to the outside of the cylinder 11, the piston 15 moves toward the upper chamber 16, the pressure of the upper chamber 16 is increased and the pressure of the lower chamber 17 is decreased. Here, similar to the second embodiment, since the pilot chamber 140 comes in communication with the upper chamber 16, the pressure state of the pilot chamber 140 becomes similar to that of the upper chamber 16, and the damping valve main body 122 has a reduced pressure difference. Accordingly, the damping force of the extension stroke is increased, and the extension-side damping force becomes hard.

In addition, in the minimum length-side predetermined range, at the compression stroke in which the piston rod 18 enters the inside of the cylinder 11, the piston 15 moves toward the lower chamber 17, the pressure of the lower chamber 17 is increased and the pressure of the upper chamber 16 is decreased. Then, the hydraulic pressure of the lower chamber 17 is applied to the disk 185 of the disc valve 213 of the compression-side, to which the pressure of the upper chamber 16 is received from one side, via the passage 112 of the compression-side formed at the piston 15, front the other side. As a result the pressure difference of the disk 185 is increased, the disc valve 213 is easily opened, and the compression-side damping force becomes soft.

In addition, when the piston rod 18 is in an intermediate predetermined range between the maximum length-side predetermined position and the minimum length-side predetermined position, the passage area adjustment mechanism 236 matches the inner flange section 223 at the position in the axial direction of the middle diameter shaft section 560 of the metering pin 31 to provide the passage area of the orifice 235 larger than the minimum length-side predetermined range and smaller than the maximum length-side predetermined position. In the intermediate predetermined range, the pressure of the pilot chamber 140 becomes closer to the pressure of the upper chamber 16 than when the piston rod 18 is in the minimum length-side predetermined range.

Accordingly, in the extension stroke, since the pressure of the pilot chamber 140 is larger than the minimum length-side predetermined range, a pressure difference received by the damping valve main body 122 of the damping valve 147 of the damping force generating mechanism 114 of the extension-side is slightly reduced, and the pressure becomes medium with the damping force being smaller than that in the hard state when the pressure is in the minimum length-side predetermined range but larger than that in the soft state, which is in the maximum length-side predetermined range. On the other hand, in the compression stroke, similar to the maximum length-side predetermined position and the minimum length-side predetermined range, the damping force is decreased and the compression-side damping force becomes soft.

According to the above-mentioned sixth embodiment, properties in which, in the maximum length-side predetermined range in which the piston rod 18 extends to the outside of the cylinder 11 farther than the maximum length-side predetermined position, both of the extension-side damping force and the compression-side damping force become soft, and in the minimum length-side predetermined range in which the piston rod 18 enters the inside of the cylinder 11 further than the minimum length-side predetermined position, the extension-side damping force becomes hard and the compression-side damping force becomes soft, can be obtained by the passage area adjustment mechanism 236 configured to adjust the passage area of the orifice 235 depending on the position of the piston rod 18. In this way, since the passage area of the orifice 235 through which the working fluid passes is adjusted, the damping force can be smoothly varied and ride comfort of the shock-absorber-mounted vehicle becomes better.

Further, in addition to the passage area adjustment mechanism 236 of the sixth embodiment, even when the passage area of the orifice 536 is adjusted using the passage area adjustment mechanism 551 of the fifth embodiment, properties in which, in the maximum length-side predetermined range, both of the extension-side damping force and the compression-side damping force become soft, and in the minimum length-side predetermined range, the extension-side damping force becomes hard and the compression-side damping force becomes soft, can be obtained.

[Seventh Embodiment]

Figure 19:
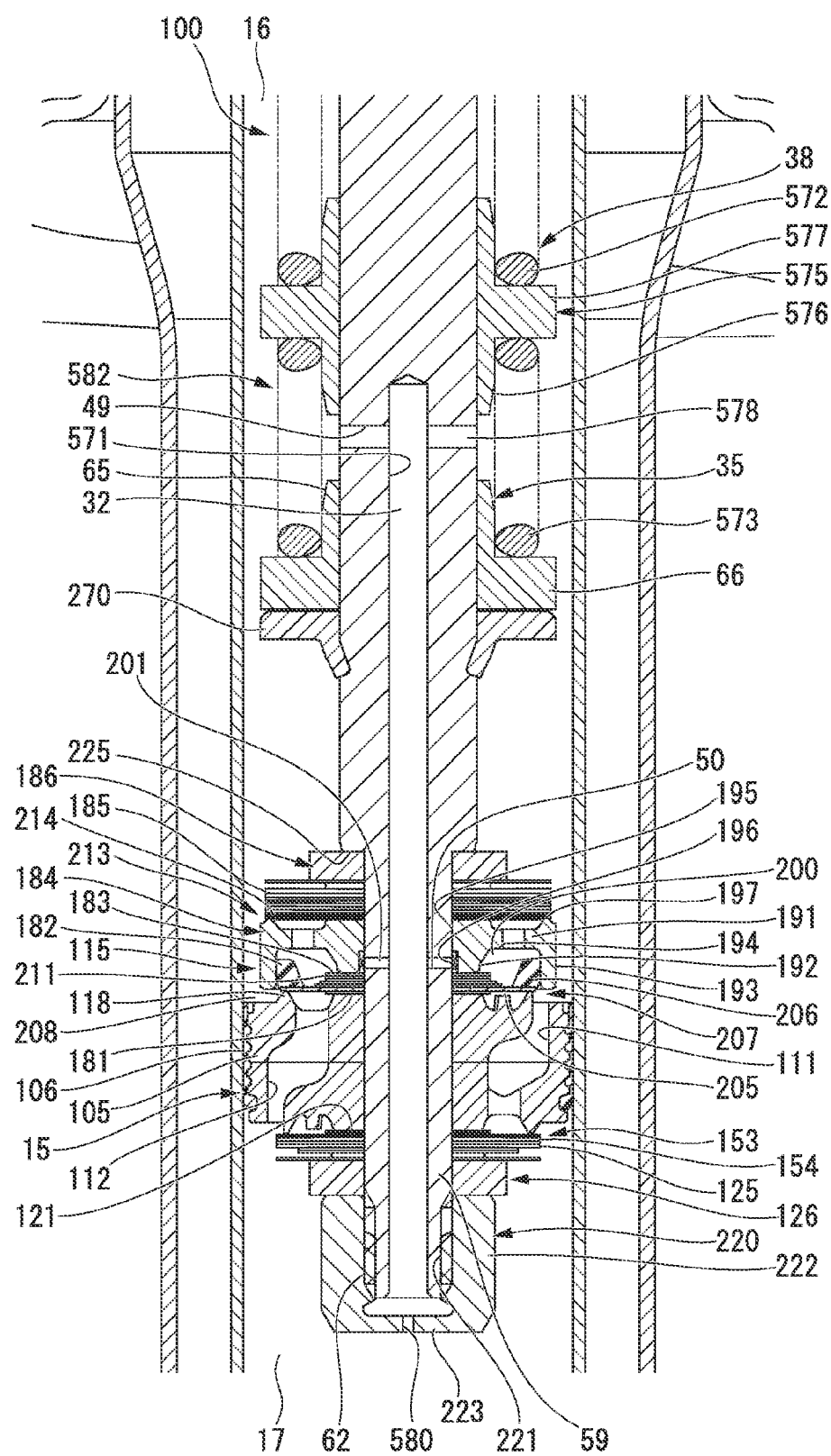
FIG. 19 is a cross-sectional view of a major part of a shock absorber of a seventh embodiment according to the present invention.

Next, a seventh embodiment will be described mainly with reference to FIGS. 19 and 20 focusing on differences from the first embodiment. Further, the same elements as the first embodiment will be referred to as the same names and will be designated by the same reference numerals.

In the seventh embodiment, the piston rod 18 is partially different. The piston rod 18 of the seventh embodiment is not divided like the rod main body 26 and the tip end rod 27 of the first embodiment. In addition, the flange section 56 of the first embodiment is not formed at the outer circumferential side, and like the second embodiment, the separate flange member 270 is attached thereto through swaging. Further, the metering pin 31 is not installed either, and an insertion hole 571 that forms the rod-inside passage 32 has a constant diameter. The passage holes 49 and 50 come in communication with the insertion hole 571, and the passage hole 51 of the first embodiment is not formed.

In addition, the passage area adjustment mechanism 101 of the first embodiment is not installed, the rebound spring 38 is divided into a rebound spring main body 572 and an auxiliary spring 573, and an intermediate spring shoe 575 is installed at the piston-side spring shoe 35 opposite to the piston 15 to be slidable along the piston rod 18. The rebound spring main body 572 is interposed between the rod guide-side spring shoe 36 (not shown in FIG. 19, see FIG. 1) and the intermediate spring shoe 575, and the auxiliary spring 573 is interposed between the intermediate spring shoe 575 and the piston-side spring shoe 35.

The intermediate spring shoe 575 has a cylindrical section 576 and a flange section 577 extending in the radial direction from an intermediate section in the axial direction, slides along the outer circumferential section of the piston rod 18 in the inner circumferential section of the cylindrical section 576, and abuts the rebound spring main body 572 and the auxiliary spring 573 in the flange section 577. The intermediate spring shoe 575 can vary a passage area of an orifice 578 in the passage hole 49 by sliding the piston rod 18 while expanding and shrinking the rebound spring 38. The spring mechanism 100 including the intermediate spring shoe 575 and the orifice 578 configure a passage area adjustment mechanism 582 configured to adjust the passage area configured to bring the upper chamber 16 in communication with the lower chamber 17 via the rod-inside passage 32.

In addition, the plurality of disks 85, the opening/closing disk 86, the plurality of intermediate disks 87, the abutting disk 88, the passage forming member 89, the intervention member 90 and the nut 91 of the first embodiment are not installed.

In addition, the damping valve main body 122, the plurality of disks 123 and the seat member 124 of the extension-side of the first embodiment are not installed, and the disk 125 of the extension-side directly abuts the seat section 117 of the piston 15 to open/close the passage 111. That is, the disk 125 of the extension-side and the seat section 117 of the piston 15 configure the disc valve 153.

Then, the inside of the inner flange section 223 of the nut 220 configures the orifice 580 having a constant passage area.

Figure 20:
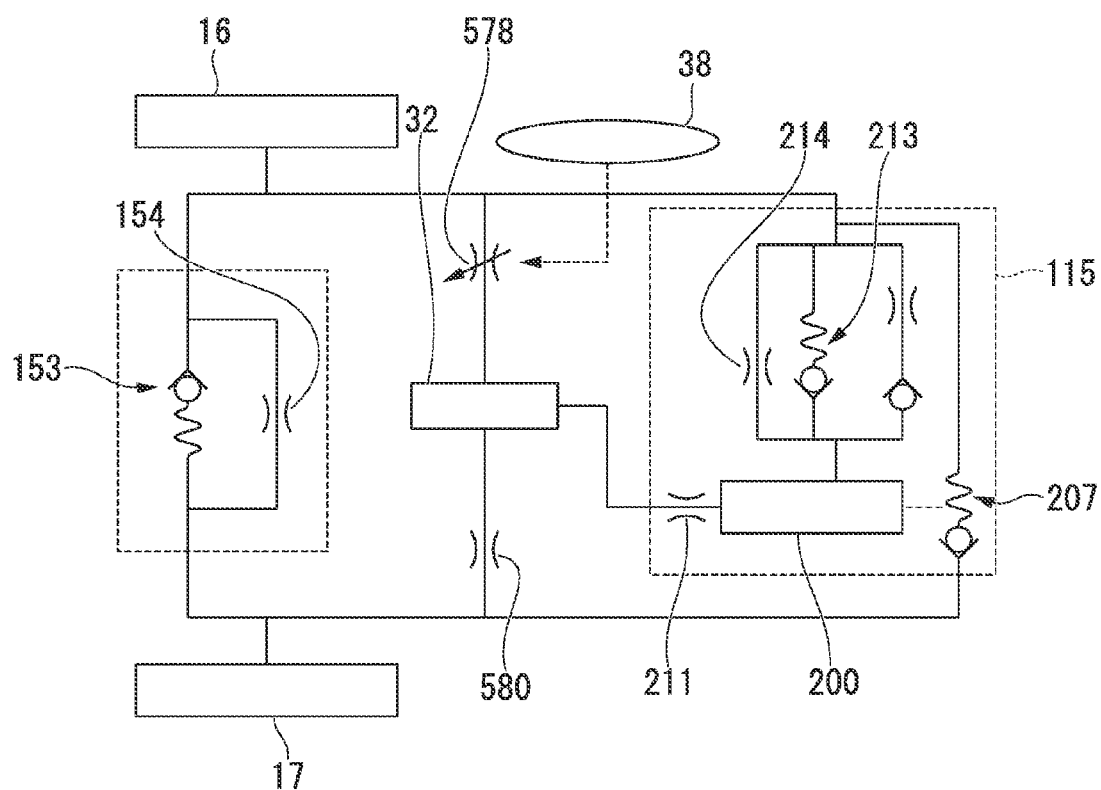
FIG. 20 is a hydraulic circuit diagram of the shock absorber of the seventh embodiment according to the present invention.
Figure 21:
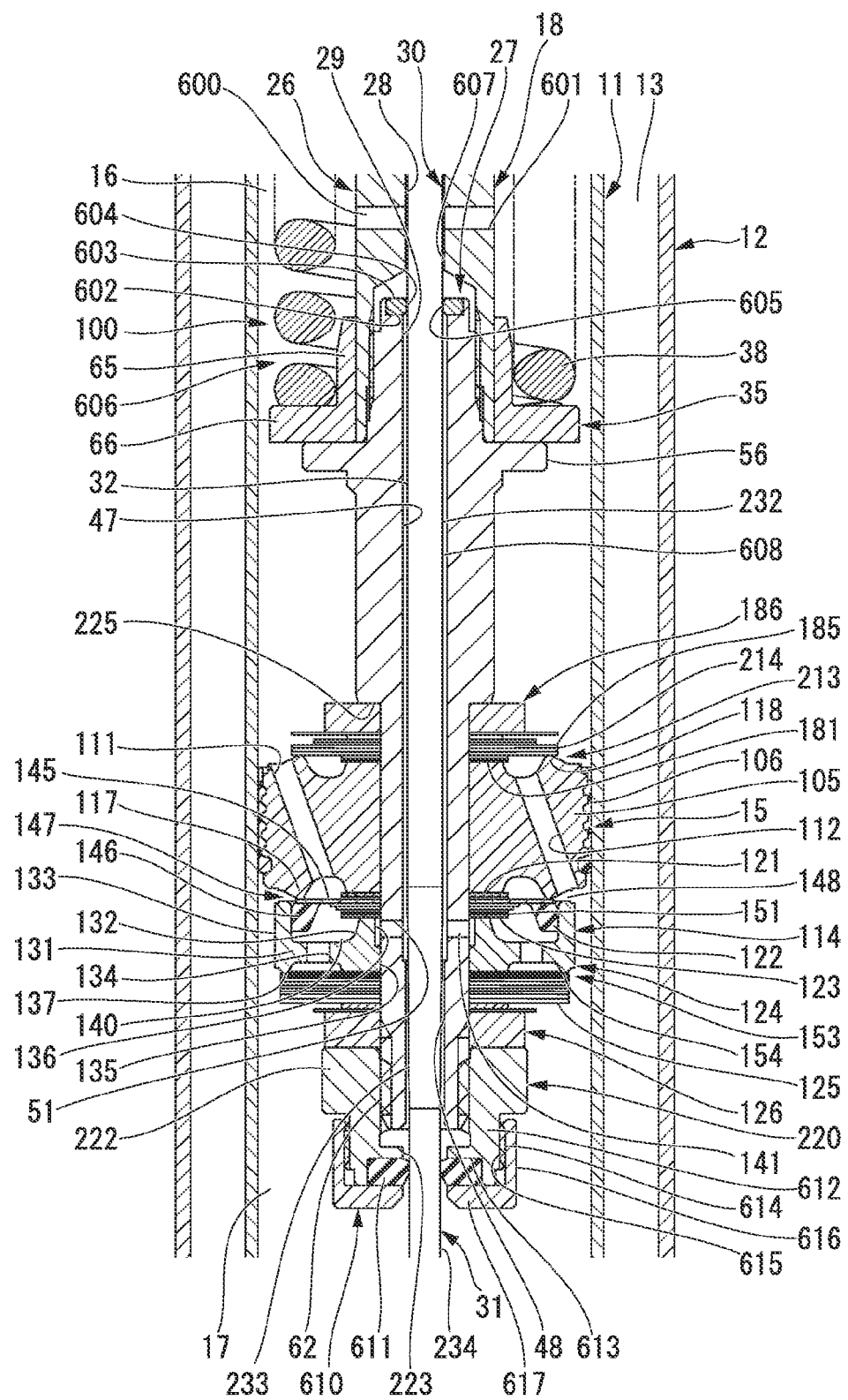
FIG. 21 is a cross-sectional view showing a major part of a shock absorber of an eighth embodiment according to the present invention.

A hydraulic circuit diagram of the seventh embodiment having the above-mentioned configuration is represented as shown in FIG. 20, That is, the damping force generating mechanism 115 of the compression-side and the disc valve 153 of the extension-side similar to the first embodiment are installed in parallel between the upper chamber 16 and the lower chamber 17. Then, like the first embodiment, the pilot chamber 200 of the damping force generating mechanism 115 of the compression-side comes in communication with the rod-inside passage 32 via the orifice 211. The rod-inside passage 32 comes in communication with the upper chamber 16 via the orifice 578 having a passage area varied by the rebound spring 38, and comes in communication with the lower chamber 17 via an orifice 580 having a constant passage area.

In the shock absorber of the seventh embodiment, when the piston rod 18 extends to the outside of the cylinder 11 farther than the maximum length-side predetermined position to be in the maximum length-side predetermined range, the rebound spring 38 of the passage area adjustment mechanism 582 shrinks and the intermediate spring shoe 575 closes the orifice 578. In addition, the rod-inside passage 32 comes in communication with the lower chamber 17 via the orifice 580 of the nut 220.

In the maximum length-side predetermined range, at the extension stroke in which the piston rod 18 extends to the outside of the cylinder 11, the piston 15 moves toward the upper chamber 16, the pressure of the upper chamber 16 is increased and the pressure of the lower chamber 17 is decreased. Then, the pressure of the upper chamber 16 is applied to the disk 125 of the disc valve 153 of the extension-side, to which the pressure of the lower chamber 17 is applied from one side, via the passage 111 of the extension-side formed at the piston 15, from the other side. Accordingly, the disk 125 is easily opened, and thus the damping force is decreased. That is, the extension-side damping force becomes soft.

In addition, in the maximum length-side predetermined range, at the compression stroke in which the piston rod 18 enters the inside of the cylinder 11, the piston 15 moves toward the lower chamber 17, the pressure of the lower chamber 17 is increased and the pressure of the upper chamber 16 is decreased. Then, the hydraulic pressure of the lower chamber 17 is applied to the damping valve main body 182 of the damping force generating mechanism 115 of the compression-side via the passage 112 of the compression-side formed at the piston 15. Here, since the pilot chamber 200 configured to apply the pilot pressure in the direction of the seat section 118 to the damping valve main body 182 comes in communication with the lower chamber 17 via the orifice 580, the damping valve main body 182 cannot be easily opened, and the compression-side damping force is increased to be larger than the extension-side damping force of the extension stroke to become hard.

On the other hand, the piston rod 18 is disposed outside the maximum length-side predetermined range, and in the intermediate predetermined range and the minimum length-side predetermined range in which the piston rod 18 enters the inside of the cylinder 11 further than the minimum length-side predetermined position, the rebound spring 38 does not shrink and the intermediate spring shoe 575 opens the orifice 578. In the minimum length-side predetermined range, the rod-inside passage 32 comes in communication with the upper chamber 16 via the passage hole 49 of the piston rod 18 and comes in communication with the lower chamber 17 via the orifice 580. In this state, both of the extension-side damping force and the compression-side damping force become soft.

[Eighth Embodiment]

Next, an eighth embodiment will be described mainly with reference to FIGS. 21 to 24 focusing on differences from the first embodiment. Further, the same elements as the first embodiment will be referred to by the same names and will be designated by the same reference numerals.

In the eighth embodiment, the passage area adjustment mechanism 101 and the passage 99 of the first embodiment are not installed. In addition, the damping valve main body 182, the plurality of disks 183 and the seat member 184 of the compression-side of the first embodiment are not installed, and the disk 185 of the compression-side directly abuts the seat section 118 of the piston 15 to open/close the passage 112. That is, the disk 185 of the compression-side and the seat section 118 of the piston 15 constitute the disc valve 213.

An annular seal member 611 is held at the nut 220 by a separate holding member 610, and a gap between the nut 220 and the metering pin 31 is always closed. Specifically, the nut 220 has a tubular section 612 extending from the main body section 222 in the axial direction, and the inner flange section 223 is formed at the tubular section 612 opposite to the main body section 222. A holding hole section 613 is formed at the inner flange section 223 outside in the axial direction and an inner circumferential side thereof and the seal member 611 is fitted into the holding hole section 613. The holding member 610 has a tubular section 616 having a female screw 615 threadedly engaged with the male screw 614 of the outer circumferential section of the tubular section 612 and an inner flange section 617 expanding from the end section in the axial direction of the tubular section 616 inward in the radial direction, and dropping of the seal member 611 out of the holding hole section 613 is restricted by the inner flange section 617. Accordingly, in the eighth embodiment, the passage area adjustment mechanism 236 of the first embodiment is not installed. In addition, unlike the first embodiment, in the metering pin 31, the small diameter shaft section 234 is formed at the base valve 23 (not shown in FIG. 21, see FIG. 1) side and the large diameter shaft section 232 is formed at the rod guide 21 (not shown in FIG. 21, see FIG. 1) side in the axial direction, and the tapered shaft section 233 is formed therebetween to connect these.

A passage hole 601 configured to form an orifice (a second passage) 600 configured to bring the rod-inside passage 32 in communication with the upper chamber 16 is formed at the rod main body 26 of the piston rod 18.

Then, a fitting hole section 602 is formed at the end section of the large diameter hole section 47 of the tip end rod 27 opposite to the small diameter hole section 48, and a ring member 603 is press-fitted into the fitting hole section 602. The ring member 603 has an inner diameter smaller than that of the large diameter hole section 47, and a small diameter hole section 604 is formed at the rod-inside passage 32. The small diameter hole section 604 configures an orifice 605 between the small diameter hole section 604 and the metering pin 31, and the spring mechanism 100, the metering pin 31 and the small diameter hole section 604 configure a passage area adjustment mechanism 606 configured to adjust the passage area of the rod-inside passage 32 depending on the position of the piston rod 18. A portion of the rod-inside passage 32 closer to the upper chamber 16 than the orifice 605 becomes a passage section 607 and a portion thereof closer to the pilot chamber 140 than the orifice 605 becomes a passage section 608 by the orifice 605.

Figure 22:
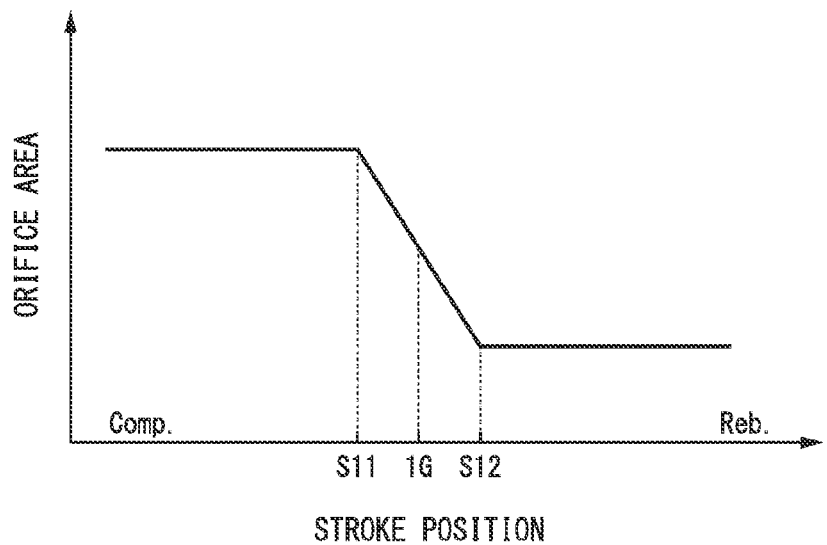
FIG. 22 is a characteristic diagram showing a relation between a stroke position and a passage area of an orifice of the shock absorber of the eighth embodiment according to the present invention.

As shown in FIG. 22, the passage area of the orifice 605 is reduced to be smaller at the maximum length-side predetermined range of the extension-side extending to the outside of the cylinder 11 than a maximum length-side predetermined position S12, and to be larger at the minimum length-side predetermined range of the compression-side entering the inside of the cylinder 11 than a minimum length-side predetermined position S11.

Figure 23:
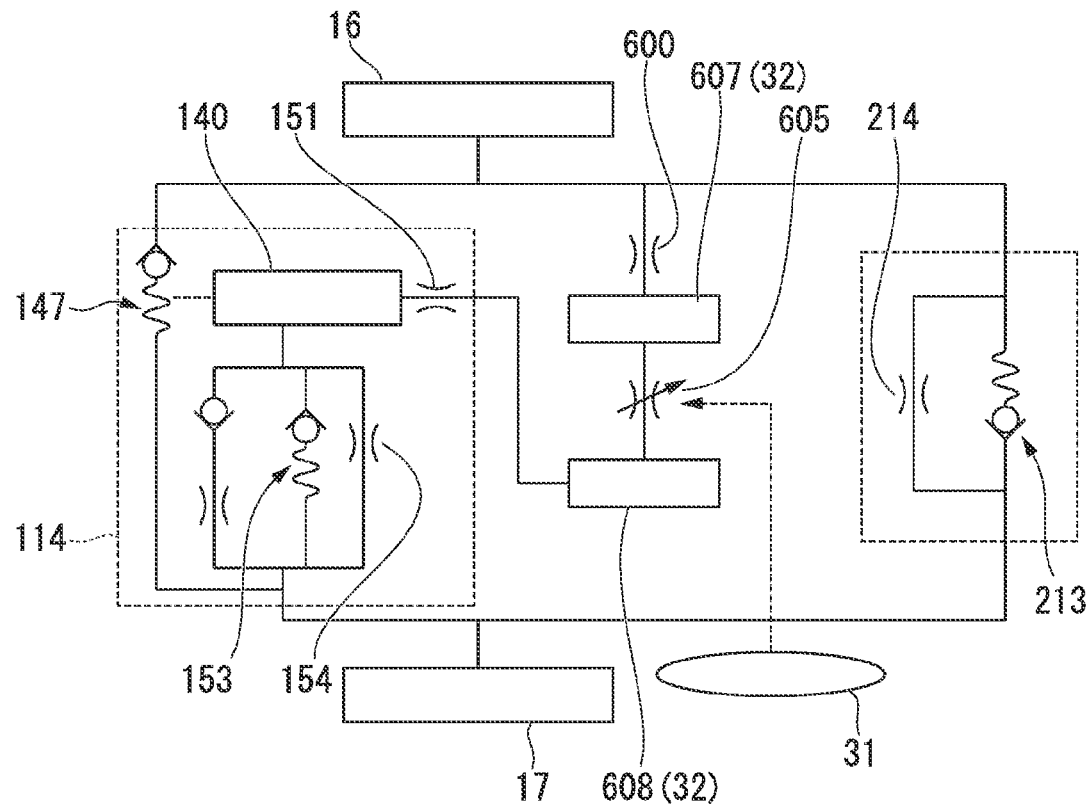
FIG. 23 is a hydraulic circuit diagram of the shock absorber of the eighth embodiment according to the present invention.

A hydraulic circuit diagram of the eighth embodiment having the above-mentioned configuration is represented as shown in FIG. 23. That is, the damping force generating mechanism 114 of the extension-side and the disc valve 213 of the compression-side similar to the first embodiment are installed in parallel between the upper chamber 16 and the lower chamber 17. Then, the pilot chamber 140 of the damping force generating mechanism 114 of the extension-side comes in communication with the passage section 608 of the rod-inside passage 32 via the orifice 151. Further, the orifice 605 having a passage area varied by the metering pin 31 is installed between the passage sections 607 and 608 of the rod-inside passage 32, and the orifice 600 is installed between the passage section 607 and the upper chamber 16.

In the shock absorber of the eighth embodiment, in the maximum length-side predetermined range in which the piston rod 18 extends to the outside of the cylinder 11 farther than the maximum length-side predetermined position S12, the small diameter hole section 604 of the piston rod 18 matches the position in the axial direction to the large diameter shaft section 232 of the metering pin 31. Accordingly, the passage area adjustment mechanism 606 restricts communication of the passage section 608 of the rod-inside passage 32, i.e., the pilot chamber 140 with the upper chamber 16.

Figure 24:
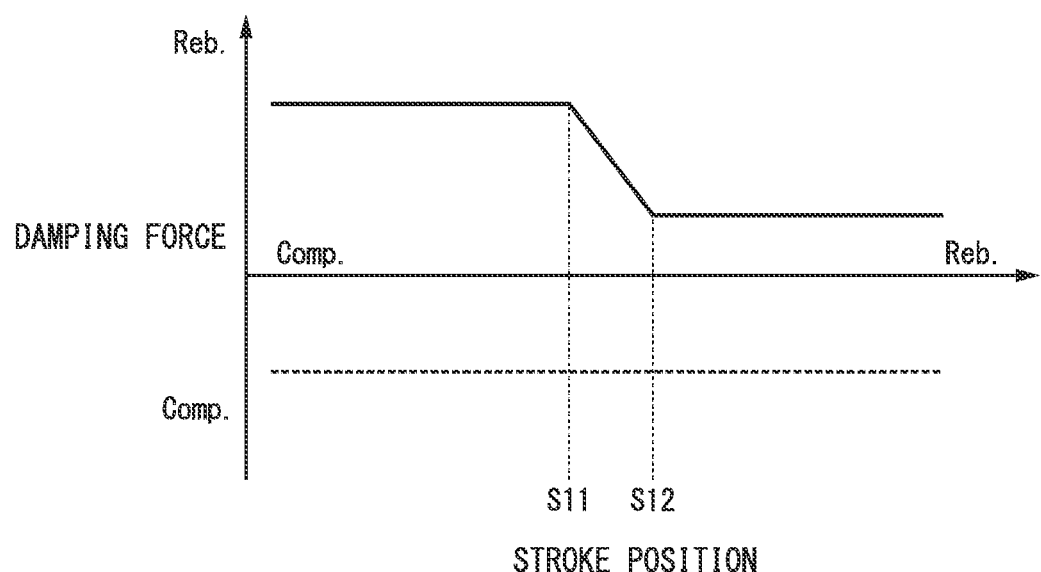
FIG. 24 is a characteristic diagram showing a relation between a stroke position and damping force of the shock absorber of the eighth embodiment according to the present invention.

In the maximum length-side predetermined range, at the extension stroke in which the piston rod 18 extends to the outside of the cylinder 11, the piston 15 moves toward the upper chamber 16, the pressure of the upper chamber 16 is increased and the pressure of the lower chamber 17 is decreased. Then, the pressure of the upper chamber 16 is applied to the damping valve main body 122 of the damping valve 147 of the damping force generating mechanism 114 of the extension-side via the passage 111 of the extension-side formed at the piston 15. Here, since communication between the upper chamber 16 and the pilot chamber 140 configured to apply the pilot pressure in the direction of the seat section 117 to the damping valve main body 122 is restricted, the pilot pressure is not varied. Accordingly, the damping valve main body 122 has an increased received pressure difference, and is easily separated from the seat section 117, and thus the damping force decreases as shown in FIG. 24. That is, the extension-side damping force becomes soft.

In addition, in the maximum length-side predetermined range, at the compression stroke in which the piston rod 18 enters the inside of the cylinder 11, the piston 15 moves toward the lower chamber 17, the pressure of the lower chamber 17 is increased and the pressure of the upper chamber 16 is decreased. Then, the hydraulic pressure of the lower chamber 17 is applied to the disk 185 of the disc valve 213 of the compression-side, to which the pressure of the upper chamber 16 is received from one side, via the passage 112 of the compression-side formed at the piston 15, from the other side. Accordingly, the pressure difference is increased, the disc valve 213 is easily opened, and the compression-side damping force is also decreased to become soft as shown in FIG. 24.

On the other hand, in the minimum length-side predetermined range in which the piston rod 18 enters the inside of the cylinder 11 further than the minimum length-side predetermined position S11, the small diameter hole section 604 of the piston rod 18 matches the position in the axial direction to the small diameter shaft section 234 of the metering pin 31. Accordingly, the passage area adjustment mechanism 606 increases the passage area of the orifice 605, and brings the pilot chamber 140 in communication with the upper chamber 16 via the rod-inside passage 32.

In the minimum length-side predetermined range, at the extension stroke in which the piston rod 18 extends to the outside of the cylinder 11, the piston 15 moves toward the upper chamber 16, the pressure of the upper chamber 16 is increased and the pressure of the lower chamber 17 is decreased. Then, the pressure of the upper chamber 16 is applied to the damping valve main body 122 of the damping valve 147 of the damping force generating mechanism 117 of the extension-side via the passage 111 of the extension-side formed at the piston 15. Here, since the pilot chamber 140 configured to apply the pilot pressure in the direction of the seat section 117 to the damping valve main body 122 comes in communication with the upper chamber 16 via the passage hole 601 of the piston rod 18, the rod-inside passage 32 and the pilot chamber introduction passage 141, the pressure state of the pilot chamber 140 becomes similar to that of the upper chamber 16, and the pilot pressure is also increased with the increase in pressure of the upper chamber 16.

In this state, similar to the first embodiment, the damping valve main body 122 has a reduced received pressure, and cannot be easily separated from the seat section 117. Accordingly, as shown in FIG. 24, the damping force of the extension stroke is increased, and the extension-side damping force becomes hard.

In addition, in the minimum length-side predetermined range, at the compression stroke in which the piston rod 18 enters the inside of the cylinder 11, the piston 15 moves toward the lower chamber 17, the pressure of the lower chamber 17 is increased and the pressure of the upper chamber 16 is decreased. Then, the hydraulic pressure of the lower chamber 17 is applied to the disk 185 of the disc valve 213 of the compression-side, to which the pressure of the upper chamber 16 is received at one side, via the passage 112 of the compression-side formed at the piston 15, from the other side. Accordingly, the pressure difference of the disk 185 is increased, the disk 185 is easily separated from the seat section 118, and the liquid oil of the passage 112 of the compression-side opens the disk 185 and flows toward the upper chamber 16 via the gap between the piston 15 and the disk 185. Accordingly, the damping force of the compression stroke is decreased to be lower than the damping force of the extension stroke, and the compression-side damping force becomes soft as shown in FIG. 24.

[Ninth Embodiment]

Figure 25:
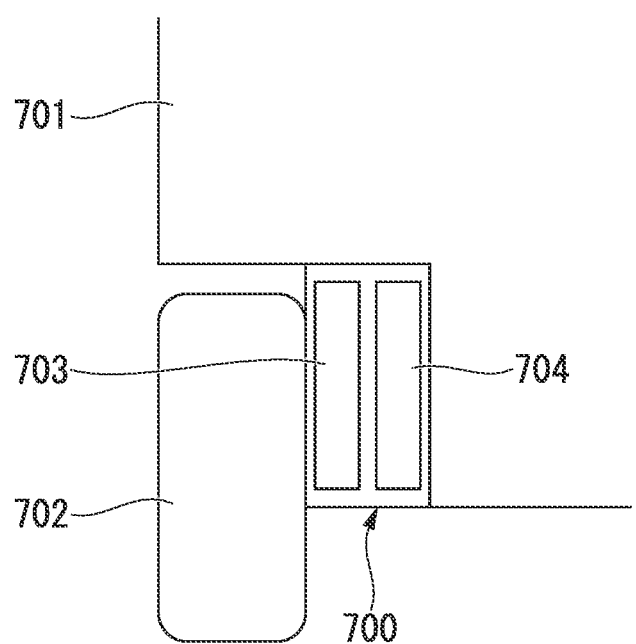
FIG. 25 is a view showing disposition of a shock absorber and a mechanism configured to adjust a vehicle height in a ninth embodiment according to the present invention.

Next, a ninth embodiment will be described mainly with reference to FIG. 25 focusing on differences from the first embodiment. Further, the same elements as the first embodiment will be referred to by the same names and will be designated by the same reference numerals.

In the ninth embodiment, a mechanism of adjusting a vehicle height is disposed in parallel with the shock absorber shown in the above-mentioned first to eighth embodiments. As schematically shown in FIG. 25, a suspension apparatus 700 of the ninth embodiment is disposed between a vehicle body 701 and a wheel 702 to support the wheel 702 to be movable upward and downward with respect to the vehicle body 701. The suspension apparatus 700 has either of a shock absorber 703 and a vehicle height adjustment mechanism 704 shown in the above-mentioned first to eighth embodiments and installed at one wheel 702, and in FIG. 25, both of the shock absorber 703 and the vehicle height adjustment mechanism 704 are installed at each of the four wheels 702 (the other wheels are omitted). Further, the vehicle height adjustment mechanism 704 may be installed at only a rear wheel side rather than at all of the wheels.

In the ninth embodiment having the above-mentioned configuration, the shock absorber 703 shown in the above-mentioned first to eighth embodiments is adjusted to sensitively reply with a variation in position from the vicinity of a neutral position (a position of 1G (a position at which the vehicle body stopped at a horizontal position is supported)). That is, when an inclination at the position 1G between S1 and S4 in FIG. 6 is increased, an influence on ride comfort or steering stability is increased by a variation in vehicle height due to the number of passengers or a live load. Here, the vehicle height adjustment mechanism 704 configured to adjust a vehicle height is disposed in parallel with the shock absorber 703 described in the above-mentioned first to eighth embodiments as shown in FIG. 25. As the vehicle height adjustment mechanism 704 is disposed in parallel with the shock absorber 703, the shock absorber 703 can be held at a neutral position by the vehicle height adjustment mechanism 704 regardless of the number of passengers or the live load, and characteristics of the shock absorber 703 can be maintained. Further, as the vehicle height adjustment mechanism 704, an air suspension configured to adjust a vehicle height using compressed air from a compressor and configured to adjust a supply amount of the compressed air, for example, as disclosed in Japanese Unexamined Patent Application, First Publication No. 2010-120580, or a self levelizer or the like including a pumping function of adjusting an inherent height of the vehicle according to a variation in vehicle height, for example, as disclosed in Japanese Unexamined Patent Application, First Publication No. 2009-180355, is used.

According to the above-mentioned embodiment, there is provided a shock absorber including a cylinder in which a working fluid is sealed, a piston slidably fitted into the cylinder and configured to divide the inside of the cylinder into two chambers, a piston rod connected to the piston and extending toward the outside of the cylinder, a first passage and a second passage configured to cause the two chambers to communicate and configured to allow the working fluid to flow between the two chambers based on movement of the piston, and a damping valve installed at the first passage and configured to suppress a flow of the working fluid generated by movement of the piston to generate a damping force, wherein a passage area adjustment mechanism configured to adjust a passage area of the second passage based on a position of the piston rod is installed to have at least one of a maximum length-side property in which an extension-side damping force becomes soft and a compression-side damping force becomes hard in a range in which the piston rod extends to the outside of the cylinder farther than a maximum length-side predetermined position and a minimum length-side property in which the extension-side damping force becomes hard and the compression-side damping force becomes soft in a range in which the piston rod enters the inside of the cylinder further than a minimum length-side predetermined position. In this way, since the passage area of the second passage through which the working fluid flows is adjusted, a damping force can be smoothly varied, and ride comfort of a shock-absorber-mounted vehicle becomes better.

In addition, there is provided a shock absorber including a cylinder in which a working fluid is sealed, a piston slidably fitted into the cylinder and configured to divide the inside of the cylinder into two chambers, a piston rod connected to the piston and extending toward the outside of the cylinder, a first passage and a second passage configured to cause the two chambers to communicate and configured to allow the working fluid to flow between the two chambers based on movement of the piston, and a damping valve installed at the first passage and configured to suppress a flow of the working fluid generated by movement of the piston and generate a damping force, wherein a passage area adjustment mechanism configured to adjust a passage area of the second passage based on me position of the piston rod is installed such that an extension-side damping force becomes soft and a compression-side damping force becomes hard in a range in which the piston rod extends to the outside of the cylinder farther than a maximum length-side predetermined position, and both of the extension-side damping force and the compression-side damping force become soft in a range in which the piston rod enters the inside of the cylinder further than a minimum length-side predetermined position. In this way, since the passage area of the second passage through which the working fluid flows is adjusted, the damping force can be smoothly varied and the ride comfort of the shock-absorber-mounted vehicle becomes better.

In addition, there is provided a shock absorber including a cylinder in which a working fluid is sealed, a piston slidably fitted into the cylinder and configured to divide the inside of the cylinder into two chambers, a piston rod connected to the piston and extending to the outside of the cylinder, a first passage and a second passage configured to cause the two chambers to communicate and configured to allow the working fluid to flow between the two chambers based on movement of the piston, and a damping valve installed at the first passage and configured to suppress a flow of the working fluid generated by the movement of the piston and generate a damping force, wherein a passage area adjustment mechanism configured to adjust a passage area of the second passage depending on a position of the piston rod is installed such that both of an extension-side damping force and a compression-side damping force became soft in a range in which the piston rod extends to the outside of the cylinder farther than a maximum length-side predetermined position, and the extension-side damping force becomes hard and the compression-side damping force becomes soft in a range in which the piston rod enters the inside of the cylinder further than a minimum length-side predetermined position. In this way, since the passage area of the second passage through which the working fluid flows is adjusted, the damping force can be smoothly varied and the ride comfort of the shock-absorber-mounted vehicle becomes better.

In addition, the damping valves are damping valves of the extension-side and the compression-side, at least one of the damping valves of the extension-side and the compression-side is a pilot type damping valve having a pilot chamber, and the second passage is connected to the pilot chamber. Accordingly, the pilot pressure of the pilot chamber of the damping valve is capable of being adjusted by the passage area adjustment mechanism according to the position of the piston rod to adjust a valve opening pressure of the damping valve. Accordingly, the damping force can be more smoothly varied.

In addition, the passage area adjustment mechanism adjusts the second passage using the metering pin. Accordingly, the passage area is capable of being stably adjusted according to the position of the piston rod. Accordingly, stable damping force properties can be obtained.

In addition, the passage area adjustment mechanism is constituted by a valve section configured to open/close the second passage and a spring mechanism installed in the cylinder having one end that can abut the valve section and the other end that is capable of abutting the cylinder end section side, and biases the valve section in a valve closing direction using a spring force of the spring mechanism. Accordingly, the spring mechanism configured to bias the valve section in the valve closing direction may function as a mechanism configured to restrict extension of the piston rod.

In addition, the second passage has at least one of the passages of the extension-side and the compression-side having a check valve. Accordingly, at least one of the extension-side damping force and the compression-side damping force can become soft using the check valve.

While examples in which the present invention is applied to the dual pipe type hydraulic pressure shock absorber have been described in the embodiments, the present invention is not limited thereto but may be applied to a mono tube type hydraulic pressure shock absorber configured to form a gas chamber using a division body that can slide to an opposite side of the upper chamber 16 of the lower chamber 17 in the cylinder 11 without the outer casing, and may be applied to all shock absorbers. Of course, the present invention may be applied to the above-mentioned base valve 23. In addition, the present invention may be applied to the case in which an oil passage in communication with the inside of the cylinder 11 is installed at the outside of the cylinder 11 and the damping force generating mechanism is installed at the oil passage.

Further, in the embodiment, while the hydraulic pressure shock absorber has been exemplarily described, water or air may be used as the fluid.

[Industrial Applicability]

According to the above-mentioned shock absorber, a degree of freedom of settings such as damping characteristics, a reaction force, or the like, can be increased.

[Reference Signs List]
11 cylinder
15 piston
16 upper chamber
17 lower chamber
18 piston rod
31 metering pin
32 rod-inside passage (second passage)
86, 306, 530 opening/closing disk (valve section)
99 passage (second passage)
100, 550 spring mechanism
101, 236, 343, 551, 582, 606 passage area adjustment mechanism
111 passage (first passage)
112 passage (first passage)
140, 200 pilot chamber (second passage)
141, 201 pilot chamber introduction passage (second passage)
147, 207 damping valve
235, 536, 600 orifice (second passage)
320, 337 check valve
323, 342 passage (second passage)
500 rod-inside passage (second passage)

The invention claimed is:

1. A shock absorber comprising:
a cylinder in which a working fluid is sealed;
a piston slidably fitted into the cylinder and configured to divide an inside of the cylinder into two chambers;
a piston rod connected to the piston and extending to an outside of the cylinder;
a first passage and a second passage configured to cause the two chambers to communicate and configured to allow the working fluid to flow between the two chambers based on movement of the piston; and
a damping valve installed at the first passage and configured to suppress a flow of the working fluid generated by movement of the piston and generate a damping force,
wherein a passage area adjustment mechanism configured to adjust a passage area of the second passage based on a position of the piston rod is installed to have at least one of a maximum length-side property in which an extension-side damping force becomes soft and a compression-side damping force becomes hard in a range in which the piston rod extends to the outside of the cylinder farther than a maximum length-side predetermined position, and a minimum length-side property in which the extension-side damping force becomes hard and the compression-side damping force becomes soft in a range in which the piston rod enters the inside of the cylinder further than a minimum length-side predetermined position.

2. The shock absorber according to claim 1, wherein the damping valve includes damping valves of the extension-side and the compression-side, at least one of the damping valves of the extension-side and the compression-side is a pilot type damping valve having a pilot chamber, and the second passage is connected to the pilot chamber.

3. The shock absorber according to claim 1, wherein the passage area adjustment mechanism adjusts the second passage using a metering pin.

4. The shock absorber according to claim 1, wherein the passage area adjustment mechanism is configured of a valve section configured to open/close the second passage and a spring mechanism installed in the cylinder and having one end that is capable of abutting the valve section and the other end that is capable of abutting the cylinder end section side, and configured to bias the valve section in a valve closing direction using a spring force of the spring mechanism.

5. The shock absorber according to claim 1, wherein the second passage has a passage on at least one of the extension-side and the compression-side having a check valve.

6. A shock absorber comprising:
a cylinder in which a working fluid is sealed;
a piston slidably fitted into the cylinder and configured to divide an inside of the cylinder into two chambers;
a piston rod connected to the piston and extending to an outside of the cylinder;
a first passage and a second passage configured to cause the two chambers to communicate and configured to allow the working fluid to flow between the two chambers based on movement of the piston; and
a damping valve installed at the first passage and configured to suppress a flow of the working fluid generated by movement of the piston and generate a damping force,
wherein a passage area adjustment mechanism configured to adjust a passage area of the second passage based on a position of the piston rod is installed to have at least one of a maximum length-side property in which an extension-side damping force becomes soft and a compression-side damping force becomes hard in a range in which the piston rod extends to the outside of the cylinder farther than a maximum length-side predetermined position, and a minimum length-side property in which the extension-side damping force becomes hard and the compression-side damping force becomes soft in a range in which the piston rod enters the inside of the cylinder further than a minimum length-side predetermined position,
the shock absorber is configured to be installed between a vehicle body and a wheel, and
a vehicle height adjustment mechanism configured to adjust a vehicle height of the vehicle body is disposed in parallel with the shock absorber.

7. A shock absorber comprising:
a cylinder in which a working fluid is sealed;
a piston slidably fitted into the cylinder and configured to divide an inside of the cylinder into two chambers;
a piston rod connected to the piston and extending to an outside of the cylinder;
a first passage and a second passage configured to cause the two chambers to communicate and configured to allow the working fluid to flow between the two chambers depending on movement of the piston; and
a damping valve installed at the first passage and configured to suppress a flow of the working fluid generated by movement of the piston and generate a damping force,
wherein a passage area adjustment mechanism configured to adjust a passage area of the second passage based on a position of the piston rod is installed such that an extension-side damping force becomes soft and a compression-side damping force becomes hard in a range in which the piston rod extends to the outside of the cylinder farther than a maximum length-side predetermined position, and
both of the extension-side damping force and the compression-side damping force become soft in a range in which the piston rod enters the inside of the cylinder further than a minimum length-side predetermined position.

8. A shock absorber comprising:
a cylinder in which a working fluid is sealed;
a piston slidably fitted into the cylinder and configured to divide an inside of the cylinder into two chambers;
a piston rod connected to the piston and extending to an outside of the cylinder;
a first passage and a second passage configured to cause the two chambers to communicate and configured to allow the working fluid to flow between the two chambers depending on movement of the piston; and
a damping valve installed at the first passage and configured to suppress a flow of the working fluid generated by movement of the piston and generate a damping force,
wherein a passage area adjustment mechanism configured to adjust a passage area of the second passage based on a position of the piston rod is installed such that both of an extension-side damping force and a compression-side damping force become soft in a range in which the piston rod extends to the outside of the cylinder farther than a maximum length-side predetermined position, and
the extension-side damping force becomes hard and the compression-side damping force becomes soft in a range in which the piston rod enters the inside of the cylinder further than a minimum length-side predetermined position.

* * * * *